US010812571B2

(12) United States Patent
Seed et al.

(10) Patent No.: US 10,812,571 B2
(45) Date of Patent: Oct. 20, 2020

(54) DISTRIBUTED TRANSACTION MANAGEMENT IN A NETWORK SERVICE LAYER

(71) Applicant: Convida Wireless, LLC, Wilmington, DE (US)

(72) Inventors: Dale N. Seed, Allentown, PA (US); Zhuo Chen, Claymont, DE (US); Shoshana Loeb, Philadelphia, PA (US); Quang Ly, North Wales, PA (US); Catalina Mihaela Mladin, Hatboro, PA (US); William Robert Flynn, IV, Schwenksville, PA (US); Rocco Di Girolamo, Laval Quebec (CA)

(73) Assignee: Convida Wireless, LLC, Wilmington, DE (US)

( * ) Notice: Subject to any disclaimer, the term of this patent is extended or adjusted under 35 U.S.C. 154(b) by 281 days.

(21) Appl. No.: 15/923,367

(22) Filed: Mar. 16, 2018

(65) Prior Publication Data
US 2018/0270295 A1 Sep. 20, 2018

Related U.S. Application Data

(60) Provisional application No. 62/472,851, filed on Mar. 17, 2017.

(51) Int. Cl.
| | | |
|---|---|---|
| G06F 15/173 | (2006.01) | |
| H04L 29/08 | (2006.01) | |
| G06F 9/46 | (2006.01) | |
| G06F 9/52 | (2006.01) | |
| H04W 4/70 | (2018.01) | |
| G06F 16/23 | (2019.01) | |

(52) U.S. Cl.
CPC .............. *H04L 67/10* (2013.01); *G06F 9/466* (2013.01); *G06F 9/52* (2013.01); *H04L 67/104* (2013.01); *H04L 67/12* (2013.01); *G06F 16/2379* (2019.01); *H04W 4/70* (2018.02)

(58) Field of Classification Search
None
See application file for complete search history.

(56) References Cited

U.S. PATENT DOCUMENTS

| | | | | |
|---|---|---|---|---|
| 5,687,363 | A * | 11/1997 | Oulid-Aissa | G06F 16/27 |
| 5,835,757 | A * | 11/1998 | Oulid-Aissa | G06F 16/27 |
| 7,890,529 | B1 * | 2/2011 | Srinivasan | G06F 16/134 |
| | | | | 707/781 |
| 9,569,459 | B1 * | 2/2017 | Strauss | G06F 16/182 |
| 2007/0220294 | A1 * | 9/2007 | Lippett | G06F 1/3203 |
| | | | | 713/320 |
| 2009/0233623 | A1 * | 9/2009 | Johnson | H04W 4/023 |
| | | | | 455/456.3 |

(Continued)

OTHER PUBLICATIONS

Skeen, "Nonblocking Commit Protocols", Computer Science Division EECS Department University of California Berkeley, California, Apr. 29, 1981, 10 pages.

(Continued)

*Primary Examiner* — Phuoc H Nguyen
(74) *Attorney, Agent, or Firm* — BakerHostetler

(57) ABSTRACT

Distributed Service Layer Transactions (DSLTs) may be supported by a DSLT service at a service layer of a communications network to offload applications from the burden of managing the processing of DSLTs.

20 Claims, 33 Drawing Sheets

(56) References Cited

U.S. PATENT DOCUMENTS

2010/0318394 A1    12/2010  Nayak
2015/0277969 A1*   10/2015  Strauss .................. G06F 9/466
                                                           707/703
2016/0254915 A1     9/2016  Jenkinson et al.

OTHER PUBLICATIONS

OneM2M Technical Specification TS-0001-V3.16.0, "Functional Architecture" Jun. 10, 2019, 530 pages.

OneM2M Technical Report, TR-0001-V1.7.0, "Use Cases Collection" Aug. 13, 2005, 173 pages.

OneM2M Technical Report TR-0020-V0.8.0, "Study of Service Transactions and Re-Usable Service Layer Context" Jun. 2, 2017, 63 pages.

OMA Open Mobile Alliance "Lightweight Machine to Machine Technical Specification" Candidate Version 1.0, Dec. 10, 2013, 104 pages.

ETSI TS 102690 V2.0.14, "Machine-to-Machine Communications (M2M); Functional Architecture" Jul. 2013, 332 pages.

"OIC Core Specification V1.1.1 Part 1", Open Connectivity Foundation (OCF), © 2016, 151 pages.

* cited by examiner

DISTRIBUTED TRANSACTION MANAGEMENT IN A NETWORK SERVICE LAYER

CROSS-REFERENCE TO RELATED APPLICATIONS

This application claims the benefit of U.S. Provisional Patent Application No. 62/472,851, filed on Mar. 17, 2017, titled "Methods to Enable Distributed Transaction Management at the IoT Service Layer," the contents of which is hereby incorporated by reference in its entirety.

BACKGROUND

A transaction can be a set of operations or a sequence of operations that need to be performed as a unit. The set of operations can be closely related (e.g. for functional or business reasons) and as a unit, they either all need to be successfully executed or none of them executed. A transaction can have four characteristics which are Atomicity, Consistency, Isolation and Durability (ACID). Atomicity means no matter how many requests or steps a transaction has, they have to be executed as if it is one single request. They all must successfully execute or none at all. Partial execution is not allowed. Consistency means the state of the targets of the transaction have to be consistent before and after the execution of a transaction. Consistency is closely related with atomicity. Isolation means that transactions need to be isolated with respect to each other and they cannot interfere with each other. Durability means that once a transaction is committed, the system needs to guarantee that the result of the transaction is safe and durable. The result is capable of withstanding sudden malfunction and is able to recover to the result after recovery. Recently, efforts have been made to address transaction processing in the context of machine-to-machine (M2M) or Internet of things (IoT) networks.

SUMMARY

Disclosed herein are methods, apparatus, and system for providing support for distributed transaction processing at a service layer of a communications network. The methods, apparatus, and systems may be embodied in a distributed service layer transaction (DSLT) service that supports DSLT processing capabilities in order to offload applications from the complexity and burden of having to manage the processing of DSLTs themselves. The DSLT processing capabilities may include a capability of the DSLT service to manage on behalf of applications the atomic processing of a DSLT; a capability of the DSLT service to manage on behalf of applications the atomic processing of a sequence of DSLTs; a capability of the DSLT service to coordinate the scheduling of the individual requests that make up a DSLT or sequence of DSLTs; a capability of the DSLT service to enable applications to define execution criteria of the DSLT or sequence of DSLTs; a capability of the DSLT service to enable applications to define retransmission policies of the DSLT or sequence of DSLTs; a capability of the DSLT service to enable applications to define completion criteria of the DSLT or sequence of DSLTs; a capability of the DSLT service to enable applications to define a priority of the DSLT or sequence of DSLTs; and a capability of the DSLT service to provide a simple RESTful API to applications to initiate a DSLT or sequence of DSLTs.

In one aspect, a first service layer entity on the communications network, which implements the DSLT service, may receive from an application executing on the communications network a request for a distributed transaction. The request may specify a command to be atomically executed on a set of targeted resources hosted by multiple other service layer entities of the communications network. In response to the request, the first service layer entity may send to each of the multiple other service layer entities, a request to lock any targeted resources hosted by that other service layer entity. The first service layer entity may then receive, from each of the multiple other service layer entities, a response indicating whether that service layer entity was able to lock the targeted resources hosted by that service layer entity. If the first service layer entity receives responses indicating that all of the targeted resources are locked, the first service layer entity may then send to the multiple other service layer entities requests to perform atomic execution of the command on the set of targeted resources. If the first service layer entity receives responses indicating that the command was successfully executed on the set of targeted resources, then the first service layer entity may send to the multiple other service layer entities requests to commit the distributed transaction. The first service layer entity may then send, to the application, a response indicating the distributed transaction was successfully performed.

In accordance with a further aspect, the first service layer entity may, upon receipt of the request for the distributed transaction from the application, create in a memory of the first service layer entity a resource representing the distributed transaction and comprising information concerning a state of the distributed transaction. That resource may be made accessible to the application via the communications network, to enable the application to monitor the status of the transaction. The resource may comprise a transaction identifier attribute that uniquely identifies the transaction and a transaction state attribute in which the information concerning the state of the distributed transaction is stored. The resource may further comprise an execution time attribute that controls when the first service layer entity initiates processing of the request for the distributed transaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
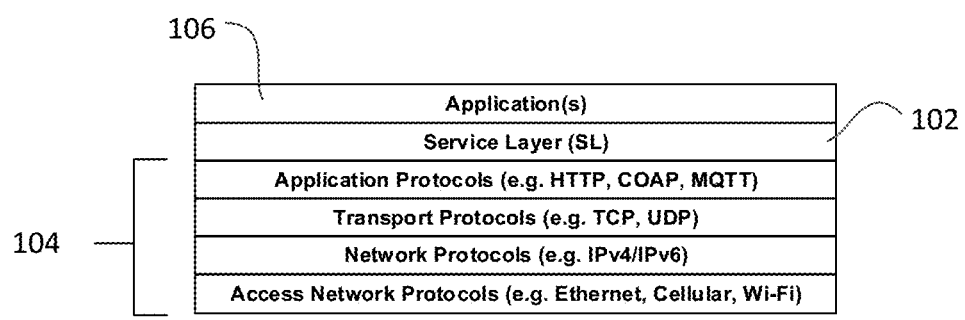
FIG. 1 is a diagram that illustrates an exemplary protocol stack supporting a service layer.

The following is a list of acronyms that may appear in the following description. Unless otherwise specified, the acronyms used herein refer to the corresponding term listed below:

ADN Application Dedicated Node
AE Application Entity
API Application Programming Interfaces
ASN Application Service Node
CSE Common Service Entity
CSF Common Service Function
DSLT Distributed Service Layer Transaction
DSLT-CF Distributed Service Layer Transaction Client Function
DSLT-MF Distributed Service Layer Transaction Management Function
DSLT-TF Distributed Service Layer Transaction Trigger Function
DSLT-REQ Distributed Service Layer Transaction Request
DSLT-TRIGGER Distributed Service Layer Transaction Trigger Request
IN Infrastructure Network
IoT Internet of Things
IP Internet Protocol
M2M Machine to Machine
MN Middle Node
NoDN Non-oneM2M Node
PoA Point of Access
ROA Resource Oriented Architecture
SL Service Layer
URI Uniform Resource Identifier Also, the following terms may be used in the description below, and unless otherwise specified, these terms may have the following meanings:

An M2M/IoT Service Layer may be a software middleware layer that supports value-added services for M2M/IoT applications and devices through a set of Application Programming Interfaces (APIs) and underlying networking interfaces.

An M2M/IoT Application may be an application targeting a particular M2M/IoT use case (e.g. eHealth, smart energy, home automation).

A Service Layer Entity may be an M2M/IoT Application or an instance of a M2M/IoT Service Layer.

A Service Layer Resource may be a uniquely addressable object hosted by a M2M/IoT Service Layer.

A Service Layer Request may be an operation issued by a Service Layer Entity that targets a Service Layer Resource.

A Service Layer Transaction may be a set or sequence of Service Layer Requests that need to be performed atomically as a unit such that they are all successfully executed or none of them executed.

A Distributed Service Layer Transaction may be a Service Layer Transaction that targets a set of resources hosted by multiple Service Layer Entities hosted on different network nodes.

A Distributed Service Layer Transaction Management Function may be a Service Layer function that is capable of interacting with Distributed Service Layer Transaction Client Functions and managing the atomic processing of Distributed Service Layer Transactions to these functions.

A Distributed Service Layer Transaction Client Function may be a Service Layer function capable of interacting with Distributed Service Layer Transaction Management Functions and receiving and processing individual Distributed Service Layer Transactions.

A Distributed Service Layer Transaction Trigger Function may be a Service Layer function capable of interacting with Distributed Service Layer Transaction Management Functions and initiating a Distributed Service Layer Transaction.

A Distributed Service Layer Transaction Trigger Request may be a request sent by a Distributed Service Layer Transaction Trigger Function to a Distributed Service Layer Transaction Management Function to initiate a Distributed Service Layer Transaction.

A Distributed Service Layer Transaction Request may be a request disseminated by a Distributed Service Layer Transaction Management Function to a Distributed Service Layer Transaction Client Function to perform a Distributed Service Layer Transaction.

In a machine-to-machine (M2M) or Internet of things (IoT) network, a Service Layer (SL) is a technology specifically targeted towards providing value-added services for M2M/IoT devices and applications. Recently, several industry standards bodies (e.g., oneM2M [oneM2M TS-0001 oneM2M Functional Architecture-V-3.0.0.], ETSI [ETSI TS 102 690 Machine-to-Machine communications (M2M) Functional architecture V2.0.13.], OCF [OCF—OIC Specifications, V1.1] and LWM2M [OMA LWM2M Specification, V1.0]) have been developing M2M/IoT SLs to address the challenges associated with the integration of M2M/IoT devices and applications into deployments with the Internet/Web, cellular, enterprise, and home network.

An M2M/IoT Service Layer can provide applications and devices access to a collection of M2M/IoT oriented capabilities. A few examples include security, charging, data management, device management, discovery, provisioning, and connectivity management. These capabilities are made available to applications via Application Programming Interfaces (APIs) which make use of message formats, resource structures and resource representations supported by the M2M/IoT SL.

From a protocol stack perspective, SLs are typically situated above the Application Protocol Layer and provide value added services to applications they support. Hence SLs are often categorized as 'middleware' services. FIG. 1 shows an exemplary service layer 102 between the Application Protocols 104 and Applications 106.

Figure 2:
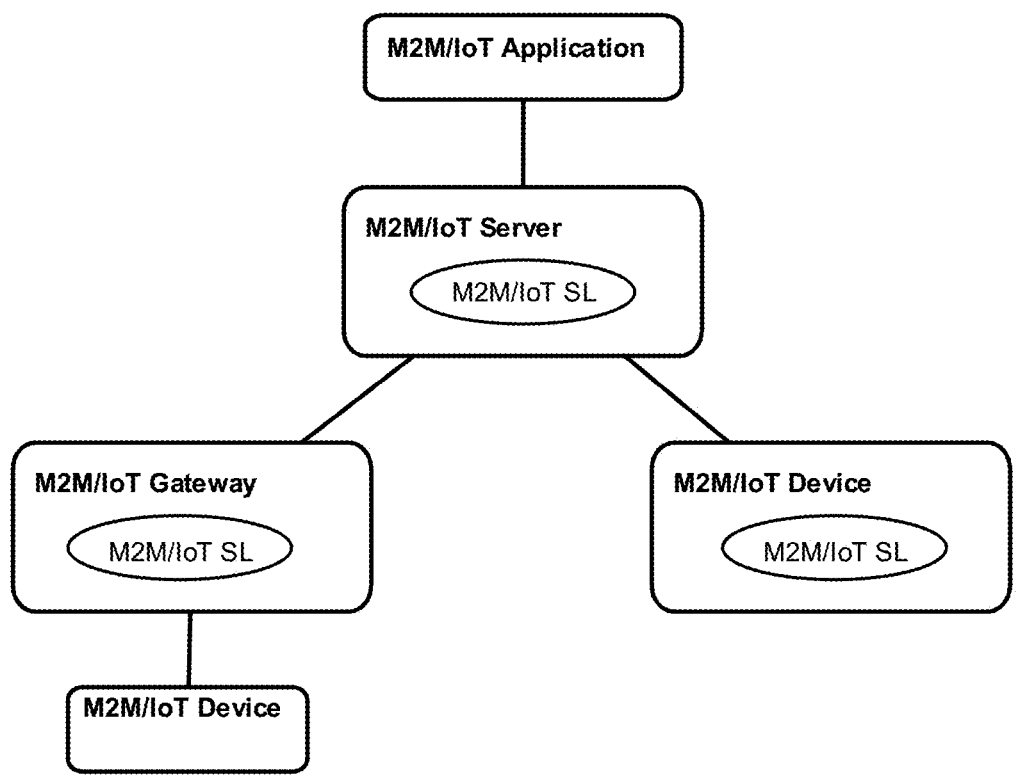
FIG. 2 is a diagram that illustrates M2M/IoT Service Layer (SL) deployed on various types of network nodes.

From a deployment perspective an M2M/IoT SL 102 can be deployed on various types of network nodes including servers, gateways and devices as shown in FIG. 2. Any such node, server, gateway, device, apparatus, or other logical entity of a communications network that implements service layer functionality or otherwise incorporates an instance of a service layer may be referred to herein as a service layer entity.

Figure 3:
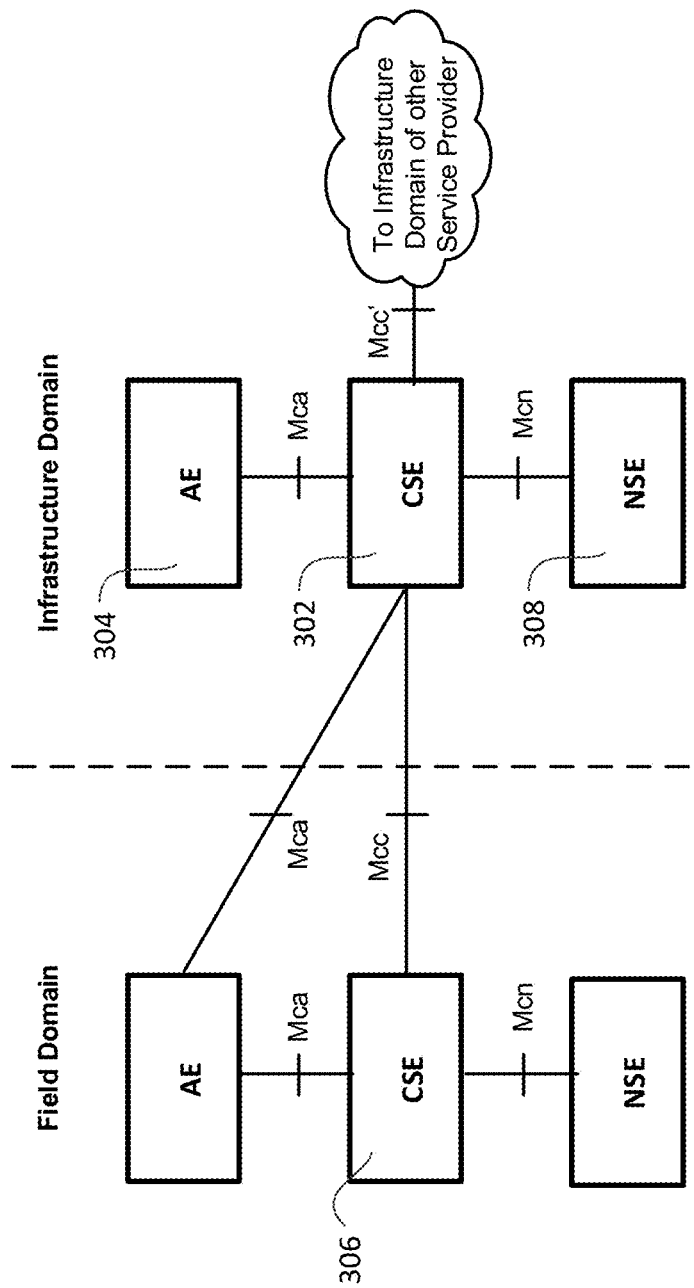
FIG. 3 is a diagram that illustrates a oneM2M Architecture.
Figure 4:
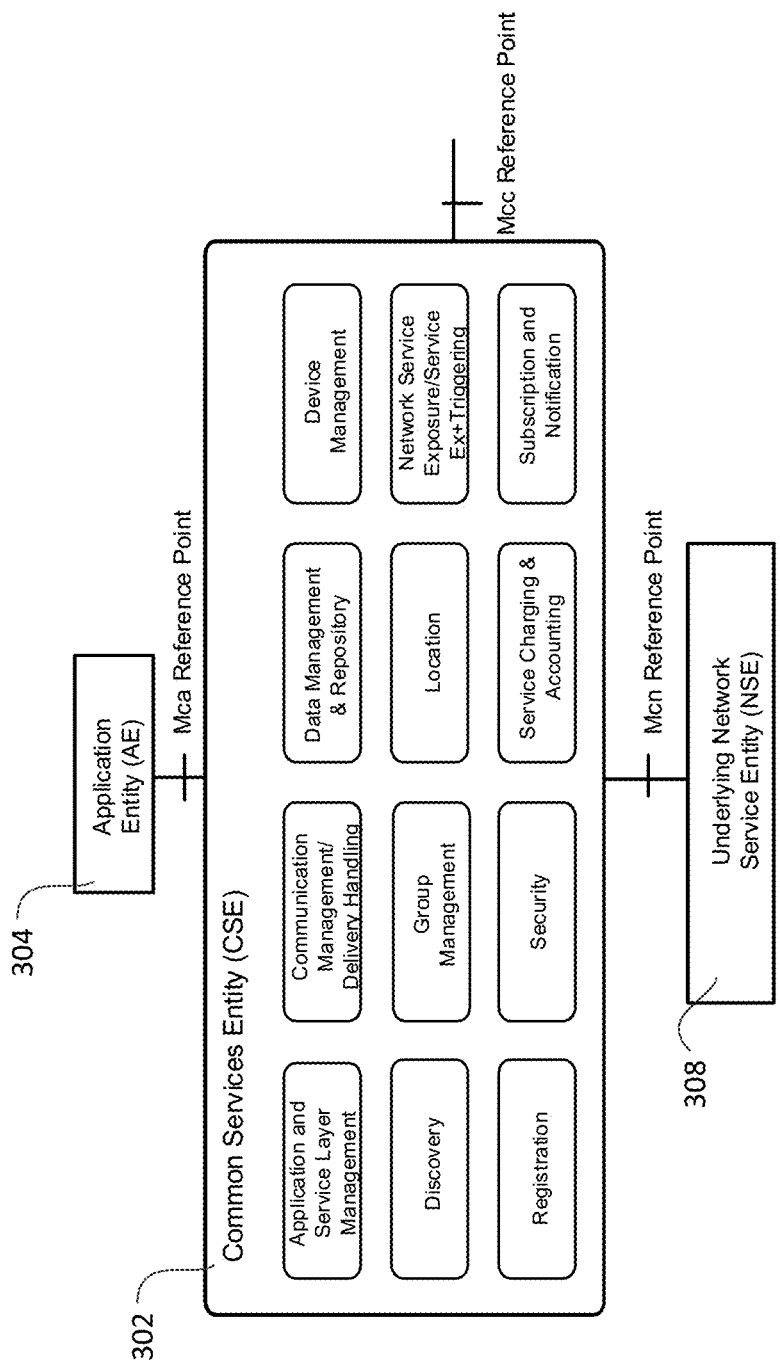
FIG. 4 is a diagram that illustrates oneM2M Common Service Functions.

The oneM2M standard [oneM2M TS-0001] defines an M2M/IoT SL, the purpose of which is to provide "horizontal" services that can be utilized by different "vertical" M2M systems and applications, such as e-Health, fleet management, and smart homes. The architecture of the oneM2M SL, as shown in FIG. 3, defines a Common Service Entity (CSE) 302 that embodies the service layer and supports four reference points. The Mca reference point interfaces with the Application Entity (AE) 304. The Mcc reference point interfaces with another CSE 306 within the same service provider domain and the Mcc' reference point interfaces with another CSE in a different service provider domain. The Mcn reference point interfaces with the underlying network service entity (NSE). An NSE 308 provides underlying network services to the CSEs, such as device management, location services and device triggering. A CSE contains multiple logical functions called "Common Service Functions (CSFs)", such as "Discovery", "Data Management & Repository," which together form the functionality of the service layer. FIG. 4 illustrates the CSFs supported by oneM2M. Each instance of a CSE hosted on a node, server, gateway, device, apparatus, or other logical entity of the communications network may be referred to herein as a service layer entity of the network.

The oneM2M architecture is a distributed architecture and supports deploying M2M/IoT services in a distributed manner across the following types of Nodes:

Application Service Node (ASN): An ASN is a Node that contains one CSE and contains at least one Application Entity (AE). For example, an ASN could reside in an M2M Device.

Application Dedicated Node (ADN): An ADN is a Node that contains at least one AE and does not contain a CSE. For example, an Application Dedicated Node could reside in a constrained M2M Device.

Middle Node (MN): A MN is a Node that contains one CSE and contains zero or more AEs. For example, a MN could reside in an M2M Gateway.

Infrastructure Node (IN): An IN is a Node that contains one CSE and contains zero or more AEs. A CSE in an IN may contain CSE functions not applicable to other node types. For example, an IN could reside in an M2M Service Infrastructure.

Non-oneM2M Node (NoDN): A non-oneM2M Node is a Node that does not contain oneM2M Entities (neither AEs nor CSEs). Such Nodes represent devices attached to the oneM2M system for interworking purposes, including management.

Figure 5:
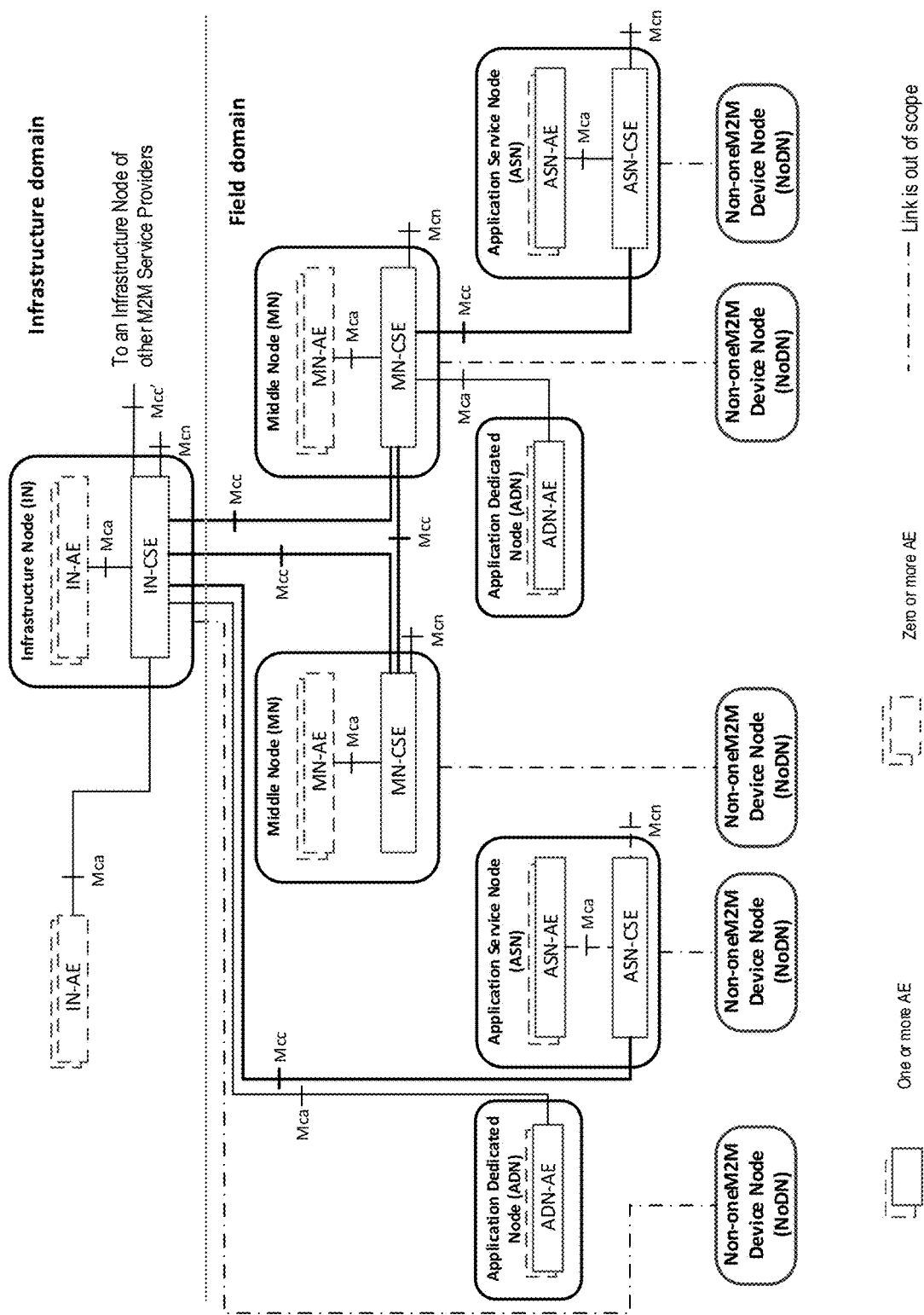
FIG. 5 is a diagram that illustrates configurations supported by oneM2M Architecture.

The possible configurations of inter-connecting the various entities supported within the oneM2M system are illustrated in FIG. 5.

Recently, oneM2M has begun working on defining support for SL transactions. This work is documented in oneM2M TR-0020, Study of service transactions and re-usable service layer context, V0.6.0. To date, one solution has been defined thus far. The following is a summary of this solution.

Figure 6:
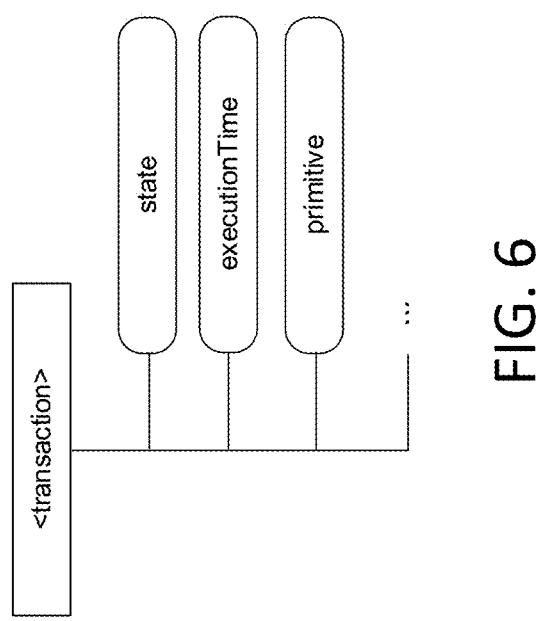
FIG. 6 is a diagram that illustrates oneM2M <transaction> Resource.

A <transaction> resource that can be a child of any other resource. It indicates that the parent resource is the target of a transaction. Based on the state of the <transaction> resource, a oneM2M primitive is executed on the target resource. The structure of the <transaction> resource is shown in FIG. 6 and a description of its attributes is provided in Table 1.

TABLE 1 oneM2M <transaction> Resource Attributes

| Resource Type | Description |
| --- | --- |
| state | The current state of the transaction. It could be<br>Initial state: if the Hosting CSE hasn't determined that the transaction can be executed or not.<br>Reserved state: if the Hosting CSE has finished the checking and guaranteed the transaction can be executed at the given execution time. |

TABLE 1-continued oneM2M <transaction> Resource Attributes

| Resource Type | Description |
| --- | --- |
| | Final state: if the Hosting CSE has successfully executed the transaction. |
| executionTime | The intended execution time of the transaction. The Hosting CSE executes the primitive contained in the <transaction> child resource at the time specified by the attribute. |
| primitive | The attribute is a complex data type that carries the primitive that is operated on the parent resource of the <transaction> resource. The primitive attribute includes information about the operation, originator and the content of the primitive. |

Figure 7:
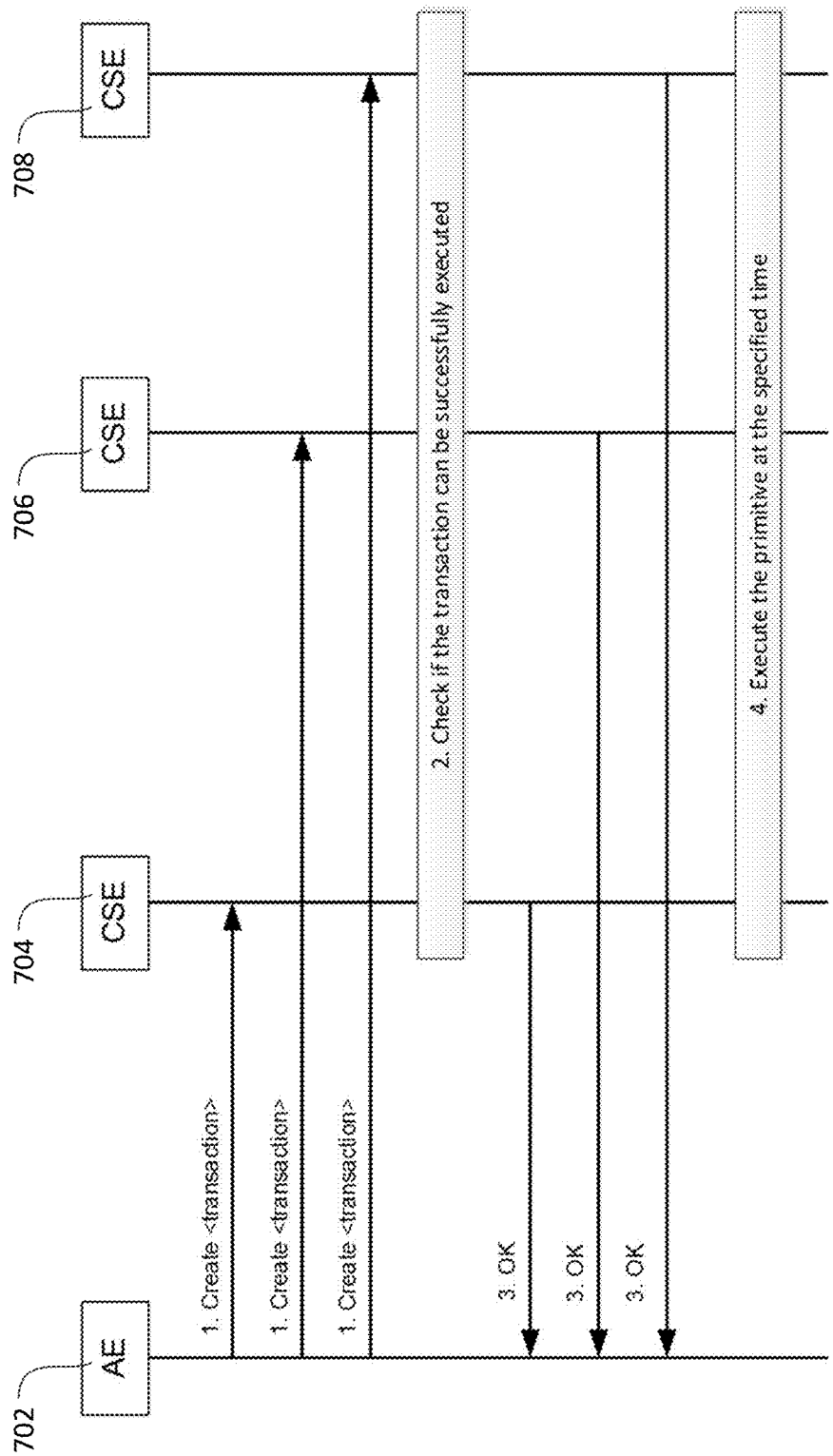
FIG. 7 is a diagram that illustrates oneM2M Transaction Processing (Successful Case).
Figure 8:
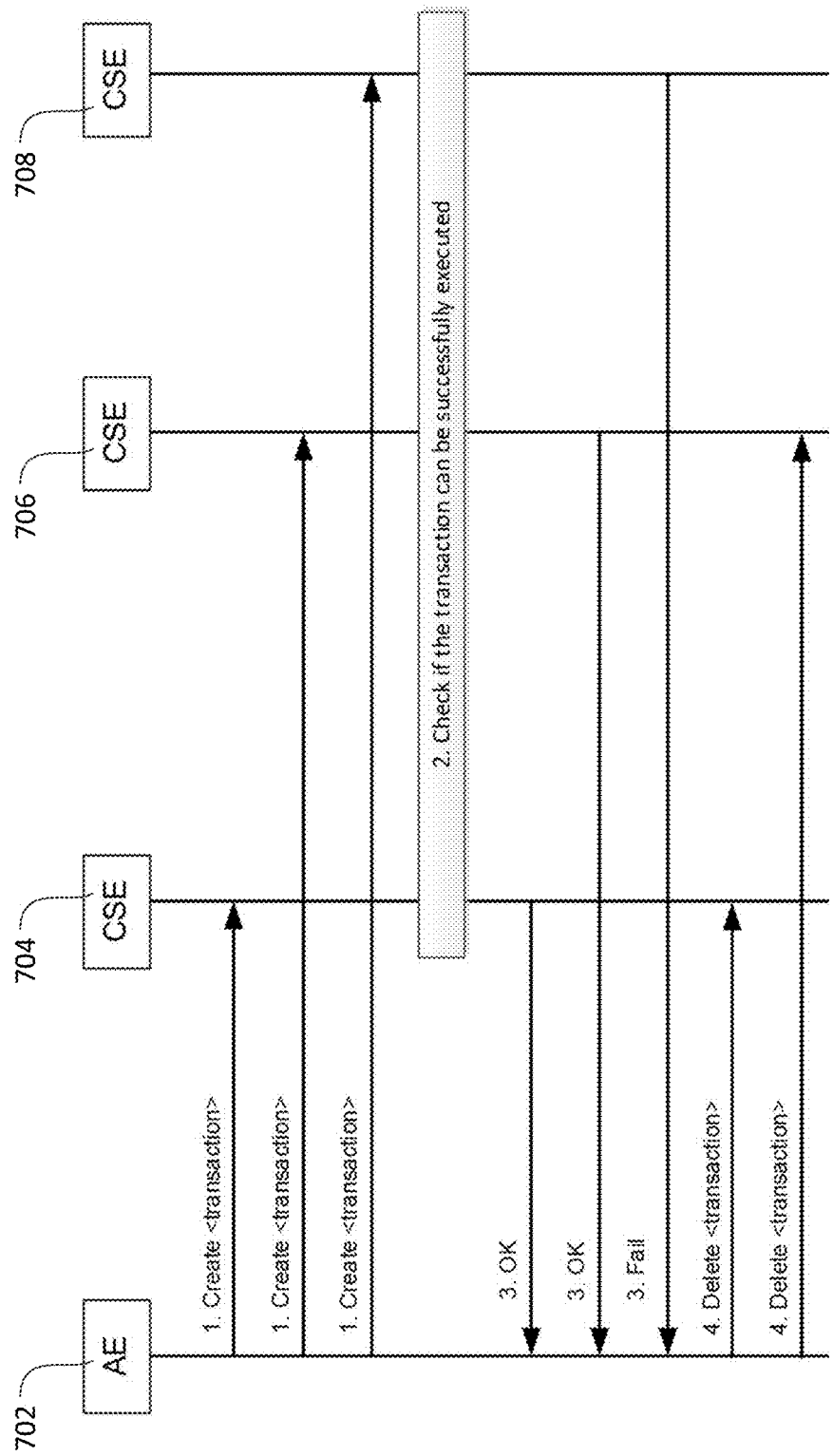
FIG. 8 is a diagram that illustrates oneM2M Transaction Processing (Failure Case).

FIG. 7 and FIG. 8 show the flows of how a transaction is processed using the <transaction> resource in a oneM2M system. FIG. 7 shows oneM2M Transaction Processing in a successful case. FIG. 8 shows oneM2M Transaction Processing in a failure case. This processing involves one AE and multiple CSEs. The AE is responsible for initiating and managing the coordination of the transaction across the multiple CSEs. Detailed descriptions of each of the steps is captured below.

In step 1 of FIGS. 7 and 8, the AE 702 creates a <transaction> resource on multiple CSEs. The <transaction> is created as a child resource of each targeted resource. The <transaction> resource contains the execution time of the transaction as well as the primitive to be executed. The execution time of different CSEs is the same to guarantee the commit of the transaction is coordinated. The primitive further contains the originator's identity, the operation and the content of the primitive to be executed.

In step 2 of FIGS. 7 and 8, at each CSE 704, 706, and 708 that has received the <transaction> creation request, the CSE 704, 706, and 708 checks if the <transaction> can be successfully executed. The checking may include access right checks, checking the format of the primitive is correct, and checking the execution can be performed at the specified time.

In step 3 (Success) of FIG. 7, if the checking is successful, the CSE 704, 706, and 708 responds to the AE 702 that the <transaction> resource was created and that the parent resource of the <transaction> resource has been put into a reserved state. In the reserved state, the resource will refuse any other request that will potentially break the effect of the successful execution of the primitive at the specified execution time.

In step 4 (Success) of FIG. 7, at the specified execution time, each CSE 704, 706, and 708 will execute the corresponding primitive.

In step 3 (Failure) of FIG. 8, if the checking on any CSE fails (in this example, CSE 708), that CSE 708 responds with a failed response to the AE. On receiving any failed responses, the AE 702 determines that the transaction cannot be atomically performed across all CSEs. The AE 702 thus sends a delete request to each CSE (in this example, CSEs 704 and 706) which successfully created a <transaction> resource in order to delete it before the scheduled execution time. This cancels the transaction.

In step 4 (Failure) of FIG. 8, the CSE (in this example, CSEs 704 and 706) which has successfully created the <transaction> deletes the transaction.

Figure 9:
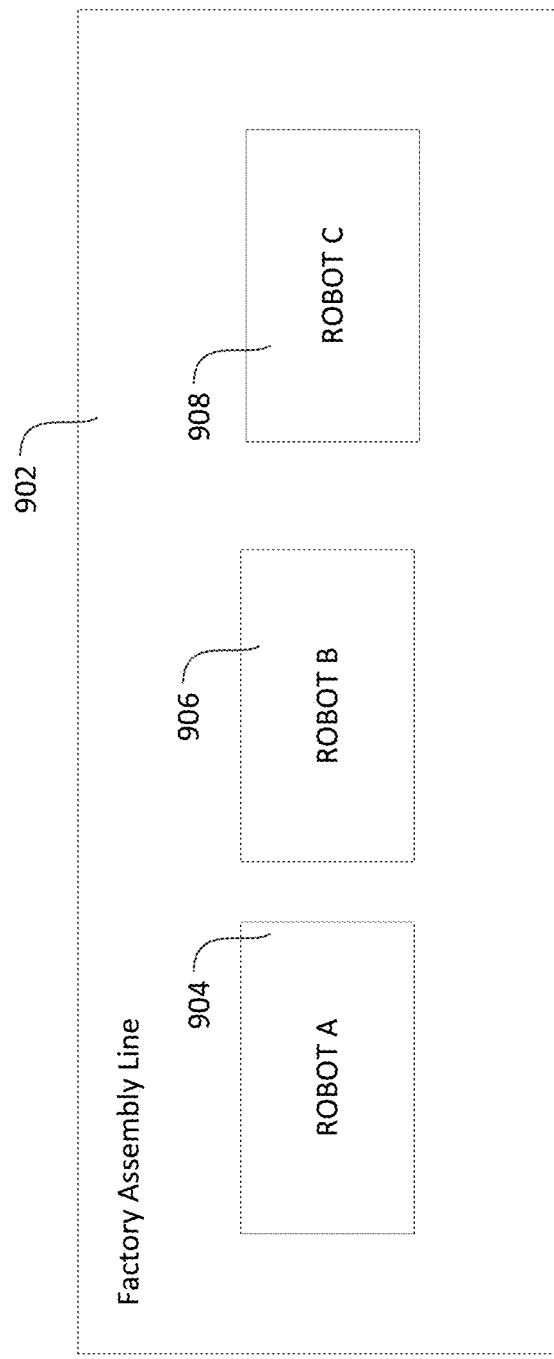
FIG. 9 is a diagram that illustrates a Smart Factory Use Case Demonstrating Usefulness of SL Transaction Management

The following use case is helpful in understanding a need for transaction processing capabilities in an M2M/IoT network. Consider a smart factory use case such as a manufacturing assembly line 902 of FIG. 9 having multiple robots 904, 906, and 908. These robots 904, 906, and 908 must remain tightly synchronized with one another to properly assemble the product being produced by the assembly line. If one of the robot's settings are modified, it typically requires corresponding modifications to be made to the other robots operating on the same assembly line to ensure the robots remain operating in unison with one another. All the assembly lines in the factory are monitored and controlled by engineers from corresponding remote management stations located in the control room of the factory. From these stations, the robots for each respective assembly line can be remotely monitored as well as controlled by engineers. Since it is very costly to shut down an assembly line to perform maintenance on the robots, the factory is looking into ways to minimize the down time and even perform maintenance while the assembly line is still running. To do this, the engineers would like the capability to modify the settings of the robots in a tightly coordinated manner. They would also like the capability to trigger these updates based off the detection that the assembly line robots are no longer operating within a specified normalcy range. When this occurs, the engineers would like to trigger an update to the configuration of the settings of the robots 904, 906, and 908 to correct the situation before it becomes worse. This requires the capability to send a distributed transaction to modify the robot settings based on a trigger event. It also requires to have this transaction update the settings on multiple robots 904, 906, and 908 in an atomic manner such that the robots remain operating in unison and the assembly line continues to function without having to take it down. In doing so, the engineers can be assured that changes to the settings of the robots 904, 906, and 908 only occur if all the robots are able to successfully change their settings. If one or more robots are not able to successfully change their settings, then none of the robot settings are changed. This helps prevent the assembly line from ending up in a state in which the robots are no longer operating in unison. Rather than having to develop complex applications to coordinate the management of these atomic transactions to the robots, the engineers would like to offload this complexity to the transaction management capabilities of an IoT services platform.

To date the complexity and burden of performing atomic transactions targeting a distributed set of resources has fallen squarely on the shoulders of the applications initiating these transactions and the developers building and deploying these applications. With the increased size and complexity of recent IoT network deployments consisting of massive numbers of distributed devices, this burden is becoming even greater for these applications and developers to bear. As result, IoT/M2M service layer technologies such as oneM2M have recently recognized the need to assist applications with the management of distributed transactions.

Thus far, only very basic and minimal SL centric solutions for the management of Distributed Service Layer Transactions (DSLTs) have been defined. For example, the current solution defined in oneM2M [oneM2M TR-0020] still relies heavily upon the application to manage the DSLT. The application is still responsible for initiating each of the individual requests making up the DSLT and sending these requests to the individual targeted resources. The application is also still responsible for monitoring the progress of each of these individual requests to determine whether any of them result in a failure and whether the DSLT as a whole needs to be aborted. If the DSLT needs to be aborted, the application is responsible for keeping track of which of the targets it needs to send a cancellation request to. The application is also responsible for keeping track of an execution time of the DSLT and making sure that the sending of these cancellation requests occurs before this timer expires such that the individual requests making up the DSLT are all cancelled before the execution time elapses. Therefore, there still exists a considerable overhead and burden on the application to manage DSLTs as shown in FIG. 10.

Figure 10:
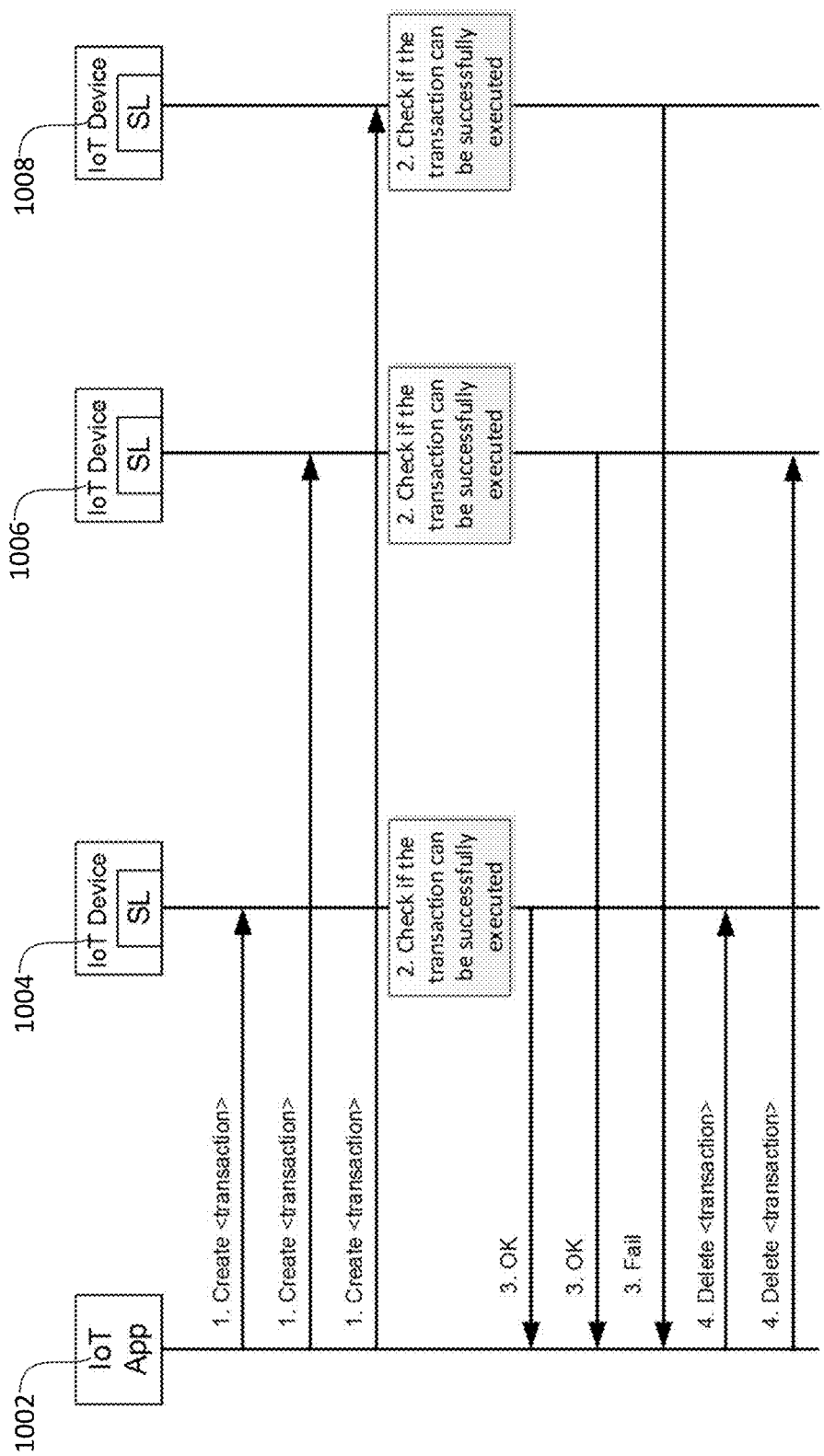
FIG. 10 is a diagram that illustrates a Minimal SL Solution for Distributed Service Layer Transaction (DSLT).

In step 1 of FIG. 10, the application 1002 sends transaction requests to multiple devices 1004, 1006, and 1008.

In step 2 of FIG. 10, the devices 1004, 1006, and 1008 check to see if they can successfully execute the transaction.

In step 3 of FIG. 10, the devices 1004, 1006, and 1008 reply to the application 1002 indicating if they can execute the transaction. In this example, device 1008 is unable to execute the transaction.

In step 4 of FIG. 10, since one of the devices (device 1008) is unable to execute the transaction, the transaction is aborted at the other devices (devices 1004 and 1006).

Described herein is a distributed service layer transaction (DSLT) service that supports DSLT processing capabilities in order to offload applications from the complexity and burden of having to manage the processing of DSLTs themselves. The DSLT processing capabilities may include a capability for a DSLT service to manage on behalf of applications the atomic processing of a DSLT; a capability for a DSLT service to manage on behalf of applications the atomic processing of a sequence of DSLTs; a capability for a DSLT service to coordinate the scheduling of the individual requests that make up a DSLT or sequence of DSLTs; a capability for a DSLT service to enable applications to define execution criteria for a DSLT or sequence of DSLTs; a capability for a DSLT service to enable applications to define retransmission policies for a DSLT or sequence of DSLTs; a capability for a DSLT service to enable applications to define completion criteria for a DSLT or sequence of DSLTs; a capability for a DSLT service to enable applications to define a priority for a DSLT or sequence of DSLTs; and a capability for a DSLT service to provide a simple RESTful API to applications to initiate a DSLT or sequence of DSLTs.

With respect to the capability for the DSLT service to manage on behalf of applications the atomic processing of a DSLT, the service can itself be distributed and may consist of DSLT management functions and DSLT client functions that can be deployed across multiple service layer entities hosted on different network nodes. An application may need only send a single request to the service to initiate a DSLT and receive a response back from the service when the processing of the DSLT is complete. The service may not require the application to communicate with any of the individual DSLT targets or manage the DSLT through its lifecycle. The service may maintain DSLT state during the processing of a DSLT that can be used to provide processing status and enable the rollback of a DSLT in the event of failures. The service may manage the successful dissemination and execution of the distributed set of individual requests associated with a DSLT such that in the event of any failures it can perform the roll back and aborting of individual requests such that atomicity requirements of the DSLT can be met.

With respect to the capability of the DSLT service to manage on behalf of applications the atomic processing of a sequence of DSLTs, the sequence of DSLTs may consist of a set of DSLTs that can be ordered and performed by the service in an atomic manner on behalf of the applications. The service may manage the successful execution of the sequence of DSLTs such that in the event of any failures it can perform the roll back and aborting of the sequence such that atomicity requirements of the sequence can be met.

With respect to the capability of the DSLT service to support a configurable DSLT policy engine, the policy engine may be configured by a programmable set of DSLT policies. The policy engine may support DSLT policies such as scheduling policies, retry policies, prioritization policies, execution criteria policies, completion criteria policies, and sequencing polices. The DSLT policies may define rules that control how the service processes DSLTs.

With respect to the capability of the DSLT service to coordinate the scheduling of the individual requests that make up a DSLT or sequence of DSLTs such that they are performed in a time window that meets the application's requirements and also meets the requirements of the DSLT targets (e.g. IoT devices that only have intermittent network connectivity), the service may coordinate the reachability schedules of IoT devices which are the targets DSLTs to help ensure that all the required devices are online and available such that a DSLT can be performed successfully to all of its targeted devices and meet the atomic execution requirements of the DSLT. The service may ensure that multiple DSLTs or DSLT sequences that target the same resource(s) do not execute simultaneously since each must obtain a lock on their target resource(s) to ensure their corresponding transactions are performed in isolation and not interfered with.

With respect to the capability of the DSLT service to enable applications to define execution criteria for a DSLT or sequence of DSLTs. The execution criteria may be used by the service to trigger as well as qualify if and when the execution of the DSLT(s) is to occur. The execution criteria may include a threshold/value for one or more specified SL attributes or metadata, SL defined events based on the analysis of historical as well current conditions such as the state of one or more devices or the state of one or more resources state, an external trigger condition that the SL receives or detects from an application or 3rd party service or underlying network, or the successful completion of another SL transaction.

With respect to the capability of the DSLT service to enable applications to define retransmission policies for a DSLT or sequence of DSLTs. The retransmission policies may be used by the service to qualify if and when the failed execution of the DSLT(s) is to result in the service retrying the DSLT(s).

With respect to the capability for a DSLT service to enable applications to define completion criteria for a DSLT or sequence of DSLTs. The completion criteria may be used by the service to qualify if and when the execution of the DSLT(s) is successful or not depending on the results of the individual requests making up the DSLT(s). For example, successful completion may require completion within a certain time window or some DSLTs may only require a subset of the requests to complete successfully while others may require all of them to be successful.

With respect to the capability of the DSLT service to enable applications to define a priority for a DSLT or sequence of DSLTs, the priority may be used by the service to rank DSLT(s) with respect to one another and order their execution based on this ranking if and when needed (e.g. when DSLTs share the same targets and their execution must be serialized).

With respect to the capability of the DSLT service to provide a simple RESTful API to applications to initiate a DSLT or sequence of DSLTs, the API can define a SL transaction identifier for each DSLT. The API may define a SL sequence identifier for a sequence of DSLTs. And, the API can support the capability for non-blocking requests from applications to initiate, query the status or abort a DSLT or sequence of DSLTs.

Figure 11:
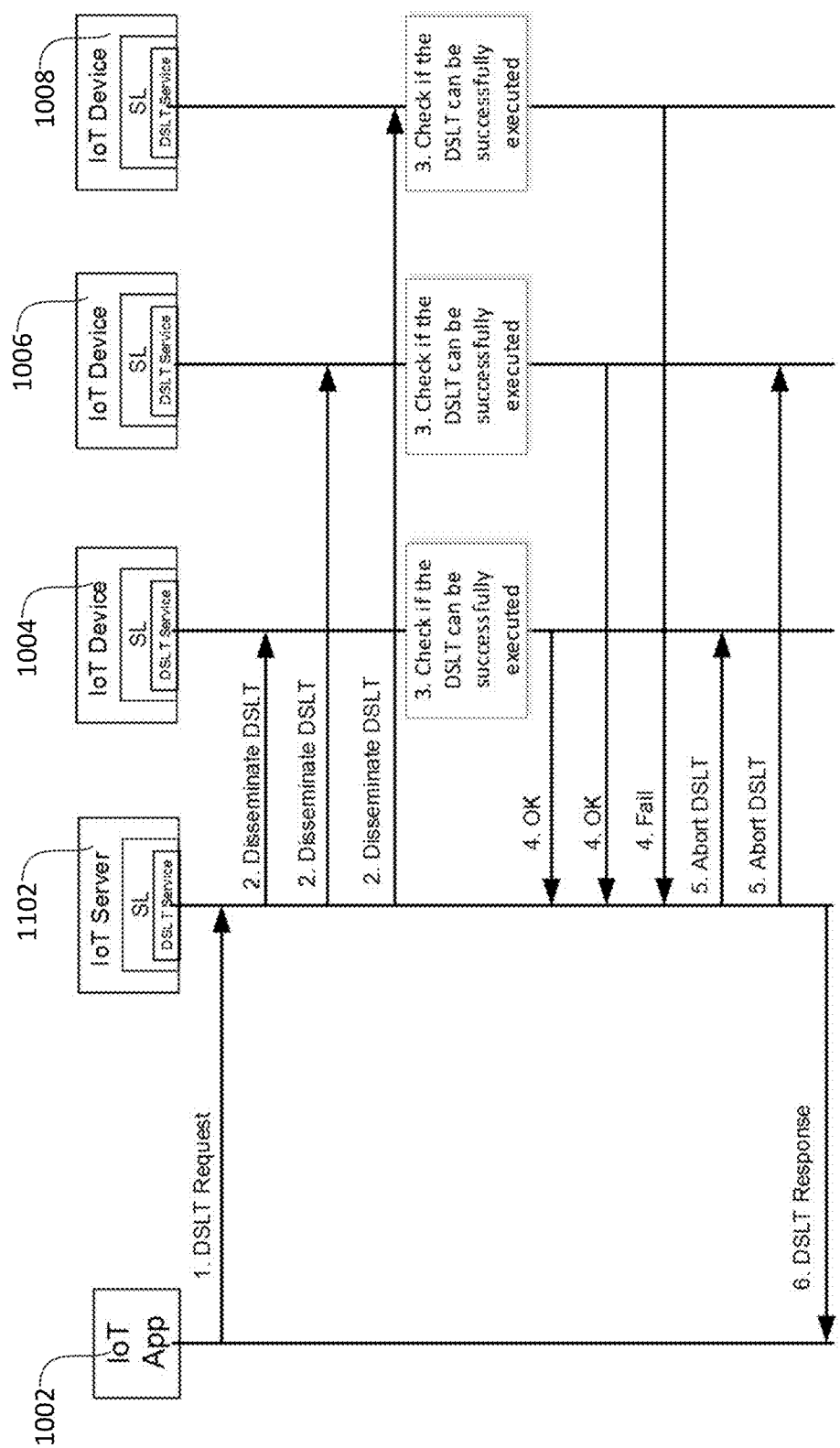
FIG. 11 is a diagram that illustrates a Complete SL Solution for DSLT.

FIG. 11 illustrates the reduction in complexity that may be achieved with the disclosed DSLT service from the perspective of an application.

In step 1 of FIG. 11, the application 1002 sends a request for a transaction to a server 1102. The server 1102 may be an IoT server 1102 with a service layer containing the DSLT service. The server 1102 is responsible for the management of the transaction. By shifting the management of the transaction to the server 1102 from the application 1002 (as is done in FIG. 10) operations at the application 1002 can be simplified.

In step 2 of FIG. 11, the server 1102 disseminates the DSLT request to multiple devices 1004, 1006, and 1008.

In step 3 of FIG. 11, the devices 1004, 1006, and 1008 check to see if they can successfully execute the transaction.

In step 4 of FIG. 11, the devices 1004, 1006, and 1008 reply to the server indicating if they can execute the transaction. In this example, one of the devices (device 1008) is unable to execute the transaction.

In step 5 of FIG. 11, since one of the devices (device 1008) is unable to execute the transaction, the transaction is aborted at the other devices (device 1004 and 1006).

In step 6 of FIG. 11, the server 1102 sends a response to the application 1002.

Comparing FIG. 11 to FIG. 10, the overhead and complexity on the IoT Application 1002 of managing a DSLT has been greatly reduced. With the described DSLT service, an IoT application 1002 can perform a DSLT with a single request and response whereas in existing solutions it requires more messages and more internal logic to manage the state of each transaction.

Further details of the disclosed DSLT service are described hereinafter.

DSLT Architecture

In one embodiment, a DSLT service may comprise a Distributed Service Layer Transaction Trigger Function (DSLT-TF) 1202, a Distributed Service Layer Transaction Management Function (DSLT-MF) 1204 and 1206 and a Distributed Service Layer Transaction Client Function (DSLT-CF) 1208, 1210, 1212, and 1214.

A DSLT-TF 1202 may be used to initiate a DSLT trigger request (DSLT-TRIGGER) 1216 to the DSLT-MF 1204 such that the DSLT-MF 1204 may disseminate and manage the DSLT-REQs 1218. A DSLT-TF 1202 is meant to be a lightweight and thin function that may be hosted on various types of network nodes such as IoT servers, IoT gateways, IoT devices and IoT applications.

The DSLT-MF 1204 (and 1206) may be implemented as a service. The service may either be a standalone service or implemented as a sub-service of an IoT Service Layer. The DSLT-MF service 1204 may be hosted on various types of network nodes such as IoT servers, IoT gateways and IoT devices. The DSLT-MF service 1204 may receive requests to trigger the dissemination and processing of DSLTs to a distributed set of DSLT-CFs. Each DSLT-TRIGGER received by the DSLT-MF 1204 may consist of one or more SL operations targeting one or more targets. The DSLT-MF 1204 processes a DSLT-TRIGGER 1216 by processing all of its associated SL requests in an atomic manner. If required, the DSLT-MF 1204 ensures the SL Request(s) specified by the DSLT-TRIGGER 1216 are properly disseminated to a distributed set of SL entities and successfully executed by all the targeted SL entities or in the case of failures, not executed by any of them. For clarity, a DSLT request disseminated from a DSLT-MF 1204 to a DSLT-CF 1208 and 1210 is referred to as a DSLT-REQ 1218.

A DSLT-CF 1210 serves as a target and processes a disseminated DSLT-REQ 1218 it receives from the DSLT-MF 1204. A DSLT-CF 1208 may be hosted on various types of network nodes such as IoT servers, IoT gateways, IoT devices and IoT applications.

Figure 12:
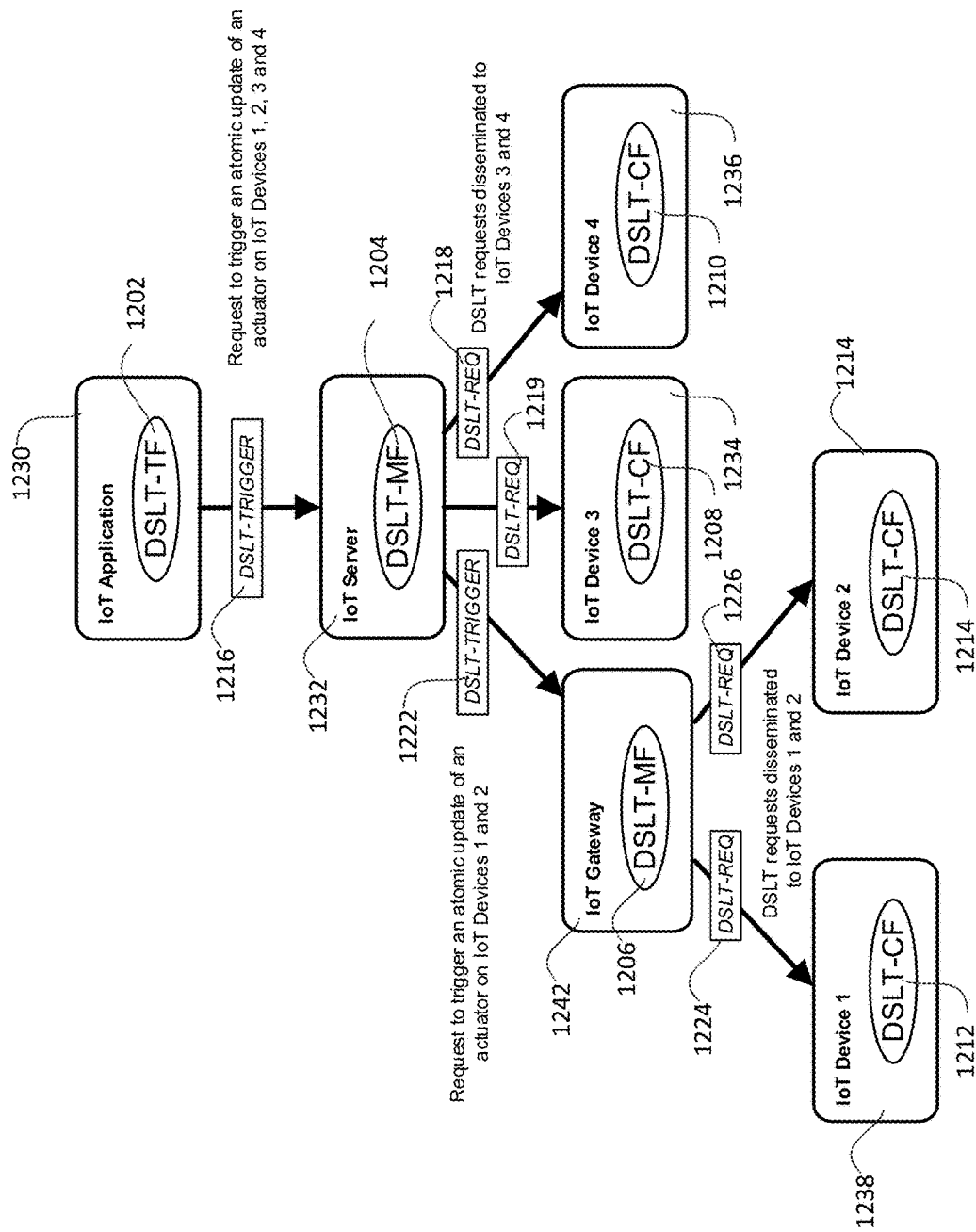
FIG. 12 is a diagram that illustrates DSLT deployment options.

For example as shown in FIG. 12, an IoT application 1230 supporting a DSLT-TF 1202 may send a DSLT-TRIGGER 1216 to a DSLT-MF 1204 hosted on an IoT Server 1232 to have it disseminate a set of atomic DSLT-REQs 1218 and 1219 to update an actuator (e.g. an electronic switch) on a distributed set of IoT devices 1234 and 1236. The DSLT-MF 1204 may in turn disseminate the DSLT-REQs 1218 and 1219 to the DSLT-CFs 1208 and 1210 hosted on each device and also ensure that all of them either successfully perform the DSLT-REQs 1218 and 1219 to update their actuators or none of them perform the update. In doing so, the settings on all the devices remain consistent.

In the case of a multi-hop scenario such as the one involving the IoT Gateway and IoT Device 1238 and 1240 as shown in FIG. 12, the DSLT-MF 1206 on the IoT Gateway 1242 may be used to receive a disseminated DSLT-TRIGGER 1222 from the IoT Server's DSLT-MF 1204. Upon detection that the that DSLT-TRIGGER targets resources hosted by IoT Device 1238 and 1240, the IoT Gateway's DSLT-MF 1206 may be used to disseminate DSLT-REQs 1224 and 1226 to both IoT Devices' DSLT-CFs 1212 and 1214. This shows the distributed nature of the DSLT service and how multiple DSLT-MFs may be used to atomically process DSLTs throughout the system.

A DSLT-TF 1202 may support the capability to initiate DSLT requests to a DSLT-MF 1204 and receive DSLT responses in return from the DSLT-MF 1204. It is not required to support any other DLST processing capabilities.

Figure 13:
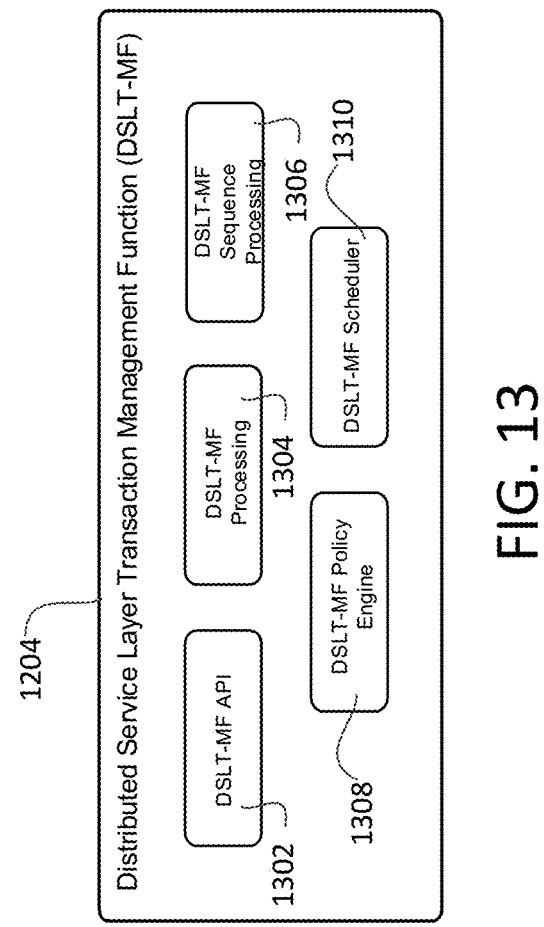
FIG. 13 is a diagram that illustrates a Distributed Service Layer Transaction Management Function (DSLT-MF).

A DSLT-MF 1204 may support several capabilities for processing DSLTs. A set of DSLT-MF capabilities is shown in FIG. 13. The DSLT-MF 1204 may include a DSLT-MF API 1302, DSLT-MF Processing 1304, DSLT-MF Sequence Processing 1306, DSLT-MF Policy Engine 1308 and DSLT-MF Scheduler 1310.

Figure 14:
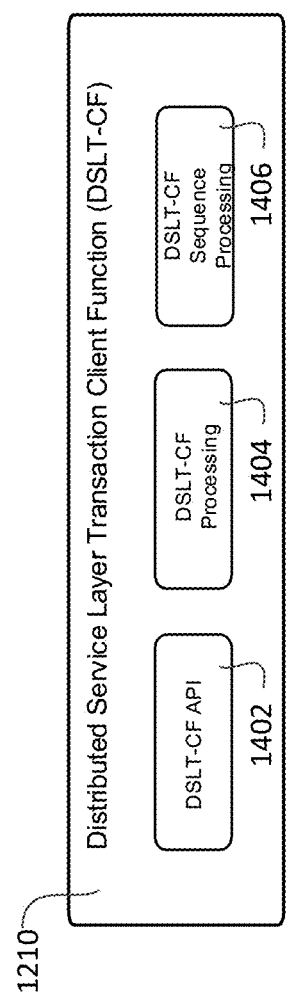
FIG. 14 is a diagram that illustrates a Distributed Service Layer Transaction Client Function (DSLT-CF).

Similarly, a DSLT-CF 1210 may support a corresponding set of capabilities for processing DSLTs as shown in FIG. 14. The DSLT-CF 1210 may include a DSLT-CF API 1402, DSLT-CF Processing 1404, and DSLT-CF Sequence Processing 1406.

The following sub-sections provide further definition of each of the DSLT-MF 1204 and DSLT-CF 1210 capabilities.

DSLT APIs

A DSLT-MF 1204 may support an API 1302 that may be used by DSLT-TFs to initiate DSLT related requests to a DSLT-MF 1204. The types of supported requests may include initiating a new DSLT (i.e. DSLT-TRIGGER), querying on the status of an existing DSLT (i.e. DSLT-QUERY) and aborting an outstanding DSLT (DSLT-ABORT). The API 1302 may also be used to configure policies that define rules to control how the DSLT-MF processes and schedules DSLTs. This API 1302 may be supported as a RESTful interface consisting of DSLT related message parameters and/or resources hosted by the DSLT-MF 1204.

A DSLT-CF 1210 may support an API 1402 as well. This API 1402 may be used by a DSLT-MF 1204 to send DSLT related requests to a DSLT-CF 1210. The types of supported requests may include forwarding a new DSLT to the DSLT-CF 1210 (i.e. DSLT-REQ), querying on the status of an existing DSLT (DSLT-QUERY) and aborting an outstanding DSLT that the DSLT-CF 1210 is processing (DSLT-ABORT). This API 1402 may be supported as a RESTful interface consisting of DSLT related message parameters and/or resources hosted by the DSLT-CF 1210.

DSLT API Resources:

In one example, the following types of resources may be supported by a DSLT-MF 1204.

TABLE 2

DSLT API Resource Types

| Resource Type | Description |
| --- | --- |
| DSLT | An instance of this resource may be created and hosted by a DSLT-MF when it receives a DSLT-TRIGGER request from a DSLT-TF to initiate a new DSLT. Likewise, an instance of this resource may be created and hosted by a DSLT-CF when it receives a DSLT-REQ request disseminated to it from a DSLT-MF. This resource may enable a DSLT to be processed in a non-blocking manner by a DSLT-MF and/or DSLT-CF. Once created, this resource may be used to store the state of a DSLT, check on its status while it is being processed, retrieve its results, subscribe and receive notifications when processing has completed and when an abort/rollback occurs. |
| DSLT Sequence | An instance of this resource may be created and hosted by a DSLT-MF when it receives a DSLT-SEQ-TRIGGER request from a DSLT-TF or another DSLT-MF to initiate a new sequence of DSLTs. The DSLT-MF may then manage the execution of the sequence of DSLTs on behalf of the request Originator. Once created, this resource may be used to store the state of a sequence, check on the status of a sequence while it is being processed, retrieve the results of the sequence, subscribe and receive notifications when the sequence processing has completed, abort and/or rollback the sequence. This resource also enables a sequence to be processed in a non-blocking manner. |
| DSLT Policy | A resource to allow a DSLT-MF to be configured with one or more policies defining DSLT processing rules. DSLT processing rules may include:<br>    DSLT scheduling policies<br>    DSLT retry policies<br>    DSLT prioritization policies<br>    DSLT execution criteria policies<br>    DSLT completion criteria policies<br>    DSLT Sequencing polices |
| DSLT Dissemination | A resource that is hosted by a DSLT-MF or that is accessible to a DSLT-MF such that it may be used to disseminate DSLT requests to targeted DSLT-CFs. This resource may be configured with a list of identifiers of DSLT-CFs or SL entities hosting DSLT-CFs. When a DSLT-TRIGGER request targets this resource, the DSLT-MF may disseminate a DSLT-REQ to each of the corresponding DSLT-CFs. The DSLT-MF may then manage the execution of the disseminated DSLT-REQs on behalf of the request Originator. |

DSLT API Message Parameters

DSLT message parameters may be applicable to the various types of DSLT messages such as DSLT-TRIGGER, DSLT-SEQ-TRIGGER, DSLT-REQ, DSLT-QUERY and DSLT-ABORT. These various DSLT message types may be mapped to a RESTful API in which each DSLT message type may be implemented using a CRUD operation and some DSLT message parameters.

TABLE 3

DSLT Message Parameters

| Parameter | Description |
|---|---|
| DSLT Request ID | Unique identifier associated with a DSLT request |
| DSLT Operation | An operation to be performed by the targets of a DSLT. DSLT operations may include Create, Retrieve, Update, Delete, Subscribe, Notify and Discover. |
| DSLT Targets | One or more SL entities that are the targets of a DSLT and that host a DSLT-CF. |
| DSLT Schedule | The time when a DSLT is to be executed. Some time formats may include a specific time (e.g. today at 5pm) or a re-occurring/periodic time (e.g. every Monday at 5pm) |
| DSLT Priority | A specified priority that may be used by the DSLT-MF or DSLT-CF to prioritize the scheduling and execution of a DSLT with respect to other DSLTs being processed. Some priority values may include High, Med and Low. |
| Number of DSLT Retries | The maximum number of times that a DSLT-MF is to attempt retrying a DSLT in the event that the DSLT processed by a DSLT-CF is not successful. |
| DSLT Execution Criteria | The criteria used by the DSLT-MF to determine whether or not to schedule the execution of a DSLT. Some execution criteria may include:<br>A threshold/value for one or more specified SL attributes or metadata,<br>A SL defined event based on the analysis of historical as well as current conditions such as the state of one or more devices or the state of one or more resources state.<br>An external trigger condition that the SL receives or detects from an application or 3rd party service or underlying network<br>The successful completion of another SL transaction. |
| DSLT Completion Criteria | The criteria used by the DSLT-MF to determine whether or not the execution of a DSLT is successful or not. Completion criteria may include:<br>A specified window of time in which the processing of DSLT must complete within<br>Whether or not all disseminated requests to DSLT specified targeted resources must complete successfully or not for the successful completion of the DSLT. If not, then a list of mandatory targets and/or optional targets may be specified.<br>If any specified completion criteria cannot be met, a DSLT-MF can choose to roll back the execution of a DSLT. |

In addition to a single DSLT request, two or more DSLTs may be combined to form a DSLT sequence. A DSLT sequence specifies an ordered list of DSLTs. Multiple DSLTs may be batched together into a single SL request or alternatively a sequence of DSLTs may be associated with one another using a DSLT sequence identifier having the same value. Together a DSLT-MF 1204 and DSLT-CF(s) 1210 and 1208 may atomically process and execute a DSLT sequence. The processing includes the atomic execution of the individual DSLTs as well as the atomic processing of the entire sequence. Hence if any of the individual DSLTs do not successfully complete, the DSLT-MF 1204 and DSLT-CF 1210 and 1208 may support the rollback of all the DSLTs in the sequence such that any resources targeted by the DSLT sequence are returned to their same original state they were in before the execution of the DSLT sequence began.

The following is a set of message parameters related to a DSLT sequence.

TABLE 4

DSLT Sequence Message Parameters

| Parameter | Description |
|---|---|
| DSLT Sequence ID | Unique identifier associated with a DSLT sequence |
| List of DSLTs | A list of DSLTs that are to be performed as part of an atomic sequence of DSLTs by the DSLT-MF and DSLT-CFs. This list may be ordered to specify the sequence in which the DSLTs |

TABLE 4-continued

DSLT Sequence Message Parameters

| Parameter | Description |
| --- | --- |
| | must be atomically executed with respect to one another. Alternatively, DSLTs may be kept as separate SL messages and associated with one another using the same DSLT Sequence ID value. In this case, a unique and incrementing DSLT Sequence Number may be assigned to each DSLT in the sequence. |
| DSLT Sequence Number | This field is used when DSLTs are kept in separate SL messages and not batched together into a single SL message. In this case, the individual DSLT-REQ messages have a DSLT Sequence ID with the same value. This field defines the order in which DSLT-REQs in the same sequence should be processed with respect to each other. |
| DSLT Sequence Schedule | The time when the DSLT-MF or DSLT-CFs are to start executing the sequence and/or is to execute individual DSLTs in the sequence. This time may be formatted in terms of specific times (e.g. today at 5pm) or as re-occurring/periodic times (e.g. every Monday at 5pm) |
| DSLT Sequence Priority | A specified priority (e.g. High, Med, Low) that may be used by the DSLT-MF or DSLT-CFs to prioritize the scheduling and execution of DSLTs in a sequence with respect to other DSLTs not in a sequence. |
| Number of DSLT Sequence Retries | The maximum number of times that DSLT-MF is to attempt retrying a DSLT sequence in the event that one or more DSLTs in the sequence are not successful. |
| DSLT Sequence Execution Criteria | The criteria used by the DSLT-MF to determine whether or not to schedule the execution of a DSLT sequence. Execution criteria may include: <br> A threshold/value for one or more specified SL attributes or metadata, <br> A SL defined event based on the analysis of historical as well as current conditions such as the state of one or more devices or the state of one or more resource states. <br> An external trigger condition that the SL receives or detects from an application or 3rd party service or underlying network <br> The successful completion of another SL transaction or sequence. |
| DSLT Sequence Completion Criteria | The criteria used by the DSLT-MF to determine whether or not the execution of a DSLT Sequence is successful or not. Completion criteria may include: <br> A specified window of time in which the processing of the DSLT sequence must complete within <br> Whether or not all DSLTs in the sequence must complete successfully or not for the successful completion of the DSLT sequence. If not, then a list of mandatory DSLTs and/or optional DSLTs may be specified. <br> If any specified completion criteria cannot be met, a DSLT-MF may choose to roll back the execution of a DSLT sequence. This completion criteria may be tied together with the DSLT priority defined above. For example, for a HIGH priority DSLT-TRIGGER request, all DSLT-REQs must execute successfully while a LOW priority DSLT-TRIGGER request at least one DSLT-REQ must execute successfully. |

DSLT API Identifiers

A SL identifier for an individual DSLT is shown in Table 7. An identifier for a sequence of DSLTs is shown in Table 6. The structure of these DSLT identifiers may consist of multiple components as shown in Table 5. Identifiers may consist of a Service Provider component (SP-ID), a DSLT-MF component (DSLT-MF-ID), DSLT sequence component (DSLT-SEQ-ID), a DSLT component (DSLT-ID), and SL Request ID component (SL-REQ-ID).

Depending on where in a system a DSLT is being used, different formats and uniqueness requirements may exist. For example, if a DSLT is only used to target DSLT-CFs hosted within the same IoT Service Provider domain as the DSLT-MF 1204 is hosted in, then the uniqueness requirements of the DSLT identifier may not require an SP-ID component. Whereas if a DSLT is targeting DSLT-CFs hosted in a different IoT Service Provider domain than the DSLT-MF 1204, then a DSLT may require an identifier that is unique across SL instances and across Service Provider domains and include an SP-ID.

TABLE 5

DSLT Identifier Components

| Field Name | Description |
| --- | --- |
| SP-ID | A unique identifier associated with an IoT/M2M Service Provider. <br> This should be configured with the identifier of the IoT/M2M Service Provider associated with the DSLT-MF that assigns a DSLT-ID to a DSLT. |
| DSLT-MF-ID | A unique identifier associated with a DSLT-MF instance (i.e. the DSLT Service instance). This is configured with the identifier of the DSLT-MF that assigns a DSLT-ID to a DSLT or DSLT-SEQ-ID to a DSLT sequence. |

TABLE 5-continued

DSLT Identifier Components

| Field Name | Description |
| --- | --- |
| DSLT-SEQ-ID | A unique identifier assigned to a DSLT sequence by a DSLT-MF. |
| DSLT-ID | A unique identifier assigned to an instance of a DSLT request by a DSLT-MF. |

TABLE 6

DSLT Sequence Identifier Formats

| DSLT Sequence ID Format | Description |
| --- | --- |
| DSLT-MF Relative | [DSLT-SEQ-ID] |
| Service Provider Relative | [DSLT-MF-ID]/[DSLT-SEQ-ID] |
| Absolute | [SP-ID]/[DSLT-MF-ID]/[DSLT-SEQ-ID] |

TABLE 7

DSLT Identifier Formats

| DSLT ID Format | Description |
| --- | --- |
| DSLT-MF Relative | [DSLT-SEQ-ID]/[DSLT-ID] |
| Service Provider Relative | [DSLT-MF-ID]/[DSLT-SEQ-ID]/[DSLT-ID] |
| Absolute | [SP-ID]/[DSLT-MF-ID]/[DSLT-SEQ-ID]/[DSLT-ID] |

DSLT Processing Capability

A method for processing an individual DSLT and a method for processing a sequence of DSLTs is described below. Each of these methods has actions that are performed by a DSLT-TF 1202, DSLT-MF 1204 and DSLT-CF 1210. The respective actions are clarified in the descriptions below.

Individual DSLT Processing

An individual DSLT may consist of one DSLT that is initiated by a DSLT-TF 1202 sending a DSLT-TRIGGER request 1216 to a DSLT-MF 1204. A DSLT-MF 1204 then processes the DSLT-TRIGGER request 1216. This processing may involve the DSLT-MF 1204 disseminating multiple DSLT-REQs 1218 and 1219 to a distributed set of SL entities that are the targets of the DSLT. Each SL entity receiving a DSLT-REQ hosts a DSLT-CF 1208 and 1210 that is able to process a DSLT-REQ. The DSLT-MF 1204 manages the disseminated set of DSLT-REQs 1219 and 1218 to ensure they are processed in an atomic manner. When complete, the DSLT-MF 1204 returns a response to the DSLT-TF 1202 that originated the DSLT-TRIGGER request 1216. This response includes the results of the DSLT.

The overall method for processing an individual DSLT may be sub-divided into three complimentary methods that consist of the DSLT-TF 1202 that initiates the DSLT, the DSLT-MF 1204 that manages the processing of the DSLT and the DSLT-CFs 1208 and 1210 which performs the operations specified the DSLT on targeted resources. Descriptions of each these methods is captured in the following flow diagrams.

Figure 15:
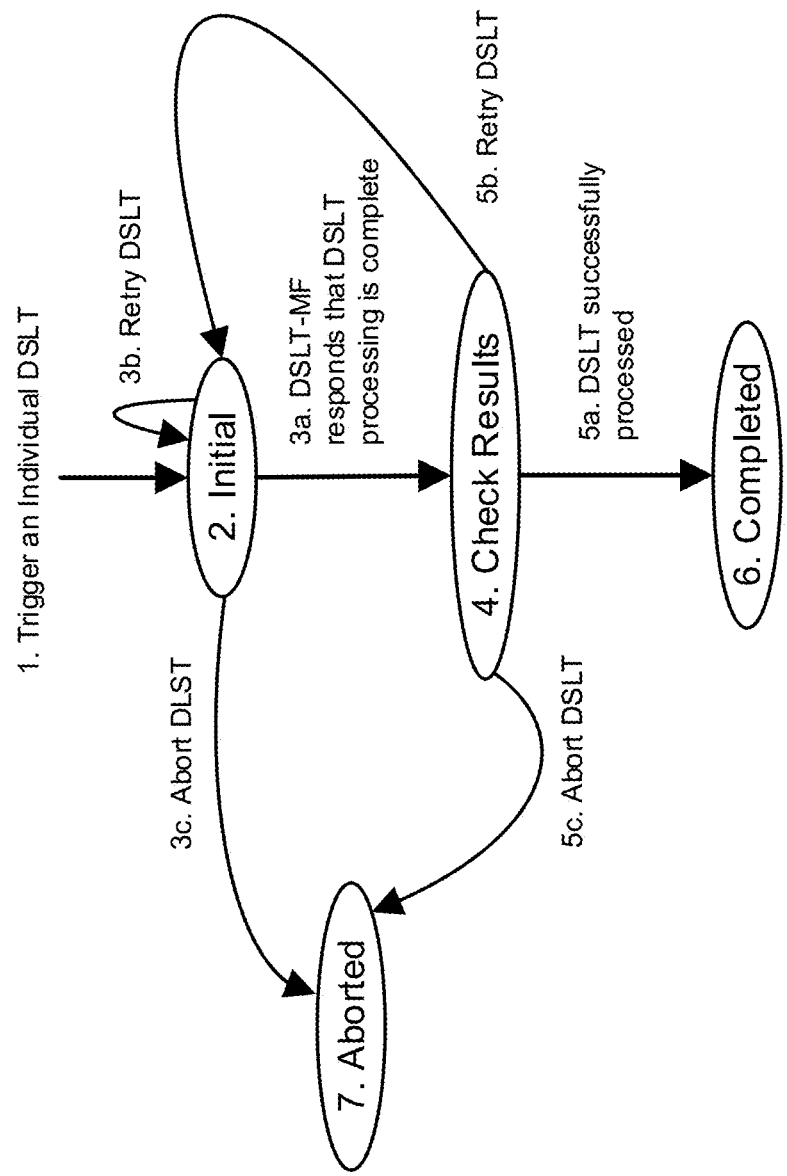
FIG. 15 is a diagram that illustrates DSLT-TF processing for an individual DSLT.

FIG. 15 shows DSLT-TF Processing for an Individual DSLT,

In step 1 of FIG. 15, a DSLT trigger condition (e.g., an application specific event) occurs on a SL entity (e.g., an application) 1230 that hosts a DSLT-TF 1202.

In step 2 of FIG. 15, the DSLT-TF 1202 generates a DSLT-TRIGGER request and sends the request to a SL entity hosting a DSLT-MF 1204 such that the DSLT-MF 1204 may perform DSLT processing on its behalf. The DSLT-TF 1202 waits for the DSLT-MF 1204 to respond back indicating that DSLT processing is complete.

In step 3a of FIG. 15, the DSLT-MF 1204 responds back to the DSLT-TF 1202 that DSLT processing is complete and includes the status of this processing.

In step 3b of FIG. 15, the DSLT-TF 1202 times out waiting for a response from the DSLT-MF 1204. The DSLT-TF 1202 retries the DSLT by re-sending the DSLT-TRIGGER to the DSLT-MF 1204.

In step 3c of FIG. 15, the DSLT-TF 1202 decides to abort the DSLT request. This decision could be the result of a time out after which the DSLT-TF 1202 decides it does not want to retry. Or this decision could be based on other factors such as an application specific reason.

In step 4 of FIG. 15, the DSLT-TF 1202 checks the DSLT results returned to it by the DSLT-MF 1204.

In step 5a of FIG. 15, the DSLT was successfully processed by the DSLT-MF 1204. The DSLT-TF 1202 may consider the DSLT complete.

In step 5b of FIG. 15, the DSLT was not successfully processed. The DSLT-TF 1202 decides to retry the DSLT by re-issuing the DSLT-TRIGGER request to the DSLT-MF 1204 to have it re-attempt the processing of the DSLT again.

In step 5c of FIG. 15, the DSLT was not successfully processed. Rather than retry, the DSLT-TF 1202 decides to abort the DSLT request.

In step 6 of FIG. 15, the DSLT was successfully processed and the DSLT-TF 1202 returns the results to the entity that invoked the DSLT trigger request (e.g., the application).

In step 7 of FIG. 15, the DLST-TF has decided to abort the DSLT. Depending on whether or not the DSLT-TF 1202 has received a response or not from the DSLT-MF 1204, the DSLT-TF 1202 may decide to send an abort request to DSLT-MF 1204 to notify it that it has decided to abort the DSLT.

Figure 16:
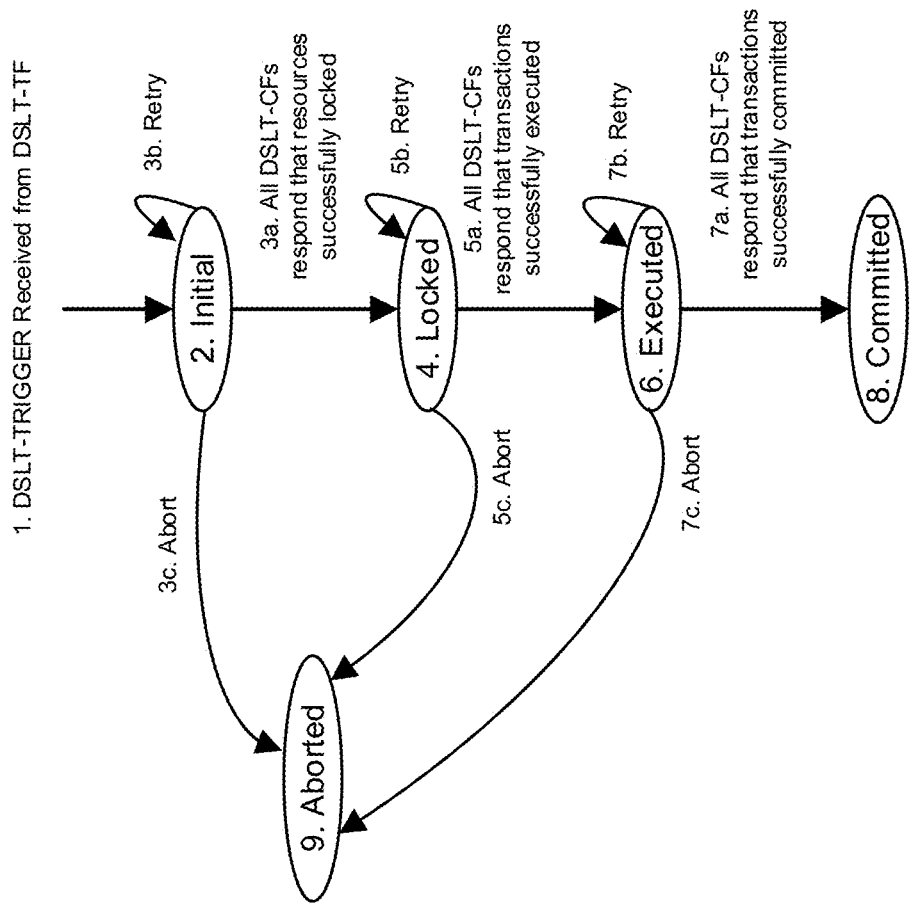
FIG. 16 is a diagram that illustrates DSLT-MF processing for an individual DSLT.

FIG. 16 shows DSLT-MF 1204 Processing for an Individual DSLT.

In step 1 of FIG. 16, a SL entity hosting a DSLT-TF 1202 sends a DSLT-TRIGGER request to a SL entity hosting a DSLT-MF 1204 to initiate a DSLT.

In step 2 of FIG. 16, the DSLT-MF 1204 processes the request and disseminates a DSLT-REQ to each of the DSLT-CFs 1208 and 1210 targeted by the DSLT-TRIGGER. The DSLT-MF 1204 waits for responses from each of the DSLT-CFs 1208 and 1210 indicating they have successfully obtained locks on the targeted resources.

In step 3a of FIG. 16, the DSLT-MF 1204 detects that all (or a subset depending on the completion criteria defined) of the DSLT-CFs 1208 and 1210 were able to successfully obtain locks on the targeted resources In step 3b of FIG. 16, the DSLT-MF 1204 times out waiting for responses from one or more DSLT-CFs 1208 and 1210. The DSLT-MF 1204 retries the DSLT by re-sending the DSLT-REQ to the one or more DSLT-CFs which timed out.

In step 3c of FIG. 16, the DSLT-MF 1204 decides to abort the DSLT request. This decision could be the result of a time out after which the DSLT-MF 1204 decides it does not want to retry (e.g. reached max number of retries). If the DSLT-MF 1204 detects that one or more DSLT-CFs were NOT able to successfully obtain locks on the targeted resource(s), the DSLT-MF 1204 may choose to abort (depending on the completion criteria defined) the DSLT since it cannot be performed atomically across all targeted DSLT-CFs 1208 and 1210. The DSLT-MF 1204 may abort the DSLT by choosing not to send an execute command to each DSLT-CF and letting the DSLT timeout or it may explicitly send an abort command to each DSLT-CF. An abort decision may also be based on other factors such as one or more DSLT-CFs are not reachable.

In step 4 of FIG. 16, the DSLT-MF 1204 instructs the DSLT-CFs 1208 and 1210 to execute the operation specified by the DSLT by sending an execute command to the DSLT-CFs. The DSLT-MF 1204 waits for responses from each of the DSLT-CFs indicating they have successfully executed the operations on the targeted resources.

In step 5a of FIG. 16, the DSLT-MF 1204 detects that all (or a subset depending on the completion criteria defined) of the DSLT-CFs were able to successfully execute the operations specified by the DSLT on the targeted resources.

In step 5b of FIG. 16, the DSLT-MF 1204 times out waiting for responses from one or more DSLT-CFs 1208 and 1210. The DSLT-MF 1204 retries sending the execute command to one or more DSLT-CFs which timed out.

In step 5c of FIG. 16, the DSLT-MF 1204 decides to abort the DSLT request. This decision could be the result of a time out after which the DSLT-MF 1204 decides it does not want to retry (e.g. reached max number of retries). Or this decision could be based on other factors such one or more DSLT-CFs are not reachable. If the DSLT-MF 1204 detects that one or more DSLT-CFs were NOT able to successfully execute operations on the targeted resource(s), the DSLT-MF 1204 may choose to abort (depending on the completion criteria defined) the DSLT since it cannot be performed atomically across all targeted DSLT-CFs 1208 and 1210. The DSLT-MF 1204 may abort the DSLT by choosing not to send an execute command to each DSLT-CF 1208 and 1210 and letting the DSLT timeout or it may explicitly send an abort command to each DSLT-CF 1208 and 1210.

In step 6 of FIG. 16, the DSLT-MF 1204 instructs the DSLT-CFs 1208 and 1210 to commit the operation specified by the DSLT. The DSLT-MF 1204 waits for responses from each of the DSLT-CFs 1208 and 1210 indicating they have successfully committed the operations on the targeted resources.

In step 7a of FIG. 16, the DSLT-MF 1204 detects that all (or a subset depending on the completion criteria defined) of the DSLT-CFs 1208 and 1210 were able to successfully commit the results of the operations specified by the DSLT on the targeted resources.

In step 7b of FIG. 16, the DSLT-MF 1204 times out waiting for responses from one or more DSLT-CFs 1208 and 1210. The DSLT-MF 1204 retries sending the commit command to the one or more DSLT-CFs 1208 and 1210 which timed out.

In step 7c of FIG. 16, the DSLT-MF 1204 decides to abort the DSLT request. This decision could be the result of a time out after which the DSLT-MF 1204 decides it does not want to retry (e.g. reached max number of retries). Or this decision could be based on other factors such one or more DSLT-CFs 1208 and 1210 are not reachable.

In step 8 of FIG. 16, the DSLT was successfully processed and the DSLT-MF 1204 returns the results to the DSLT-TF 1202 that triggered the DSLT.

In step 9 of FIG. 16, the DLST-MF has decided to abort the DSLT. Depending on whether or not from the DSLT-MF 1204 has received a response or not from the DSLT-CFs 1208 and 1210, the DSLT-MF 1204 may decide to send an explicit abort request to one or more DSLT-CFs 1208 and 1210 to notify them that it has decided to abort the DSLT such that they may perform any necessary processing such as discontinuing the processing of the DSLT, rolling back the state of a targeted resource to its original state or unlocking of a targeted resource.

Figure 17:
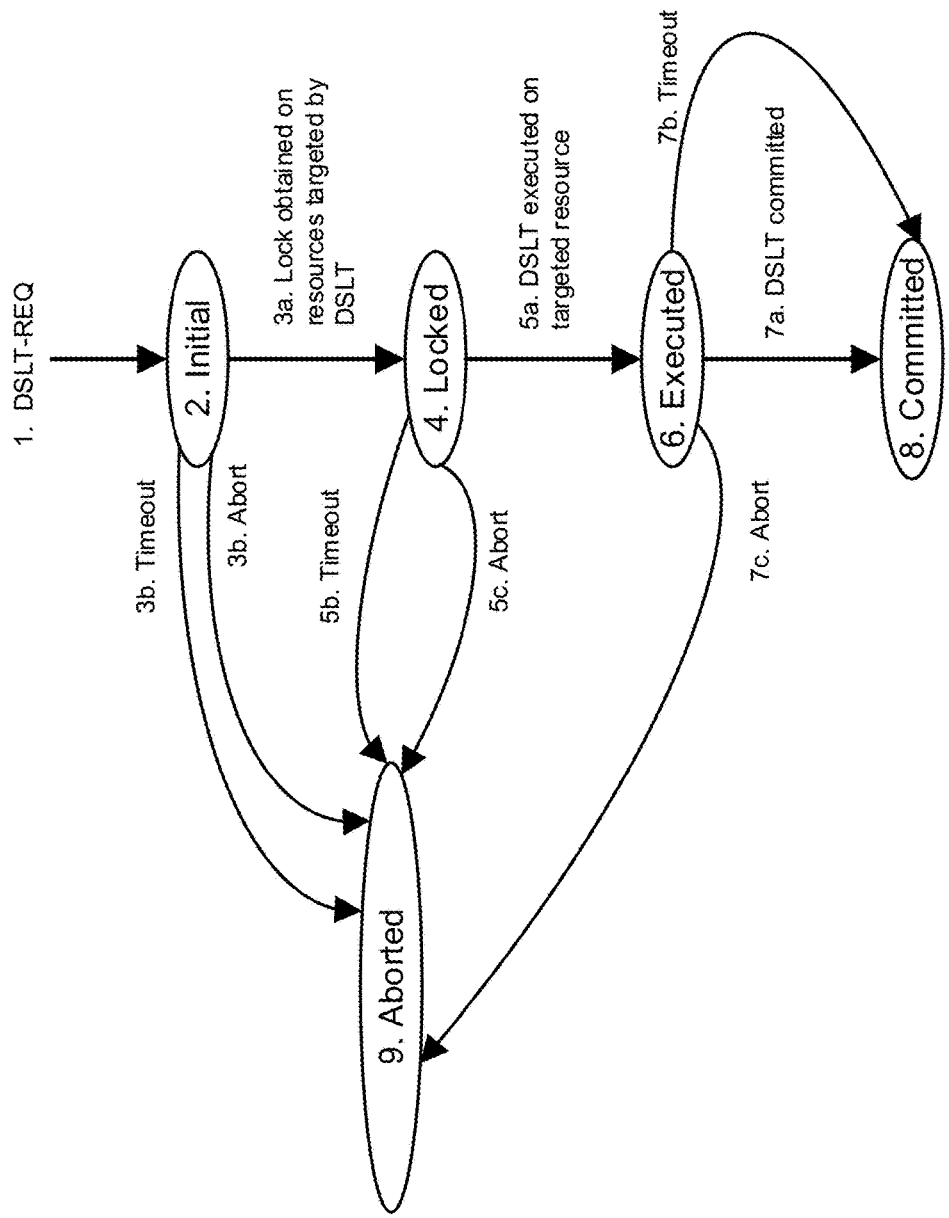
FIG. 17 is a diagram that illustrates DSLT-CF processing for an individual DSLT-CF.

FIG. 17 shows DSLT-CF Processing for an Individual DSLT-CF.

In step 1 of FIG. 17, SL entity hosting a DSLT-CF 1210 receives a DSLT-REQ from a DSLT-MF 1204.

Step 2 of FIG. 17 is an initialization step where the DSLT-CF 1210 attempts to lock the requested resource.

In step 3a of FIG. 17, the DSLT-CF 1210 is able to successfully obtain a lock (if required) on the resource(s) targeted by the DSLT-REQ. This blocking may be made applicable to all operations from other DSLT-REQs since even the retrieval of a locked resource may need to be blocked until the state of a locked resource is committed and unlocked.

In step 3b of FIG. 17, the DSLT-CF 1210 is not able to obtain a lock on the targeted resource before a timeout period elapses, hence the DSLT-CF 1210 chooses to timeout and abort the DSLT-REQ. The DSLT-CF 1210 may notify the DSLT-MF 1204 of this timeout. Following a timeout, a DSLT-CF 1210 may receive a retried DSLT-REQ from a DSLT-MF 1204 in which case the DSLT-CF 1210 may repeat the flow starting with step 1.

In step 3c of FIG. 17, the DSLT-CF 1210 receives an explicit abort command from the DSLT-MF 1204, hence the DSLT-CF 1210 aborts the DSLT-REQ. If the DSLT-CF 1210 was able to obtain locks on any of the targeted resources, the DSLT-CF 1210 frees up these locks and discontinues the processing of the DSLT. A DSLT-CF may receive a retried DSLT-REQ from a DSLT-MF 1204 in which case the DSLT-CF may repeat the flow starting with step 1.

In step 4 of FIG. 17, a lock on the targeted resource(s) is obtained (if required) by each DSLT-CF. Each DSLT-CF notifies the DSLT-MF 1204 that the lock has been obtained or is not required. The DSLT-CF 1210 waits in this state until it receives a command from the DSLT-MF 1204 to execute the DSLT specified operation(s) on the targeted resource(s).

In step 5a of FIG. 17, the DSLT-CF 1210 received an execute command from the DSLT-MF 1204 and it was able to successfully complete execution of the DSLT specified operation(s) on the targeted resource(s).

In step 5b of FIG. 17, the DSLT-CF 1210 does not receive an execute command from the DSLT-MF 1204 before a timeout period elapses, hence the DSLT-CF 1210 times out the DSLT-REQ and unlocks the resource. The DSLT-CF 1210 may notify the DSLT-MF 1204 of this timeout. Following a timeout, a DSLT-CF 1210 may receive a DSLT-REQ command from a DSLT-MF 1204.

In step 5c of FIG. 17, the DSLT-CF 1210 aborts the execution of the DSLT-REQ. This may be a result of receiving an execute command from the DSLT-MF 1204 and not being able to successfully execute the DSLT specified operation(s) on the targeted resource(s). Alternatively, this may be a result of the DSLT-CF 1210 receiving an abort command from the DSLT-MF 1204.

In step 6 of FIG. 17, the DSLT-CF 1210 successfully completed execution. The DSLT notifies the DSLT-MF 1204 of its execution status and waits for a commit command from the DSLT-MF 1204.

In step 7a of FIG. 17, the DSLT-CF 1210 received a commit command from the DSLT-MF 1204 and it was able to successfully commit the state of the targeted resource such the results remain persistent.

In step 7b of FIG. 17, the DSLT-CF 1210 does not receive a commit command from the DSLT-MF 1204 before a timeout period elapses, hence the DSLT-CF 1210 times out the DSLT-REQ. The DSLT-CF 1210 still commits the state of the updated resource(s) rather than aborting to remain consistent with other DSLT-CFs. The DSLT-CF 1210 also unlocks the resource.

In step 7c of FIG. 17, the DSLT-CF 1210 aborts the commit of the DSLT-REQ. This may be a result of receiving a commit command from the DSLT-MF 1204 and not being able to successfully commit the results. Alternatively, this may be a result of the DSLT-CF 1210 receiving an abort command from the DSLT-MF 1204.

In step 8 of FIG. 17, following the commit, the DSLT-CF 1210 may free up the lock on the resource(s) targeted by the DSLT. In this case, the DSLT-CF 1210 may also send a notification to the DSLT-MF 1204 of the commit.

In step 9 of FIG. 17, the DSLT-CF 1210 aborts and rollback the DSLT and return a corresponding status to the DSLT-MF 1204. Following abort, the DSLT-CF should release the lock on the resource. In this case, the DSLT-CF 1210 may also send a notification to the DSLT-MF 1204 of the abort.

DSLT Sequence Processing

A sequence of DSLTs consists of multiple distributed service layer transactions that must be processed as an atomic and ordered set. The DSLT sequence is triggered by a DSLT-TF 1202 sending a DSLT-SEQ-TRIGGER request to a DSLT-MF 1204. A DSLT-MF 1204 then processes the DSLT sequence. This processing may involve the DSLT-MF 1204 disseminating DSLT-REQs to a distributed set of SL entities that are the targets of the DSLT sequence. Each SL entity receiving a DSLT-REQ hosts a DSLT-CF 1208 and 1210 that is able to process a DSLT-REQ. The DSLT-MF 1204 ensures that all of the DSLT-REQs in the sequence are processed in an atomic and ordered manner. When complete, the DSLT-MF 1204 returns a response to the DSLT-TF 1202 that originated the DSLT-SEQ-TRIGGER request. This response includes the results of the DSLT sequence.

The overall method for processing a DSLT sequence may be sub-divided into three complimentary methods that consist of the DSLT-TF 1202 that initiates the DSLT sequence, the DSLT-MF 1204 that manages the processing of the DSLT sequence and the DSLT-CFs 1208 and 1210 which performs the operations on targeted resources specified by the individual DSLTs in the sequence. Descriptions of each these methods is captured in the following flow diagrams.

Figure 18:
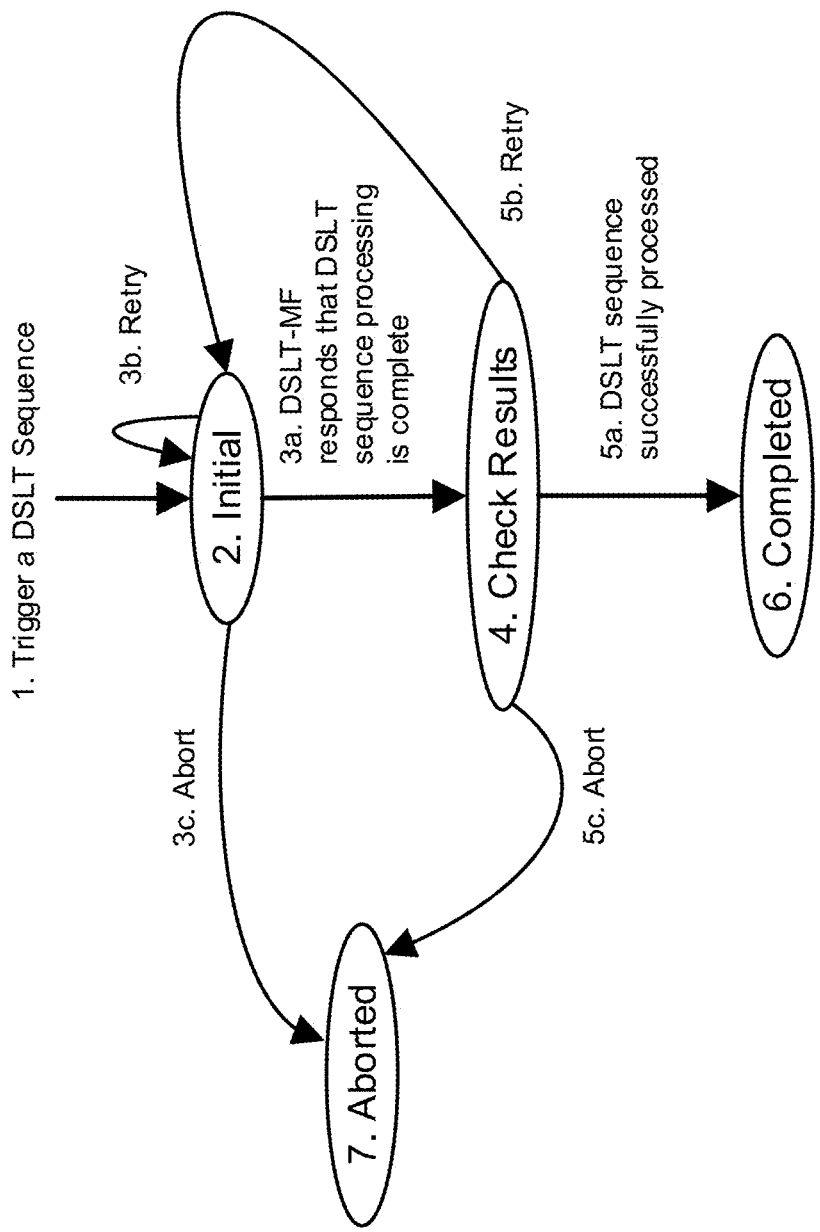
FIG. 18 is a diagram that illustrates DSLT-TF processing for a DSLT sequence.

FIG. 18 shows DSLT-TF 1202 Processing for a DSLT Sequence.

In step 1 of FIG. 18, a DSLT sequence trigger condition (e.g., an application specific event) occurs on a SL entity (e.g., an application) that hosts a DSLT-TF 1202.

In step 2 of FIG. 18, the DSLT-TF 1202 generates a DSLT-SEQ-TRIGGER request and sends the request to a SL entity hosting a DSLT-MF 1204 such that the DSLT-MF 1204 may perform DSLT sequence processing on its behalf. The DSLT-TF 1202 waits for the DSLT-MF 1204 to respond back indicating that DSLT sequence processing is complete.

In step 3a of FIG. 18, the DSLT-MF 1204 responds back to the DSLT-TF 1202 that DSLT sequence processing is complete and includes the status of this processing.

In step 3b of FIG. 18, the DSLT-TF 1202 times out waiting for a response from the DSLT-MF 1204. The DSLT-TF 1202 retries the DSLT sequence by re-sending the DSLT-SEQ-TRIGGER request to the DSLT-MF 1204.

In step 3c of FIG. 18, the DSLT-TF 1202 decides to abort the DSLT-SEQ-TRIGGER request. This decision could be the result of a time out after which the DSLT-TF 1202 decides it does not want to retry. Or this decision could be based on other factors such as an application specific reason.

In step 4 of FIG. 18, the DSLT-TF 1202 checks the DSLT sequence results returned to it by the DSLT-MF 1204.

In step 5a of FIG. 18, the DSLT sequence was successfully processed by the DSLT-MF 1204. The DSLT-TF 1202 may consider the DSLT sequence complete.

In step 5b of FIG. 18, the DSLT sequence was not successfully processed. The DSLT-TF 1202 decides to retry the DSLT sequence by re-issuing the DSLT-SEQ-TRIGGER request to the DSLT-MF 1204 to have it re-attempt the processing of the DSLT again.

In step 5c of FIG. 18, the DSLT sequence was not successfully processed. Rather than retry, the DSLT-TF 1202 decides to abort the DSLT sequence request.

In step 6 of FIG. 18, the DSLT sequence was successfully processed and the DSLT-TF 1202 returns the results to the entity that invoked the DSLT sequence trigger request (e.g., the application).

In step 7 of FIG. 18, the DLST-TF 1202 has decided to abort the DSLT sequence. Depending on whether or not the DSLT-TF 1202 has received a response or not from the DSLT-MF 1204, the DSLT-TF 1202 may decide to send an abort request to DSLT-MF 1204 to notify it that it has decided to abort the DSLT sequence.

Figure 19:
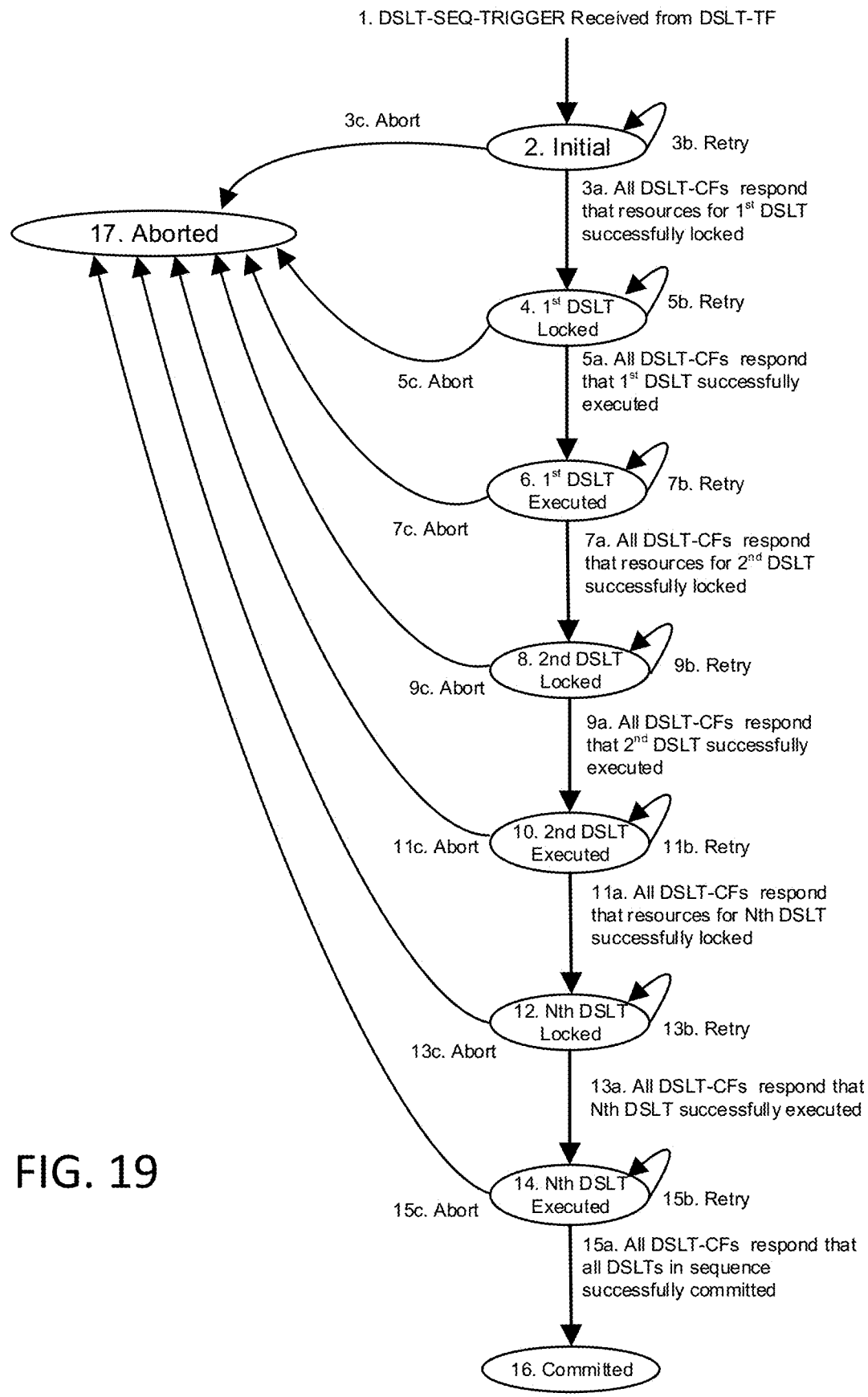
FIG. 19 is a diagram that illustrates DSLT-MF processing for a DSLT sequence.

FIG. 19 shows DSLT-MF 1204 Processing for a DSLT Sequence.

In step 1 of FIG. 19, a SL entity hosting a DSLT-TF 1202 sends a DSLT-SEQ-TRIGGER request to a SL entity hosting a DSLT-MF 1204 to initiate a DSLT sequence.

In step 2 of FIG. 19, the DSLT-MF 1204 processes the request and disseminates a DSLT-REQ corresponding to the first DSLT in the sequence to each of the DSLT-CFs 1208 and 1210 targeted by the DSLT-TRIGGER. The DSLT-MF 1204 waits for responses from each of the DSLT-CFs 1208 and 1210 indicating they have successfully obtained locks on the targeted resources.

In step 3a of FIG. 19, the DSLT-MF 1204 detects that all (or a subset depending on the completion criteria defined) of the DSLT-CFs 1208 and 1210 were able to successfully obtain locks on the targeted resources.

In step 3b of FIG. 19, the DSLT-MF 1204 times out waiting for responses from one or more DSLT-CFs 1208 and 1210. The DSLT-MF 1204 retries the DSLT by re-sending the DSLT-REQ corresponding to the first DSLT in the sequence to the one or more DSLT-CFs which timed out.

In step 3c of FIG. 19, the DSLT-MF 1204 decides to abort the first DSLT request in the sequence and potentially the entire DSLT sequence depending on sequence completion criteria. This decision could be the result of a time out after which the DSLT-MF 1204 decides it does not want to retry (e.g. reached max number of retries). If the DSLT-MF 1204 detects that one or more DSLT-CFs were NOT able to successfully obtain locks on the targeted resource(s), the DSLT-MF 1204 may choose to abort (depending on the completion criteria defined) the DSLT since it cannot be performed atomically across all targeted DSLT-CFs 1208 and 1210. The DSLT-MF 1204 may abort the DSLT by choosing not to send an execute command to each DSLT-CF 1208 and 1210 and letting the DSLT timeout or it may explicitly send an abort command to each DSLT-CF 1208 and 1210. An abort decision may also be based on other factors such as one or more DSLT-CFs are not reachable.

In step 4 of FIG. 19, the DSLT-MF 1204 instructs the DSLT-CFs 1208 and 1210 to execute the operation specified by the first DSLT in the sequence by sending an execute command to the DSLT-CFs 1208 and 1210. The DSLT-MF 1204 waits for responses from each of the DSLT-CFs 1208 and 1210 indicating they have successfully executed the operations on the targeted resources.

In step 5a of FIG. 19, the DSLT-MF 1204 detects that all (or a subset depending on the completion criteria defined) of the DSLT-CFs 1208 and 1210 were able to successfully execute the operations specified by the DSLT on the targeted resources.

In step 5b of FIG. 19, the DSLT-MF 1204 times out waiting for responses from one or more DSLT-CFs 1208 and 1210. The DSLT-MF 1204 retries sending the execute command to one or more DSLT-CFs which timed out.

In step 5c of FIG. 19, the DSLT-MF 1204 decides to abort the first DSLT request in the sequence and potentially the entire DSLT sequence depending on sequence completion criteria. This decision could be the result of a time out after which the DSLT-MF 1204 decides it does not want to retry (e.g. reached max number of retries). Or this decision could be based on other factors such one or more DSLT-CFs 1208 and 1210 are not reachable. If the DSLT-MF 1204 detects that one or more DSLT-CFs were NOT able to successfully execute the operations on the targeted resource(s), the DSLT-MF 1204 may choose to abort (depending on the completion criteria defined) the DSLT since it cannot be performed atomically across all targeted DSLT-CFs 1208 and 1210. The DSLT-MF 1204 may abort the DSLT by choosing not to send an execute command to each DSLT-CF 1208 and 1210 and letting the DSLT timeout or it may explicitly send an abort command to each DSLT-CF 1208 and 1210.

In step 6 of FIG. 19, the same behavior as defined in Step 2 may be applied to the processing of the second DSLT.

In step 7a of FIG. 19, the same behavior as defined in Step 3a may be applied to the processing of the second DSLT.

In step 7b of FIG. 19, the same behavior as defined in Step 3b may be applied to the processing of the second DSLT.

In step 7c of FIG. 19, the same behavior as defined in Step 3c may be applied to the processing of the second DSLT In step 8 of FIG. 19, the same behavior as defined in Step 4 may be applied to the processing of the second DSLT In step 9a of FIG. 19, the same behavior as defined in Step 5a may be applied to the processing of the second DSLT.

In step 9b of FIG. 19, the same behavior as defined in Step 5b may be applied to the processing of the second DSLT.

In step 9c of FIG. 19, the same behavior as defined in Step 5c may be applied to the processing of the second DSLT.

In step 10 of FIG. 19, the same behavior as defined in Step 2 may be applied to the processing of the Nth DSLT.

In step 11a of FIG. 19, the same behavior as defined in Step 3a may be applied to the processing of the Nth DSLT.

In step 11b of FIG. 19, the same behavior as defined in Step 3b may be applied to the processing of the Nth DSLT.

In step 11c of FIG. 19, the same behavior as defined in Step 3c may be applied to the processing of the Nth DSLT In step 12 of FIG. 19, the same behavior as defined in Step 4 may be applied to the processing of the Nth DSLT In step 13a of FIG. 19, the same behavior as defined in Step 5a may be applied to the processing of the Nth DSLT.

In step 13b of FIG. 19, the same behavior as defined in Step 5b may be applied to the processing of the Nth DSLT.

In step 13c of FIG. 19, the same behavior as defined in Step 5c may be applied to the processing of the Nth DSLT.

In step 14 of FIG. 19, if the DSLT-MF 1204 detects that all (or a subset depending on the sequence completion criteria defined) of the DSLT-CFs 1208 and 1210 were able to successfully execute all the operations on all the targeted resources as specified by the entire sequence of DSLTs, the DSLT-MF 1204 instructs each of the DSLT-CFs 1208 and 1210 to commit all applicable DSLTs in the sequence such that the state of the results remains persistent.

In step 15a of FIG. 19, the DSLT-MF 1204 detects that all (or a subset depending on the completion criteria defined) of the DSLT-CFs 1208 and 1210 were able to successfully commit the results of the operations specified by the DSLT on the targeted resources.

In step 15b of FIG. 19, the DSLT-MF 1204 times out waiting for responses from one or more DSLT-CFs. The DSLT-MF 1204 retries sending the commit command to one or more DSLT-CFs which timed out.

In step 15c of FIG. 19, the DSLT-MF 1204 decides to abort the DSLT sequence based on sequence completion criteria. This decision could be the result of a time out after which the DSLT-MF 1204 decides it does not want to retry (e.g. reached max number of retries). Or this decision could be based on other factors such one or more DSLT-CFs are not reachable. If the DSLT-MF 1204 detects that one or more DSLT-CFs were NOT able to successfully commit the operations on the targeted resource(s), the DSLT-MF 1204 may choose to abort (depending on the completion criteria defined) the DSLT sequence since it cannot be performed atomically across all targeted DSLT-CFs 1208 and 1210. The DSLT-MF 1204 may abort the DSLT sequence by returning an error to the DSLT-TF 1202 that triggered the DSLT sequence.

In step 16 of FIG. 19, the DSLT sequence was successfully processed and the DSLT-MF 1204 returns the results to the DSLT-TF 1202 that triggered the DSLT sequence.

In step 17 of FIG. 19, the DLST-MF has decided to abort the DSLT sequence. Depending on whether or not the DSLT-MF 1204 has received a response or not from the DSLT-CFs 1208 and 1210, the DSLT-MF 1204 may decide to send an explicit abort request to one or more DSLT-CFs 1208 and 1210 to notify them that it has decided to abort one or more DSLTs in the sequence such that they may perform any necessary processing such as discontinuing the processing of the DSLT sequence, rolling back the state of a targeted resource to its original state or unlocking of a targeted resource.

Figure 20:
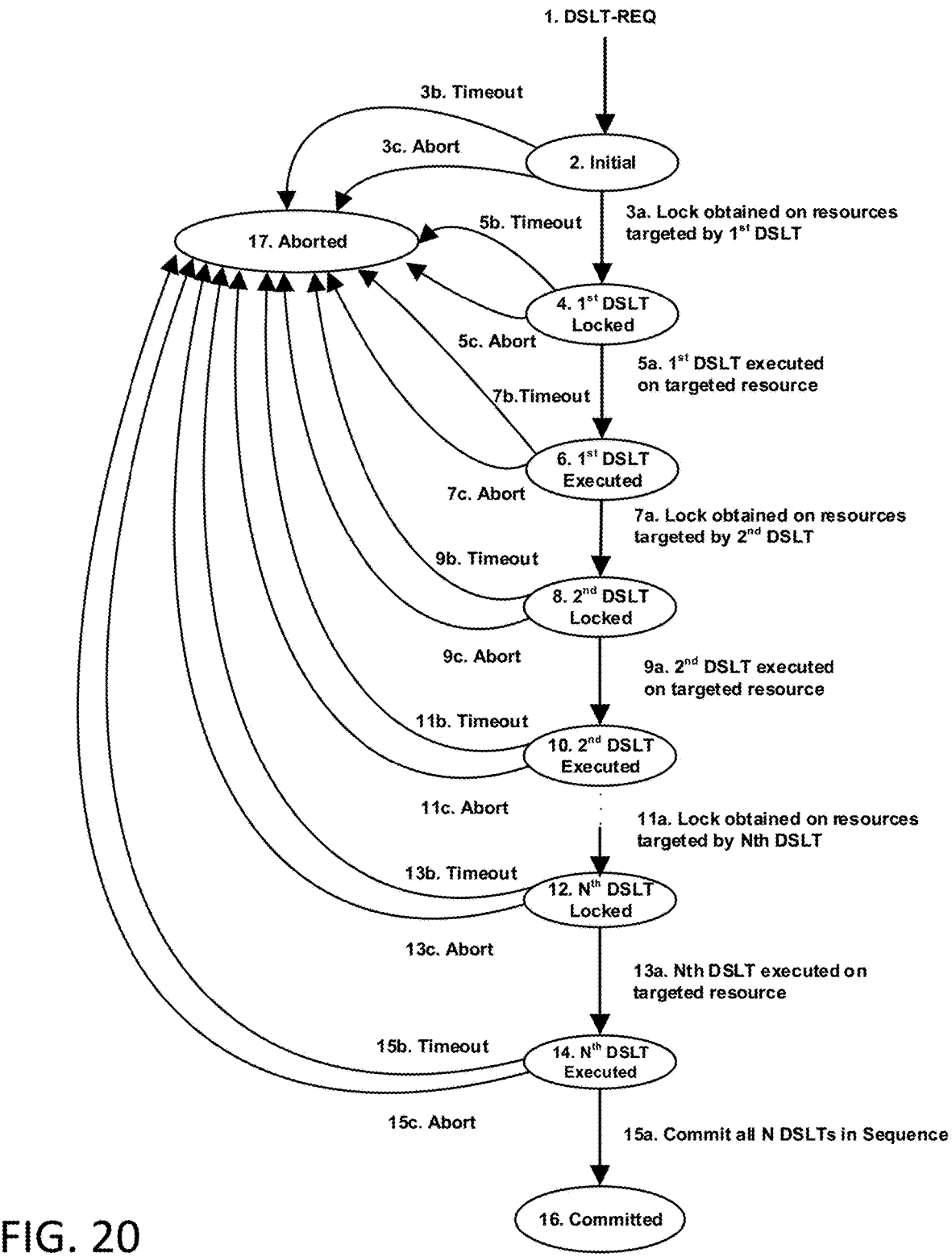
FIG. 20 is a diagram that illustrates DSLT-CF processing for a DSLT sequence.

FIG. 20 shows DSLT-CF Processing for a DSLT Sequence.

In step 1 of FIG. 20, a SL entity hosting a DSLT-CF 1210 receives a DSLT-REQ from a DSLT-MF 1204 corresponding to the first DSLT in a sequence. Alternatively, each DSLT-CF 1208 and 1210 may receive all the DSLTs in the sequence batched together in single request.

In step 2 of FIG. 20, the DSLT-CF 1210 processes the DSLT-REQ and attempts to lock (if required) the resource(s) targeted by the DSLT-REQ to ensure the transaction is performed in isolation and not interfered by any other DSLT-REQs. The DSLT-CF 1210 waits in this state until the lock is obtained (if required). The DSLT-CF 1210 may associate this lock with the DSLT sequence to permit DSLTs in the same sequence to operate on the resource(s) but not any other DSLTs. This lock may be made contingent on the type of operation. For example, lock a targeted resource only if the operation is an Update or Delete. However, in some use cases a lock for a retrieval may also be warranted to ensure that another DSLT-REQ doesn't modify or delete the resource before the DSLT-REQ to perform the retrieval is executed. Once a resource is locked by one DSLT-REQ, this lock may be used to block other DSLT-REQs from accessing the resource. This blocking may be made applicable to all operations from other DSLT-REQs since even the retrieval of a locked resource may need to be blocked until the state of a locked resource is committed and unlocked In step 3a of FIG. 20, the DSLT-CF 1210 is able to successfully obtain a lock (if required) on the resource(s) targeted by the DSLT-REQ. This blocking may be made applicable to all operations from other DSLT-REQs since even the retrieval of a locked resource may need to be blocked until the state of a locked resource is committed and unlocked.

In step 3b of FIG. 20, the DSLT-CF 1210 is not able to obtain a lock on the targeted resource before a timeout period elapses, hence the DSLT-CF 1210 chooses to timeout and abort the DSLT-REQ. The DSLT-CF 1210 may notify the DSLT-MF 1204 of this timeout. Following a timeout, a DSLT-CF may receive a retried DSLT-REQ from a DSLT-MF 1204 in which case the DSLT-CF may repeat the flow starting with step 1.

In step 3c of FIG. 20, the DSLT-CF 1210 receives an explicit abort command from the DSLT-MF 1204, hence the DSLT-CF 1210 aborts the DSLT-REQ. If the DSLT-CF 1210 was able to obtain locks on any of the targeted resources, the DSLT-CF 1210 frees up these locks and discontinues the processing of the DSLT. A DSLT-CF 1210 may receive a retried DSLT-REQ from a DSLT-MF 1204 in which case the DSLT-CF 1210 may repeat the flow starting with step 1.

In step 4 of FIG. 20, a lock on the targeted resource(s) is obtained (if required) by each DSLT-CF 1208 and 1210. Each DSLT-CF notifies the DSLT-MF 1204 that the lock has been obtained or is not required. The DSLT-CF waits in this state until it receives a command from the DSLT-MF 1204 to execute the DSLT specified operation(s) on the targeted resource(s).

In step 5a of FIG. 20, the DSLT-CF 1210 received an execute command from the DSLT-MF 1204 and it was able to successfully complete execution of the DSLT specified operation(s) on the targeted resource(s).

In step 5b of FIG. 20, the DSLT-CF 1210 does not receive an execute command from the DSLT-MF 1204 before a timeout period elapses, hence the DSLT-CF 1210 times out the DSLT-REQ and unlocks the resource. The DSLT-CF 1210 may notify the DSLT-MF 1204 of this timeout. Following a timeout, a DSLT-CF 1210 may receive a DSLT-REQ command from a DSLT-MF 1204.

In step 5c of FIG. 20, the DSLT-CF 1210 aborts the execution of the DSLT-REQ. This may be a result of receiving an execute command from the DSLT-MF 1204 and not being able to successfully execute the DSLT specified operation(s) on the targeted resource(s). Alternatively, this may be a result of the DSLT-CF 1210 receiving an abort command from the DSLT-MF 1204.

In step 6 of FIG. 20, the DSLT-CF 1210 successfully completed execution. The DSLT-CF 1210 notifies the DSLT-MF 1204 of its execution status and waits for the next DSLT in the sequence or a commit command from the DSLT-MF 1204. If the next DSLT is received in the sequence, then the same behavior as defined in Step 2 may be applied to the processing of this next DSLT.

In step 7a of FIG. 20, the same behavior as defined in Step 3a may be applied to the processing of the second DSLT.

In step 7b of FIG. 20, the same behavior as defined in Step 3b may be applied to the processing of the second DSLT.

In step 7c of FIG. 20, the same behavior as defined in Step 3c may be applied to the processing of the second DSLT In step 8 of FIG. 20, the same behavior as defined in Step 4 may be applied to the processing of the second DSLT In step 9a of FIG. 20, the same behavior as defined in Step 5a may be applied to the processing of the second DSLT.

In step 9b of FIG. 20, the same behavior as defined in Step 5b may be applied to the processing of the second DSLT.

In step 9c of FIG. 20, the same behavior as defined in Step 5c may be applied to the processing of the second DSLT.

In step 10 of FIG. 20, the same behavior as defined in Step 6 may be applied to the processing of the $N^{th}$ DSLT.

In step 11a of FIG. 20, the same behavior as defined in Step 3a may be applied to the processing of the $N^{th}$ DSLT.

In step 11b of FIG. 20, the same behavior as defined in Step 3b may be applied to the processing of the $N^{th}$ DSLT.

In step 11c of FIG. 20, the same behavior as defined in Step 3c may be applied to the processing of the $N^{th}$ DSLT In step 12 of FIG. 20, the same behavior as defined in Step 4 may be applied to the processing of the $N^{th}$ DSLT In step 13a of FIG. 20, the same behavior as defined in Step 5a may be applied to the processing of the $N^{th}$ DSLT.

In step 13b of FIG. 20, the same behavior as defined in Step 5b may be applied to the processing of the $N^{th}$ DSLT.

In step 13c of FIG. 20, the same behavior as defined in Step 5c may be applied to the processing of the $N^{th}$ DSLT In step 14 of FIG. 20, the DSLT-CF 1210 successfully completed execution of the $N^{th}$ DSLT in the sequence. The DSLT-CF 1210 notifies the DSLT-MF 1204 of its execution status and waits for the next DSLT in the sequence or a commit command from the DSLT-MF 1204.

Step 15a of FIG. 20, the DSLT-CF 1210 was able to successfully commit the DSLTs in the sequence.

In step 15b of FIG. 20, the DSLT-CF 1210 does not receive a subsequent DSLT in the sequence or a commit command from the DSLT-MF 1204 before a timeout period elapses, hence the DSLT-CF 1210 times out the DSLT sequence. If/when this occurs, the DSLT-CF does not commit the state of the updated resource(s) in the sequence and instead aborts it such that the state of the targeted resource(s) is rolled back to the initial state before any of the DSLT operations in the sequence were performed. Similarly, if after executing the DSLT specified operation on the targeted resource(s) a DSLT-CF 1210 receives an explicit abort command from the DSLT-MF 1204, then the DSLT-CF 1210 may abort the DSLT sequence by not committing the state of the updated resource(s) and instead aborting it such that the state of the targeted resource(s) is rolled back to the initial state before any of the DSLT operations in the sequence were performed. The DSLT-CF 1210 may notify the DSLT-MF 1204 of this abort In step 15c of FIG. 20, the DSLT-CF 1210 aborts the commit of all DSLTs that it has processed as part of the sequence and that are not yet committed. This may be a result of receiving a commit command from the DSLT-MF 1204 and not being able to successfully commit the results. Alternatively, this may be a result of the DSLT-CF 1210 receiving an abort command from the DSLT-MF 1204.

In step 16 of FIG. 20, following the commit, the DSLT-CF 1210 may free up the lock on the resource(s) targeted by any of the DSLTs in the sequence. In this case, the DSLT-CF may also send a notification to the DSLT-MF 1204 of the commits.

In step 17 of FIG. 20, if a timeout or an abort occurs, the DSLT-CF may abort and rollback all the DSLTs it processed as part of the sequence and return a corresponding status to the DSLT-MF 1204. Following abort, the DSLT-CF 1210 should release the locks on the resources as well. In this case, the DSLT-CF 1210 may also send a notification to the DSLT-MF 1204 of the abort.

DSLT-MF Policy Engine Capability

A DSLT-MF 1204 may support a DSLT policy engine capability 1308. Through its API, the DSLT-MF 1204 may support policy configuration requests to create, retrieve, update, or delete DSLT processing policies. These policies may be used to configure DSLT processing rules within the DSLT-MF 1204 that control how it processes DSLTs and its interaction with targeted DSLT-CFs 1208 and 1210.

The following types of DSLT processing policies may be used:

- DSLT scheduling policies—These policies may be used to configure rules that control how a DSLT-MF 1204 schedules the processing of DSLTs or DSLT sequences.
- DSLT retry policies—These policies may be used to configure rules that control if and when a DSLT-MF 1204 retries a DSLT or DSLT sequence that failed processing. Rules may include max or min retry limits on the number of times a DSLT may
- DSLT prioritization policies—These policies may be used to configure rules that control how a DSLT-MF 1204 prioritizes and ranks the processing of DSLT or DSLT sequences with respect to each other.
- DSLT execution criteria policies—These policies may be used to configure rules that control how a DSLT-MF 1204 assigns and processes execution criteria for DSLTs or DSLT sequences.
- DSLT completion criteria policies—These policies may be used to configure rules that control how a DSLT-MF 1204 assigns and processes completion criteria for DSLTs or DSLT sequences.

The applicability/scope of each of the above types of policies may be configured. For example, the scope of a policy may be limited to:

- A DSLT that originates from a specific source (e.g. a certain DSLT-TF 1202 or group of DSLT-TF 1202s)
- A DSLT that is targeted towards a specific target (e.g. a certain DSLT-CF or group of DSLT-CFs)
- A specific type of DSLT (e.g. DSLT with operation equal to Create)

The following types of policy engine functionality may be used. A DSLT-MF 1204 may apply the corresponding policy rules (e.g. scheduling, retry, prioritization, and completion criteria rules) to incoming DSLT requests it receives. These rules may be used as defaults that may be applied to DSLT requests that do not explicitly define their own corresponding values for these parameters (e.g. they do not include DSLT message parameters to set these values explicitly). In the event that a DSLT request does include explicit values for one or more of these parameters, then these policies may be used as limits. A DSLT-MF 1204 may compare these policy limits against parameter explicitly defined in the DSLT request and if necessary enforce these limits by changing the explicit values to comply with the limits.

DSLT-MF Scheduling Capability for Resource Reservation

A DSLT-MF 1204 may serve as a centralized DSLT scheduling function 1310. It may support the capability to schedule access to a distributed set of SL entities and the resources hosted by these entities needed in order to execute DSLTs. By proactively doing this scheduling in advance, this may help ensure the resources required to execute a given DSLT are available when needed and contention to these resources is minimized. This may result in an increase in the likelihood of successful DSLT processing on the first attempt which may improve performance (e.g. reduce the occurrence of retry attempts). A centralized DSLT-MF scheduling capability may inspect the targeted resource(s) and corresponding operation(s) specified in each of the DSLTs. Based on this aggregate set of information across all the DSLTs, the DSLT-MF 1204 may then make informed DSLT scheduling decisions and optimize the access to resources targeted across the superset of all outstanding DSLTs.

The following DSLT scheduling functionality 1310 may be used.

1) A DSLT-MF 1204 may coordinate the reachability schedules of IoT devices which are the targets of DSLTs to help ensure that all the required devices are online and available such that a DSLT may be performed successfully to all of its targeted devices and meet the atomic execution requirements of the DSLT. This is critical since if one of the devices is not available, then this will result in the DSLT failing due to a lack of atomicity. A DSLT-MF 1204 may coordinate with each of the targeted devices to configure their connectivity schedules such that they are aligned with one another before a DSLT request is issued to them. This alignment may be done on a one-time/ad-hoc basis or it may also be done on a reoccurring/standing basis for those types of DSLTs that are repetitive in nature.

2) A DSLT-MF 1204 may ensure that multiple DSLTs or DSLT sequences that target the same resource(s) do not execute simultaneously since each must obtain a lock on their target resource(s) to ensure their corresponding transactions are performed in isolation and not interfered with. Trying to simultaneously execute DSLTs that target the same resource(s) may result in non-optimal DSLT execution (e.g. delays, timeouts, retries, etc.) or even DSLTs failures. A DSLT-MF 1204 may inspect each DSLT and its configured target(s). It may then properly schedule and sequence the execution of DSLTs with respect to one another to ensure those DSLTs with overlapping targets are not executed simultaneously while those without may have overlap. A DSLT-MF 1204 may also take into account the priority configured within each DSLT and include this in its scheduling algorithm to allow higher priority DSLTs to execute before lower priority DSLTs.

DSLT Procedures

The following procedures describe successful DSLT processing scenarios.

Individual DSLT Procedure

Figure 21:
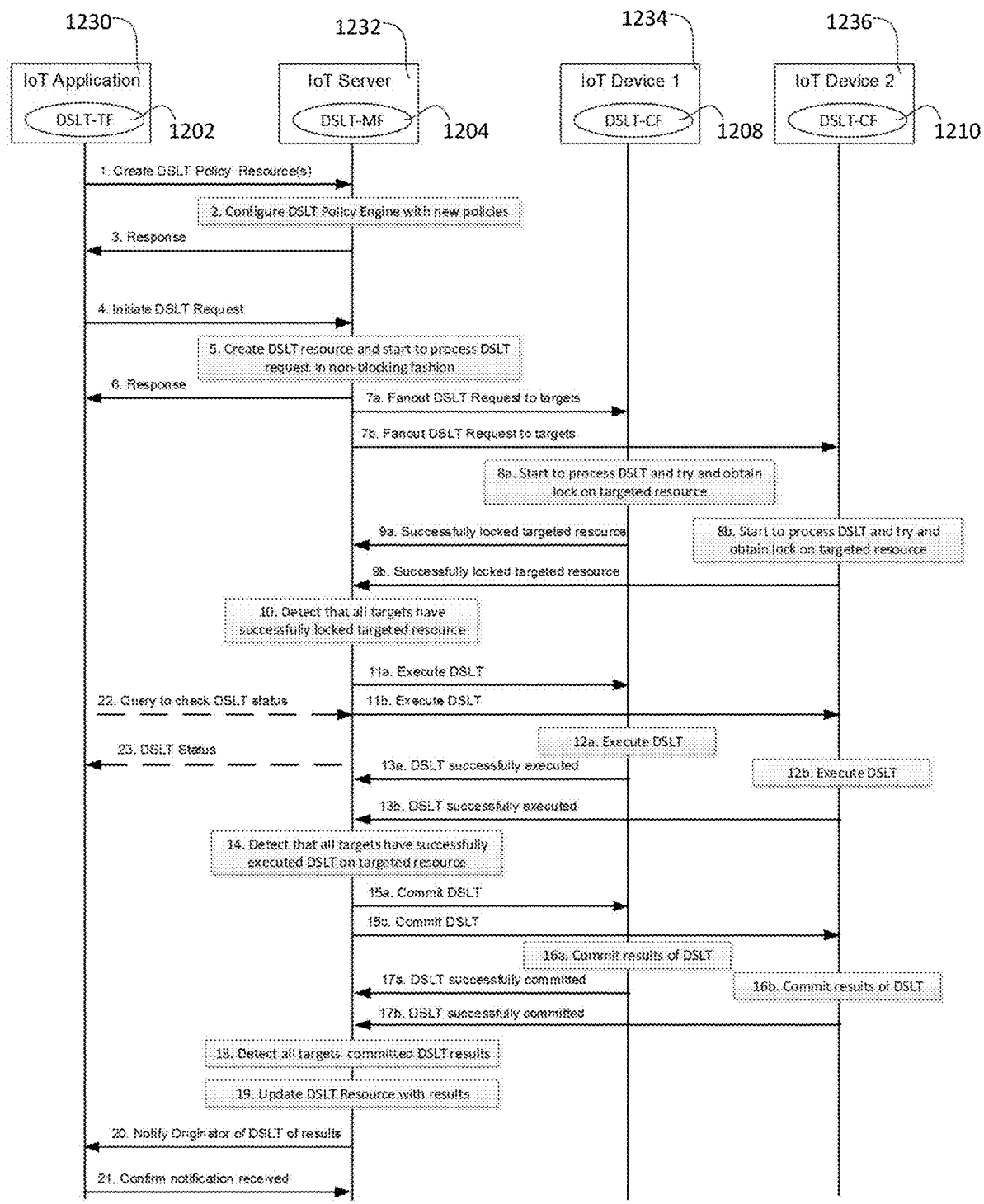
FIG. 21 is a diagram that illustrates Individual DSLT Procedure.

FIG. 21 illustrates an Individual DSLT Procedure.

Step 1 of FIG. 21 is an optional step. In step 1 of FIG. 21, the IoT Application's DSLT-TF 1202 sends request(s) to IoT Server's DSLT-MF 1204 to create DSLT policy resources. Each policy resource may contain one or more rules to control how the DSLT-MF 1204 processes DSLT requests. These rules may relate to DSLT scheduling, retrying of DSLTs, prioritization of DSLTs, execution and completion criteria for DSLTs. Alternatively, the IoT Server's DSLT-MF 1204 may be pre-provisioned with DSLT policies.

Step 2 of FIG. 21 is an optional step. In step 2 of FIG. 21, the IoT Server's DSLT-MF 1204 receives and processes request to create DSLT policy resources. DSLT-MF 1204 creates policy resource and also configures its DSLT policy engine 1308 with the rules specified in the policies.

Step 3 of FIG. 21 is an optional step. In step 3 of FIG. 21, the IoT Server's DSLT-MF 1204 returns a response to the IoT Application's DSLT-TF 1202 to inform it whether or not the rules defined in the policy resources were accepted or not. If not, the DSLT-MF 1204 may provide a modified version of the rules that were accepted by DSLT-MF 1204.

In step 4 of FIG. 21, the IoT Application's DSLT-TF 1202 sends a DSLT-TRIGGER request to the IoT Server's DSLT-MF 1204. The request may include several parameters such as a set of targeted nodes (e.g. IoT Device 1 and IoT Device 2), an operation to perform on these nodes, a schedule of when to perform the operation, a set of execution criteria, a priority, a number of retries in case attempts to process the transaction fail, a set of completion criteria, a DSLT identifier and contact information that the DSLT-MF 1204 may use to process the transaction in a non-blocking manner.

In step 5 of FIG. 21, the IoT Server's DSLT-MF 1204 receives and begins to processes the DSLT-TRIGGER request. The DSLT-MF 1204 creates a DSLT request resource to keep track of the state while it processes the DSLT. The DSLT-MF 1204 configures the resource's attributes with the information contained in the DSLT-TRIGGER request parameters described in Step 4.

In step 6 if FIG. 21, the IoT Server's DSLT-MF 1204 processes the DSLT-TRIGGER request in a non-blocking fashion by returning a response to the IoT Application's DSLT-TF 1202 indicating that it has received the request and it has started to process it. Alternatively, the DSLT-MF 1204 may process this request in a blocking manner.

In step 7 of FIG. 21, the IoT Server's DSLT-MF 1204 parses the DSLT-TRIGGER request to find the list of resources targeted. The DSLT-MF 1204 detects that the targeted resources are not locally hosted on the IoT Server but rather hosted by IoT Devices 1 and 2. Hence the DSLT-MF 1204 prepares corresponding DSLT-REQs to disseminate to these targeted devices. Before disseminating the requests, the DSLT-CF 1210 first checks if any schedule information was explicitly configured in the DSLT-TRIGGER request or in any DSLT schedule related policies. The DSLT-MF 1204 also checks if any priority was explicitly configured in the DSLT-TRIGGER request or in any DSLT schedule policies. If so, the DSLT-MF 1204 then checks if there are any other DSLT-TRIGGER requests it has received and that require processing. If so, the DSLT-MF 1204 uses the priority and schedule information to rank and order the execution of DSLT-TRIGGER requests with respect to each other. Once the schedule and priority allow it, the DSLT-MF 1204 disseminates the DSLT-REQs to the targets accordingly. Depending on the prioritization policies of the DSLT-MF 1204, if a new DSLT-TRIGGER is received having higher priority than a DSLT-TRIGGER that is actively being processed, the DSLT-MF 1204 may either complete the DSLT-TRIGGER actively being processed or pre-empt it in order to process the newly arrived and higher priority DSLT-TRIGGER. In the case of pre-empting, the DSLT-MF 1204 may either abort and rollback the transaction in favor of re-starting the processing over again at a later time or the DSLT-MF 1204 may pause the processing while it is processing the higher priority transaction and then resume it later. This abort vs. pre-empt decision may be based on several factors such as whether a higher priority transaction is targeting the same resources as a lower priority one being actively processed. In this case, the DSLT-MF 1204 may decide to abort the lower priority one whereas for the case where the two transactions are targeting different resources, the DSLT-MF 1204 may choose to pre-empt the lower priority one or execute them both in parallel if supported.

In step 8 of FIG. 21, the DSLT-CFs 1208 and 1210 on IoT Device 1234 and 1236 each receive their DSLT-REQs. Both process the request and create a local DSLT resource to keep track of the transaction state while they process the DSLT-REQ. The DSLT-CFs 1208 and 1210 configure their resource's attributes with the information contained in the DSLT-REQ parameters. The DSLT-CFs 1208 and 1210 start processing the transaction by first checking the availability of the targeted resource(s). If the resource(s) is local to the IoT Device, the DSLT-CF 1210 checks the availability to perform the specified operation of the resource and that there are no other transactions that have currently reserved and locked the resource. If the resource is available, the DSLT-CF 1210 may lock the resource such that it may perform the transaction on it without interference from other transactions that may arrive during the processing of the current transaction. In the event that a DSLT-CF 1210 receives a DSLT-REQ and finds that the request is targeting a resource that is not hosted on the local device, the DSLT-CF (possibly in collaboration with a local DSLT-MF 1204 hosted on the device) may re-target the DSLT-REQ request to another device in the system such that the DSLT-CF 1210 on the other device may process it.

In step 9 of FIG. 21, the DSLT-CF 1210 on each IoT Device returns status to the IoT Server's DSLT-MF 1204 indicating that the DSLT-REQ has been received, processing has started on the transaction, the targeted resource is available and the resource has been locked to allow the current transaction to proceed without interference from other transactions.

In step 10 of FIG. 21, the DSLT-MF 1204 on the IoT Server detects that all the targeted DSLT-CFs 1208 and 1210 (i.e. both IoT Devices 1 and 2) have responded that they have successfully locked the targeted resources. As a result the DSLT-MF 1204 determines that it may proceed to instruct the targeted DSLT-CF to execute the transaction. In the event that the DSLT-MF 1204 did not receive a successful lock response from all targets it could check whether any completion criteria is configured for the transaction or specified in any of its policies. If completion criteria is specified, the DSLT-MF 1204 may check whether the criteria allows the DSLT-MF 1204 to proceed or not (e.g. the criteria may specify that a transaction is only required to complete on a subset of the targets instead of all targets). Alternatively, in the event that one or more of the transactions failed to lock the targeted resource, the DSLT-MF 1204 may check whether or not the transaction is configured to be retried or not via its configuration parameter or via a policy setting. If retries are permitted, the DSLT-MF 1204 may retry the failed transaction. The DSLT-MF 1204 may send the retry to the failed DSLT-CF(s) in this case. In the event that the DSLT-MF 1204 determines that the completion criteria cannot be met and it is not able to retry the transaction, the DSLT-MF 1204 may choose to abort the transaction. To abort the transaction, the DSLT-MF 1204 sends an abort command to each of the transaction targets (DSLT-CFs 1208 and 1210 on IoT Device 1234 and 1236 in this example). Upon receiving the abort, the DSLT-CF aborts the transaction by rolling back any modifications made to a resource(s) targeted by the transaction such that it is returned to the same state it was in prior to the start of the transaction. The DSLT-CF may also free up the lock on the targeted resource(s).

Alternatively, if a DSLT-CF 1210 could not lock a resource in Step 8 it may provide an indication as to why the resource is unavailable (resource does not exist, insufficient access rights, resource already locked). If the resource is locked, the DSLT-CF 1210 may also provide an indication as to the time when the resource may be unlocked (based on the timeouts associated with the locked resource). In such a case, the DSLT-MF 1204 may attempt a retry of the transaction at some later time (based on the information provided by the DSLT-CF 1210).

In step 11 of FIG. 21, the DSLT-MF 1204 on the IoT Server sends a request to each targeted DSLT-CF 1208 and 1210 to command it to execute the transaction. This command may be issued by the DSLT-MF 1204 updating a command attribute within the DSLT resource hosted on each IoT Device instructing the DSLT-CF 1208 and 1210 to execute the transaction.

In step 12 of FIG. 21, upon receiving the command to execute the transaction, the DSLT-CF 1210 on each device performs the operation specified in the transaction on the targeted resource. As a result of the operation on the targeted resource, the state of a number of resources in the IoT Device may change. The DSLT-CF 1210 keeps a copy of the pre-operation state (that is before the execution of the operation) in case it is needed if the DSLT-REQ is aborted and needs to be rolled back.

In step 13 of FIG. 21, once execution is complete, each DSLT-CF 1210 responds back to the DSLT-MF 1204 with the results of the execution and whether or not it was successful.

In step 14 of FIG. 21, the DSLT-MF 1204 on the IoT Server detects that all the targeted DSLT-CFs (i.e. both IoT Devices 1234 and 1236) have responded that they have successfully executed the transaction on the targeted resources. As a result the DSLT-MF 1204 determines that it may proceed to instruct the targeted DSLT-CF 1208 and 1210 to commit the results (e.g. the updated resource representation) by making it persistent and also releasing the lock on the resource to allow other transactions to access the resource and its updated state. In the event that the DSLT-MF 1204 did not receive a successful execute response from all targets it could check whether any completion criteria is configured for the transaction or specified in any of its policies. If completion criteria is specified, the DSLT-MF 1204 may check whether the criteria allows the DSLT-MF 1204 to proceed or not (e.g. the criteria may specify that a transaction is only required to complete on a subset of the targets instead of all targets). Alternatively, in the event that one or more of the executed transactions failed, the DSLT-MF 1204 may check whether or not the transaction is configured to be retried or not via its configuration parameter or via a policy setting. If retries are permitted, the DSLT-MF 1204 may retry the failed transaction. In the event that the DSLT-MF 1204 determines that the completion criteria cannot be met and it is not able to retry the transaction, the DSLT-MF 1204 may choose to abort the transaction. To abort the transaction, the DSLT-MF 1204 sends an abort command to each of the transaction targets (DSLT-CFs on IoT Device 1234 and 1236 in this example). Upon receiving the abort, the DSLT-CF 1210 aborts the transaction by rolling back any modifications made to a resource(s) targeted by the transaction such that it is returned to the same state it was in prior to the start of the transaction. The DSLT-CF 1210 may also free up the lock on the targeted resource(s).

In step 15 of FIG. 21, the DSLT-MF 1204 on the IoT Server 1230 sends a request to each targeted DSLT-CF 1208 and 1210 to command it to commit the transaction. This command may be issued by the DSLT-MF 1204 updating a command attribute within the DSLT resource hosted on each IoT Device instructing the DSLT-CF 1208 and 1210 to commit the transaction.

In step 16 of FIG. 21, upon receiving the command to commit the transaction, the DSLT-CF 1208 and 1210 on each device saves any updates to the resource that may have been made when executing the transaction such that its state is persistent. Based on any updates to the state of the committed resource, the DSLT-CF 1208 and 1210 may also send notifications regarding the updated state to any other entities in the system that may have subscribed to the targeted resource. The DSLT-CF 1208 and 1210 then releases any locks on the targeted resource and may delete any saved pre-operation state.

In step 17 of FIG. 21, once commit is complete, each DSLT-CF 1208 and 1210 responds back to the DSLT-MF 1204 with the results of the commit and whether or not it was successful.

In step 18 of FIG. 21, the DSLT-MF 1204 on the IoT Server detects that all the targeted DSLT-CFs 1208 and 1210 (i.e. both IoT Devices 1234 and 1236) have responded that they have successfully committed the transaction on the targeted resources. In the event that the one or more of the commits failed, the DSLT-MF 1204 may check whether or not the transaction is configured to be retried or not via its configuration parameter or via a policy setting. If retries are permitted, the DSLT-MF 1204 may retry the failed transaction. In the event that the DSLT-MF 1204 determines that the completion criteria cannot be met and it is not able to retry the transaction, the DSLT-MF 1204 may report an error condition for the transaction.

In step 19 of FIG. 21, the DSLT-MF 1204 updates its locally hosted DSLT resource corresponding to the DSLT it received from the IoT Applications DSLT-TF 1202. Included in this update is the status of each of the DSLTs that it disseminates to the IoT Devices indicating whether the transactions were successful and if not the cause or reason for the failure.

In step 20 of FIG. 21, once the DSLT processing has completed, the DSLT-MF 1204 on the IoT Server may notify the DSLT-TF 1202 on the IoT Application and include the results of the DSLT. The DSLT-MF 1204 may include the overall status of the DSLT as well as the individual status of each disseminated transaction that were performed on the individual targets. This may include an error or debug information explaining the cause of the failures. This may allow technicians and operators to detect problems and swap out or repair faulty devices before re-attempting to issue another DSLT.

In step 21 of FIG. 21, after receiving a notification of the completed DSLT, the IoT Application's DSLT-TF 1202 may respond back to the DSLT-MF 1204 with a confirmation that it received the notification.

In step 22 of FIG. 21, if at any point, the IoT Application's DSLT-TF 1202 wishes to check the status of the DSLT processing, it may query the DSLT-MF 1204 to check the status. When receiving a query request, the DSLT-MF 1204 may check the state of the DSLT that it maintains in the corresponding DSLT resource.

In step 23 of FIG. 21, the DSLT-MF 1204 returns the state of the DSLT processing to the DSLT-TF 1202 that initiated the DLTS status query.

DSLT Sequencing Procedure

Figure 22:
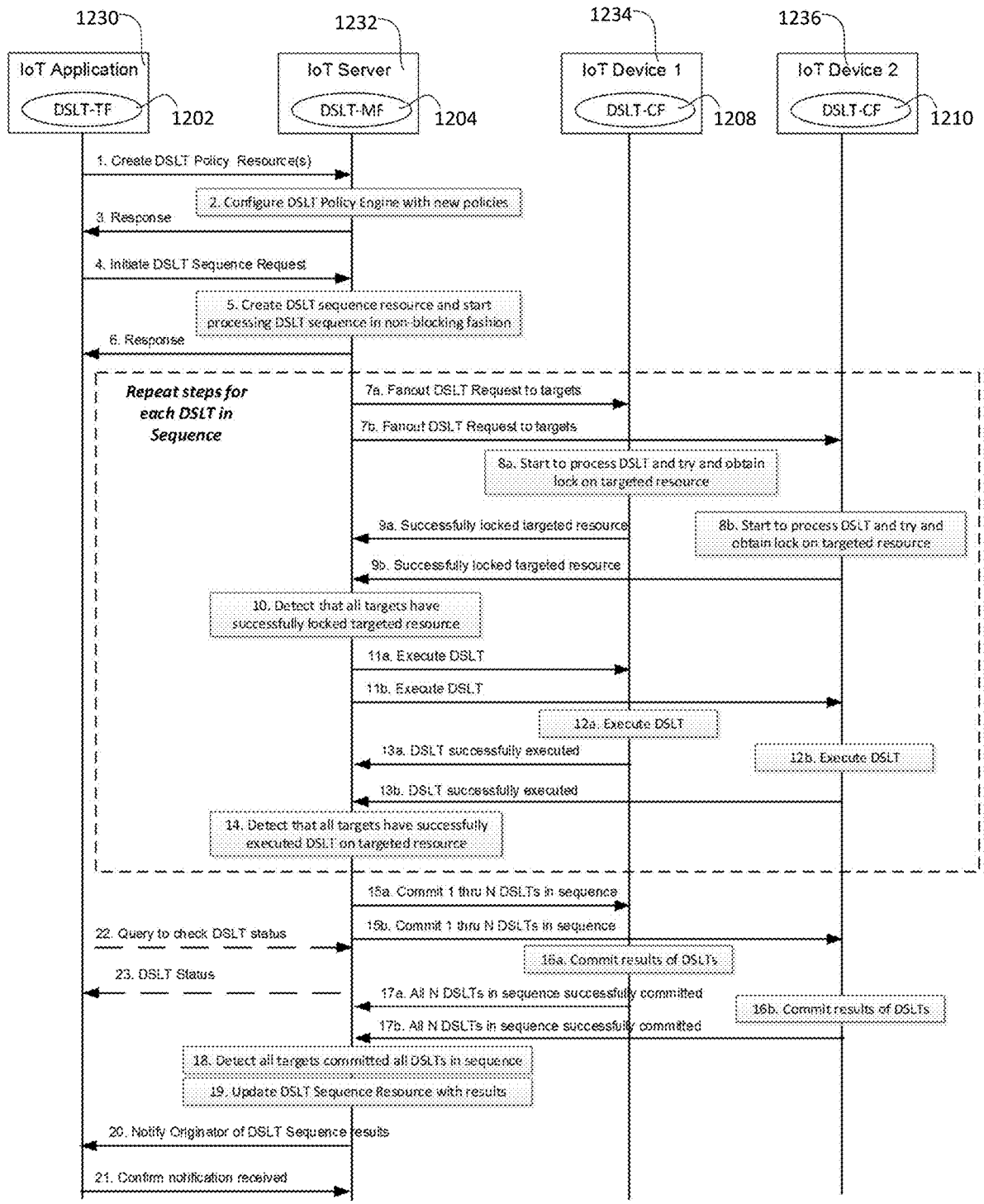
FIG. 22 is a diagram that illustrates DSLT Sequencing Procedure.

FIG. 22 shows a DSLT Sequencing Procedure.

Step 1 of FIG. 22 is an optional step. In step 1 of FIG. 22, the IoT Application's DSLT-TF 1202 sends request(s) to IoT Server's DSLT-MF 1204 to create DSLT sequence policy resources. Each policy resource may contain one or more rules to control how the DSLT-MF processes DSLT sequence requests. These rules may relate to DSLT sequence scheduling, retrying of DSLT sequences, prioritization of DSLT sequences and execution and completion criteria for DSLT sequences. Alternatively, the IoT Server's DSLT-MF 1204 may be pre-provisioned with DSLT sequence policies.

Step 2 of FIG. 22 is an optional step. In step 2 of FIG. 22, the IoT Server's DSLT-MF 1204 receives and processes request to create DSLT sequence policy resources. DSLT- MF 1204 creates policy resource and also configures its DSLT policy engine 1308 with the rules specified in the policies.

Step 3 of FIG. 22 is an optional step. In step 3 of FIG. 22, the IoT Server's DSLT-MF 1204 returns a response to the IoT Application's DSLT-TF 1202 to inform it whether or not the rules defined in the policy resources were accepted or not. If not, the DSLT-MF 1204 may provide a modified version of the rules that were accepted by DSLT-MF 1204.

In step 4 of FIG. 22, the IoT Application's DSLT-TF 1202 sends a DSLT-SEQ-TRIGGER request to the IoT Server's DSLT-MF 1204. The request may include several parameters such as a set of targeted nodes (e.g. IoT Device 1 and IoT Device 2), a list of DSLTs to perform on these nodes, a schedule of when to perform the sequence, a set of sequence execution criteria, a priority, a number of retries in case attempts to process the sequence of transactions fails, a set of sequence completion criteria, a DSLT sequence identifier and contact information that the DSLT-MF 1204 may use to process the sequence in a non-blocking manner.

In step 5 of FIG. 22, the IoT Server's DSLT-MF 1204 receives and begins to processes the DSLT-SEQ-TRIGGER request. The DSLT-MF 1204 creates a DSLT sequence resource to keep track of the transaction sequence state while they process the DSLT sequence. The DSLT-MF 1204 configures the resource's attributes with the information contained in the DSLT sequence request parameters described in Step 4.

In step 6 of FIG. 22, the IoT Server's DSLT-MF 1204 processes the request in a non-blocking fashion by returning a response to the IoT Application's DSLT-TF 1202 indicating that it has received the request and it has started to process it. Alternatively, the DSLT-MF 1204 may process this request in a blocking manner.

In step 7 of FIG. 22, the IoT Server's DSLT-MF 1204 parses the request to find the list of resources targeted by the sequence. The DSLT-MF 1204 detects that the targeted resources are not locally hosted on the IoT Server but rather hosted by IoT Devices 1 and 2. Hence the DSLT-MF 1204 prepares the first/next corresponding DSLT in the sequence to disseminate to these targeted devices. Before disseminating the DSLT, the DSLT-MF 1204 first checks if any schedule information was explicitly configured in the original DSLT-SEQ-TRIGGER request or in any schedule related policies. The DSLT-MF 1204 also checks if any priority was explicitly configured in the original DSLT-SEQ-TRIGGER request or in any policies. If so, the DSLT-MF 1204 then checks if there are any other DSLT-SEQ-TRIGGER requests it has received and that require processing. If so, the DSLT-MF 1204 uses the priority information to rank and order the execution of DSLT-SEQ-TRIGGER requests with respect to each other. Once the schedule and priority allow it, the DSLT-MF 1204 disseminates the DSLT-REQ requests to the targets accordingly.

Once the schedule and priority allow it, the DSLT-MF 1204 disseminates the DSLT-REQs to the targets accordingly. Depending on the prioritization policies of the DSLT-MF 1204, if a new DSLT-SEQ-TRIGGER is received having higher priority than a DSLT-SEQ-TRIGGER that is actively being processed, the DSLT-MF 1204 may either complete the DSLT-SEQ-TRIGGER actively being processed or pre-empt it in order to process the newly arrived and higher priority DSLT-SEQ-TRIGGER. In the case of pre-empting a sequence, the DSLT-MF 1204 may either abort and rollback the sequence in favor of re-starting the processing over again at a later time or the DSLT-MF 1204 may pause the processing of the sequence and its associated DSLTs while it is processing the higher priority sequence and then resume it later. This abort vs. pre-empt decision may be based on several factors such as whether a higher priority sequence is targeting the same resources as a lower priority sequence being actively processed. In this case, the DSLT-MF 1204 may decide to abort the lower priority sequence whereas for the case where the two sequences are targeting different resources, the DSLT-MF 1204 may choose to pre-empt the lower priority one or execute them both in parallel if supported In step 8 of FIG. 22, the DSLT-CFs 1208 and 1210 on IoT Device 1234 and 1236 each receive their DSLT-REQs. Both process the request and create a local DSLT resource to keep track of the transaction state while they process the DSLT. The DSLT-CFs 1208 and 1210 configure their resource's attributes with the information contained in the DSLT-REQ parameters. The DSLT-CFs 1208 and 1210 start processing the transaction by first checking the availability of the targeted resource(s). If the resource(s) is local to the IoT Device, the DSLT-CF 1210 checks the availability to perform the specified operation of the resource and that there are no other transactions that have currently reserved and locked the resource. If the resource is available, the DSLT-CF 1210 may lock the resource such that it may perform the transaction on it without interference from other transactions that may arrive during the processing of the current transaction. In the event that a DSLT-CF 1210 receives a DSLT-REQ and finds that the request is targeting a resource that is not hosted on the local device, the DSLT-CF 1210 may re-target the DSLT-REQ (possibly with the assistance of a DSLT-MF 1204 locally hosted on the device) to another device in the system such that the DSLT-CF on the other device may process it.

In step 9 of FIG. 22, the DSLT-CF 1210 on each IoT Device returns status to the IoT Server's DSLT-MF 1204 indicating that the request has been received, processing has started on the transaction, the targeted resource is available and the resource has been locked to allow the current transaction to proceed without interference from other transactions.

In step 10 of FIG. 22, the DSLT-MF 1204 on the IoT Server detects that all the targeted DSLT-CFs 1208 and 1210 (i.e. both IoT Devices 1234 and 1236) have responded that they have successfully locked the targeted resources. As a result the DSLT-MF 1204 determines that it may proceed to instruct the targeted DSLT-CF 1210 to execute the transaction. In the event that the DSLT-MF 1204 did not receive a successful lock response from all targets it could check whether any completion criteria is configured for the transaction or specified in any of its policies. If completion criteria is specified, the DSLT-MF 1204 may check whether the criteria allows the DSLT-MF 1204 to proceed or not (e.g. the criteria may specify that a transaction is only required to complete on a subset of the targets instead of all targets). Alternatively, in the event that one or more of the transactions failed to lock the targeted resource, the DSLT-MF 1204 may check whether or not the transaction is configured to be retried or not via its configuration parameter or via a policy setting. If retries are permitted, the DSLT-MF 1204 may retry the failed transaction. In the event that the DSLT-MF 1204 determines that the completion criteria cannot be met and it is not able to retry the transaction, the DSLT-MF 1204 may choose to abort the transaction. To abort the transaction, the DSLT-MF 1204 sends an abort command to each of the transaction targets (DSLT-CFs 1208 and 1210 on IoT Device 1234 and 1236 in this example). Upon receiving the abort, the DSLT-CF 1210 aborts the transaction by rolling back any modifications made to a resource(s) targeted by the transaction such that it is returned to the same state it was in prior to the start of the transaction. The DSLT-CF 1210 may also free up the lock on the targeted resource(s).

Alternatively, if a DSLT-CF 1210 could not lock a resource in Step 8 it may provide an indication as to why the resource is unavailable (resource does not exist, insufficient access rights, resource already locked). If the resource is locked, the DSLT-CF 1210 may also provide an indication as to the time when the resource may be unlocked (based on the timeouts associated with the locked resource). In such a case, the DSLT-MF 1204 may attempt a retry of the transaction at some later time (based on the information provided by the DSLT-CF 1210).

In step 11 of FIG. 22, the DSLT-MF 1204 on the IoT Server 1230 sends a request to each targeted DSLT-CF 1208 and 1210 to command it to execute the transaction. This command may be issued by the DSLT-MF 1204 updating a command attribute within the DSLT resource hosted on each IoT Devices 1234 and 1236 instructing the DSLT-CF 1208 and 1210 to execute the transaction.

In step 12 of FIG. 22, upon receiving the command to execute the transaction, the DSLT-CF 1208 and 1210 on each device performs the operation specified in the transaction on the targeted resource. As a result of the operation on the targeted resource, the state of a number of resources in the IoT Device may change. The DSLT-CF 1208 and 1210 keeps a copy of the pre-operation state (that is before the execution of the operation) in case it is needed if the DSLT-REQ is aborted and needs to be rolled back.

In step 13 of FIG. 22, once execution is complete, each DSLT-CF 1208 and 1210 responds back to the DSLT-MF 1204 with the results of the execution and whether or not it was successful.

In step 14 of FIG. 22, the DSLT-MF 1204 on the IoT Server detects that all the targeted DSLT-CFs 1208 and 1210 (i.e. both IoT Devices 1234 and 1236) have responded that they have successfully executed the transaction on the targeted resources. The DSLT-MF 1204 then checks whether there are any remaining DSLTs in the sequence. If there are, the DSLT-MF 1204 prepares the next DSLT and repeats steps 7-14. If there are no remaining DSLTs in the sequence, then the DSLT-MF 1204 determines that it may proceed to instruct the targeted DSLT-CF 1208 to commit the results of all the DSLTs that were processed as part of the sequence. By making it persistent and also releasing the lock on the resource to allow other transactions to access the resource and its updated state. In the event that the DSLT-MF 1204 did not receive a successful execute response from all targets it could check whether any completion criteria is configured for the transaction or specified in any of its policies. If completion criteria are specified, the DSLT-MF 1204 may check whether the criteria allows the DSLT-MF 1204 to proceed or not (e.g. the criteria may specify that a transaction is only required to complete on a subset of the targets instead of all targets). Alternatively, in the event that one or more of the executed transactions failed, the DSLT-MF 1204 may check whether or not the transaction is configured to be retried or not via its configuration parameter or via a policy setting. If retries are permitted, the DSLT-MF 1204 may retry the failed transaction. In the event that the DSLT-MF 1204 determines that the completion criteria cannot be met and it is not able to retry the transaction, the DSLT-MF 1204 may choose to abort the transaction. To abort the transaction, the DSLT-MF 1204 sends an abort command to each of the transaction targets (DSLT-CFs 1208 and 1210 on IoT Device 1234 and 1236 in this example). Upon receiving the abort, the DSLT-CF 1208 and 1210 aborts the sequence by aborting each transaction in the sequence. This results in rolling back any modifications made to resource(s) targeted by the transactions in the sequence such that they are returned to the same state they were in prior to the start of the sequence. The DSLT-CF 1208 and 1210 may also free up the lock on the targeted resources.

In step 15 of FIG. 22, the DSLT-MF 1204 on the IoT Server 1230 sends a series of commit requests to each targeted DSLT-CF 1208 and 1210 for each DSLT that was executed. This command may be issued by the DSLT-MF 1204 updating a command attribute within the DSLT resource hosted on each IoT Devices 1234 and 1236 instructing the DSLT-CF 1208 and 1210 to commit the transaction.

In step 16 of FIG. 22, upon receiving each command to commit a given DSLT, the DSLT-CF 1208 and 1210 on each device saves any updates to the resource that may have been made when executing the transaction such that its state is persistent. Based on any updates to the state of the committed resource, the DSLT-CF 1208 and 1210 may also send notifications regarding the updated state to any other entities in the system that may have subscribed to the targeted resource. The DSLT-CF 1208 and 1210 then releases any locks on the targeted resource and may delete any saved pre-operation state.

In step 17 of FIG. 22, once each commit is complete, each DSLT-CF 1208 and 1210 responds back to the DSLT-MF 1204 with the results of the commit and whether or not it was successful.

In step 18 of FIG. 22, the DSLT-MF 1204 on the IoT Server detects that all the targeted DSLT-CFs 1208 and 1210 (i.e. both IoT Devices 1234 and 1236) have responded that they have successfully committed all the transactions in the sequence on the respective targeted resources. In the event that the one or more of the commits failed, the DSLT-MF 1204 may check whether or not the respective transaction sequence is configured to be retried or not via its configuration parameter or via a policy setting. If retries are permitted, the DSLT-MF 1204 may retry the failed transaction sequence. In the event that the DSLT-MF 1204 determines that the completion criteria cannot be met and it is not able to retry the transaction sequence, the DSLT-MF 1204 may choose to report an error condition for the transaction sequence.

In step 19 of FIG. 22, the DSLT-MF 1204 updates its locally hosted DSLT sequence resource corresponding to the DSLT-SEQ-TRIGGER request it received from the IoT Application's DSLT-TF 1202. Included in this update is the status of each of the DSLTs in the sequence and that it disseminates to the IoT Devices. This status indicates whether the transaction sequence was successful and if not the reason for the failure. The DSLT-MF 1204 may also include the individual status and failure information for any failed DSLTs in the sequence.

In step 20 of FIG. 22, once the DSLT sequence processing has completed, the DSLT-MF 1204 on the IoT Server may notify the DSLT-TF 1202 on the IoT Application and include the results of the DSLT sequence. The DSLT-MF 1204 may include the overall status of the DSLT sequence as well as the individual status of each disseminated transaction in the sequence that were performed on the individual targets. This may include an error or debug information explaining the cause of the failures. This may allow technicians and operators to detect problems and swap out or repair faulty devices before re-attempting to issue another DSLT.

In step 21 of FIG. 22, after receiving a notification of the completed DSLT sequence, the IoT Application's DSLT-TF 1202 may respond back to the DSLT-MF 1204 with a confirmation that it received the notification.

In step 22 of FIG. 22, if at any point, the IoT Application's DSLT-TF 1202 wishes to check the status of the DSLT sequence processing, it may query the DSLT-MF 1204 to check the status. When receiving a query request, the DSLT-MF 1204 may check the state of the DSLT sequence that it maintains in the corresponding DSLT sequence resource.

In step 23 of FIG. 22, the DSLT-MF 1204 returns the state of the DSLT sequence processing to the DSLT-TF 1202 that initiated the DLTS status query.

OneM2M Distributed Service Layer Transaction Embodiments

Several embodiments of the DSLT mechanisms and procedures targeted towards the oneM2M Architecture [oneM2M TS-0001] are described below. Adding DSLT support to the oneM2M architecture enables a set of requests that target multiple resources to be performed in an atomic manner such that either all the requests are successfully performed or none of them are performed.

Figure 23:
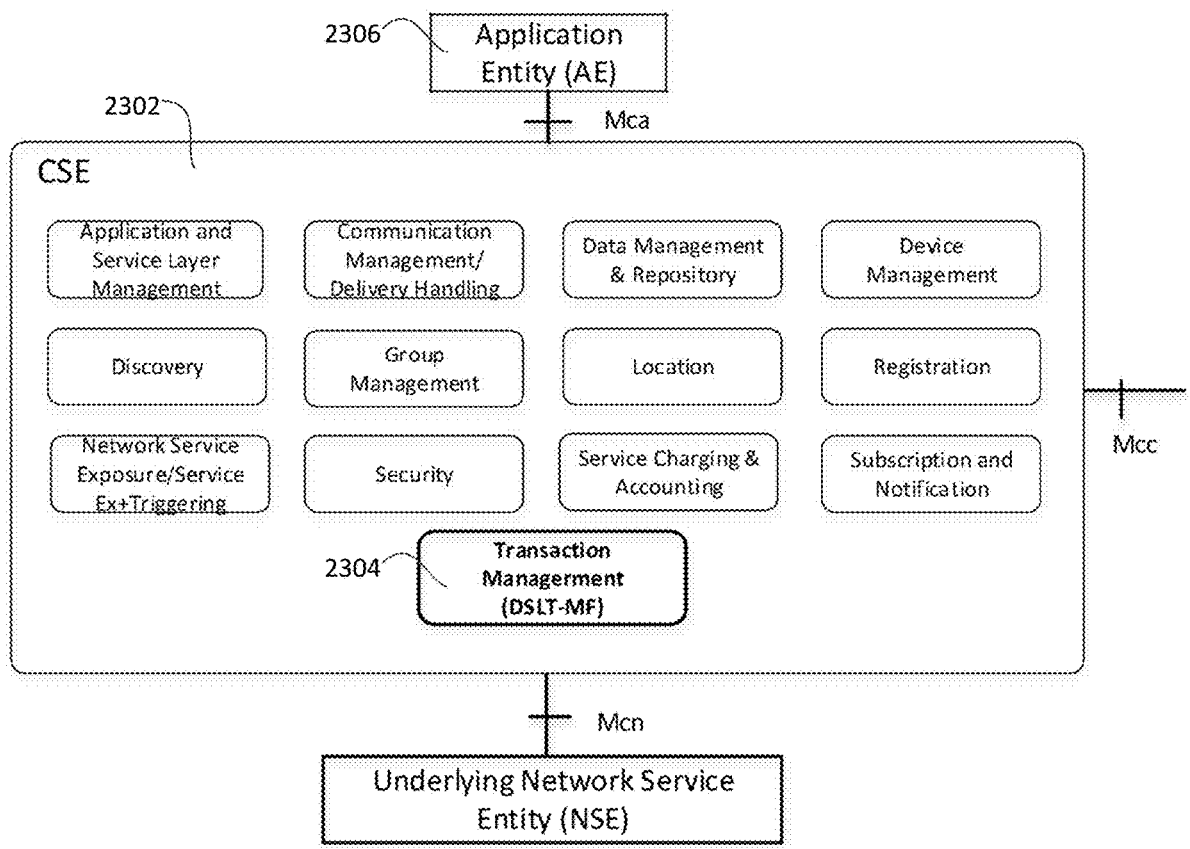
FIG. 23 is a diagram that illustrates an architecture embodiment of a Transaction Management CSF in OneM2M.

Within the oneM2M architecture, the DSLT-MF 1204 and/or DSLT-CF 1210 may be realized as a new Transaction Management Common Service Function (CSF) of a Common Services Entity (CSE) (i.e., a service layer entity) as shown in FIG. 23.

This Transaction Management CSF 2304 may be used to enable DSLT support in a oneM2M system. Alternatively, the DSLT-MF 1204 may also be realized as a capability of one or more existing oneM2M CSFs (not shown in FIG. 6-1).

DSLT-TF 1202 and/or DSLT-CF 1210 functionality may also be supported by a oneM2M Application Entity (AE) 2306. For example, an AE 2306 may initiate a DSLT request via its DSLT-TF 1202 and send this request to a DSLT-MF 2304 hosted by a CSE 2302. Alternatively, an AE 2306 may receive a DSLT request via its DSLT-CF 1210 from a DSLT-MF 1204 hosted by a CSE.

To enable a CSE 2302 and AE 2306 to support the DSLT functionality, the following sub-sections define several DSLT oneM2M embodiments.

DSLT Enhancements to oneM2M Request Parameters

To support DSLTs in the oneM2M architecture, new oneM2M request parameters for each of the DSLT and DSLT sequence message parameters are defined in Table 3 and Table 4. Supporting these parameters within oneM2M requests, enables multiple oneM2M requests to be associated with one another and atomically processed together as a set of oneM2M requests.

To support transaction based processing, the existing oneM2M Response Type parameter may be enhanced to add support for two additional non-blocking response types, nonBlockingTransactionRequestSynch and nonBlockingTransactionRequestAsynch. These two response types may be used by an Originator to specify that a request is to be processed as non-blocking and atomic transaction by the Hosting CSE. When receiving a request with a response type set to one of these new values, the Hosting CSE may support the addition of the new transaction oriented attributes in the oneM2M <request> resource as described in a later section. These new transaction oriented response types and <request> attributes enable a Hosting CSE to process a primitive in an atomic transaction oriented manner as further described in the procedures detailed in the later section. Alternatively, a Hosting CSE may support DSLTs in other ways as well. For example, by supporting the <transaction> resource along with some of the additional DSLT attributes or the <sequence> resource.

oneM2M DSLT Resource

Figure 24:
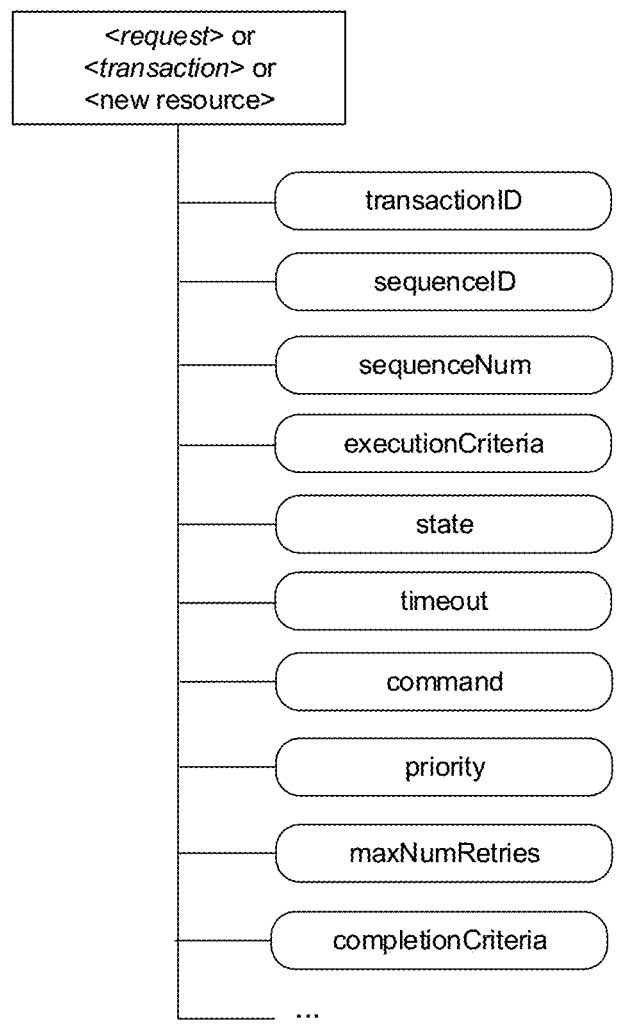
FIG. 24 is a diagram that illustrates DSLT Oriented Attributes for oneM2M resources.

To support a DSLT in the oneM2M architecture, several DSLT related attributes may be used. These attributes may be added to an existing oneM2M resource such as the <request> or <transaction> resource as shown in FIG. 24. Alternatively, a new resource type could be defined to support these attributes. For the case where a new resource type is defined then additional attributes similar to some of those already defined in the <request> and/or <transaction> resource may also need to be included to provide a complete solution. These existing oneM2M attributes have not been included for the sake of brevity. One example is a primitive attribute that contains the oneM2M request primitive. This attribute exists in the <request> and <transaction> resource and is not shown.

These new attributes allow an Originator (e.g. AE or CSE) to issue a DSLT request to a targeted CSE and have the CSE process it in a non-blocking as well as atomic manner.

TABLE 8 oneM2M DSLT Resource Attributes

| New Attributes | Multiplicity | RW/RO/WO | Description |
| --- | --- | --- | --- |
| transactionID | 0 . . . 1 | RO | Identifier of this distributed service layer transaction. |
| sequenceID | 0 . . . 1 | RO | Identifier of the distributed service layer transaction sequence associated with this distributed service layer transaction. |
| sequenceNum | 0 . . . 1 | RW | This field is used when service layer transactions associated with a sequence are kept in separate SL messages and not batched together into a single SL message. In this case, the individual messages have a sequenceID with the same value. This field defines the order in which service layer transactions within the same sequence should be processed with respect to each other. Each service layer transaction in the same sequence should have a unique value for this attribute. |
| executionCriteria | 0 . . . 1 | RW | The transaction execution criteria. Criteria may be specified by the Originator of the transaction request or the CSE that processes the request. |

TABLE 8-continued oneM2M DSLT Resource Attributes

| New Attributes | Multiplicity | RW/ RO/ WO | Description |
|---|---|---|---|
| | | | Criteria may include, but are not limited to, one or more of the following:<br>    a specific time value of when the request is to be executed<br>    a repeating/periodic SL schedule for when the request is to be repeatedly executed<br>    A threshold/value for one or more specified SL attributes or metadata. When the value(s) are met, the request is to be executed<br>    One or more SL events. When the event(s) trigger, the request is to be executed<br>    An external trigger condition that the CSE receives or detects from an underlying network<br>    An external trigger condition that the CSE receives or detects from an application or 3rd party service via the "command" attribute<br>    The identifier of one or more other requests or transactions that must be successfully completed before this request is executed. |
| state | 0 . . . 1 | RO | The current state of the transaction:<br>    Initial - if the Hosting CSE hasn't determined that the transaction request may be executed or not.<br>    Locked - if the Hosting CSE has finished the checking and guaranteed the transaction may be executed in an isolated manner at the scheduled execution time.<br>    Executed - if the Hosting CSE has successfully executed the transaction<br>    Committed - if the Hosting CSE has successfully stored the results in persistent storage<br>    Aborted - if the Hosting CSE has aborted execution of the transaction<br>Upon receiving a new non-blocking transaction request, the Hosting CSE may configure this attribute with a value of "Initial". Thereafter, the Hosting CSE may update this attribute if/when the state of the transaction changes.<br>Alternatively, the functionality defined for this new attribute could be added to the existing requestStatus attribute of the oneM2M <request> resource. |
| timeout | 0 . . . 1 | RW | This timeout may be configured explicitly in the transaction, via a configurable policy or via a system default setting.<br>In the event that the Hosting CSE does not receive a command from the Originator of the transaction and/or the execution or completion criteria are not satisfied within a timeout period, the Hosting CSE may choose to abort the transaction. |
| command | 0 . . . 1 | RW | Set by the Originator of the transaction to instruct the Hosting CSE how to proceed with processing the transaction. The values may include:<br>    Lock - Upon receiving a non-blocking transaction request, the Hosting CSE may configure this attribute with a value of Lock and try and obtain a lock on the resource targeted by the transaction. Thereafter, the Hosting CSE may wait for further commands from the transaction Originator to determine if/when to execute, commit or abort the transaction.<br>    Execute - Set by the Originator of the request (after detecting that the state is "Locked"). This signals to the Hosting CSE that it is ok to proceed with executing the transaction.<br>    Commit - Set by the Originator of the request (after detecting that the state is "Executed") to signal to the Hosting CSE that it is ok to proceed with making the executed state of the targeted resource persistent.<br>    Abort - Set by the Originator of the request |

TABLE 8-continued oneM2M DSLT Resource Attributes

| New Attributes | Multiplicity | RW/ RO/ WO | Description |
|---|---|---|---|
| | | | to cancel the transaction. If the state of the targeted resource was modified by the transaction, then the hosting CSE may roll back the state of the targeted resource to its initial state before the processing of the transaction began.<br>Trigger - An external trigger that may be used to trigger the processing of this transaction.<br>In the event that the Hosting CSE does not receive a command from the Originator of the transaction within a timeout period, the Hosting CSE may configure this attribute with a value of "Abort" and abort the transaction. This timeout may be configured explicitly in the transaction, via a configurable policy or via a system default setting. |
| priority | 0 . . . 1 | RW | This priority may be configured explicitly in the transaction, via a configurable policy or via a system default setting.<br>This priority may be used by a Hosting CSE to prioritize and rank transactions with respect to one another to determine which transactions to process before others. |
| maxNumRetries | 0 . . . 1 | RW | This field may be configured explicitly in the transaction, via a configurable policy or via a system default setting.<br>This field may be used by a Hosting CSE to determine the max number of times it may attempt to retry a transaction when processing a transaction results in a failure. A default setting may be assigned such as 0 to allow for a single try. |
| completionCriteria | 0 . . . 1 | RW | The criteria used by the Hosting CSE to determine whether or not the execution of this transaction is successful or not. Some completion criteria may include:<br>  A specified window of time in which the processing of DSLT must complete within<br>  Whether or not all disseminated requests to DSLT specified targeted resources must complete successfully or not for the successful completion of the DSLT. If not, then a list of mandatory targets and/or optional targets may be specified.<br>If any specified completion criteria cannot be met, a Hosting CSE may choose to roll back the execution of this transaction. | oneM2M DSLT Sequence Resource

Figure 25:
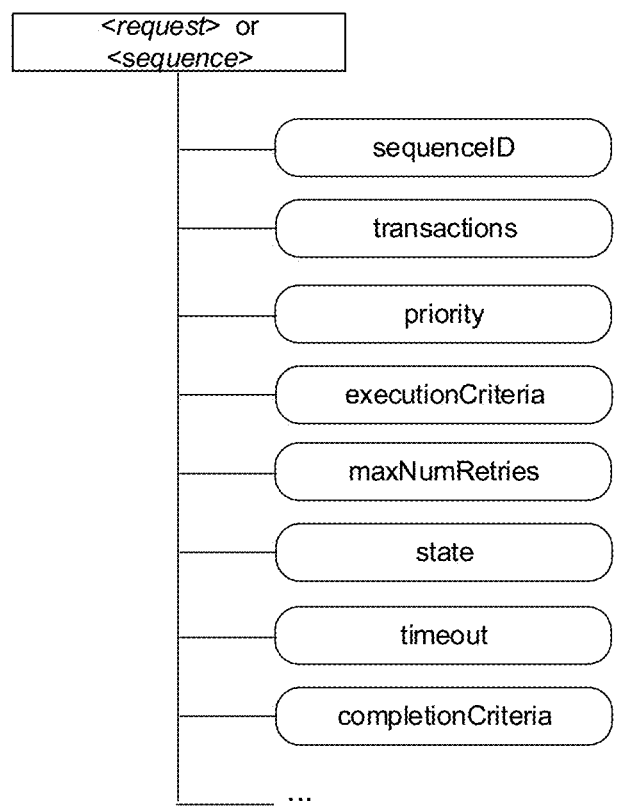
FIG. 25 is a diagram that illustrates a oneM2M DSLT sequence resource.

To support a DSLT sequence in the oneM2M architecture, a <sequence> resource having several DSLT sequence attributes is shown in FIG. 25.

This new resource and attributes allow an Originator (e.g. AE or CSE) to issue a DSLT sequence request and have the Hosting CSE process a sequence of DSLTs in a non-blocking as well as atomic manner. This processing may include the processing of the sequence of individual DSLTs by the <sequence> hosting CSE on behalf of the Originator to ensure individual DSLTs in the sequence are executed in an atomic fashion as well as the entire sequence of DSLTs is also executed in an atomic fashion (i.e. either all DSLTs are executed successfully or none of them are). This may offload overhead and burden of processing the sequence of DSLTs from the Originator. This functionality may be especially useful for cases where the Originator is making repeated requests to send DSLT sequences. Rather than having to process these repeated DSLT sequences itself, the Originator may offload this work to a <sequence> hosting CSE to perform on its behalf.

If any DSLTs in the sequence target a local resource hosted by the <sequence> hosting CSE, then the <sequence> hosting CSE may process these DSLTs itself in an atomic fashion. During this processing, the <sequence> hosting CSE may lock these local resources and ensure that no other operations are performed on them outside of the operations specified by the DSLTs in the sequence actively being processed. Once the processing of the active sequence is successfully completed and committed, this lock may be released.

If any DSLTs in the sequence target resources hosted on remote CSEs, the <sequence> hosting CSE may send a DSLT requests to the remote CSEs by creating a <request> or <transaction> resources on the remote CSEs having DSLT attributes. The <sequence> hosting CSE may then manage the state of these <request> or <transaction> resources on the remote CSEs to ensure the DSLT is processed in an atomic fashion. The <sequence> hosting CSE may wait for notifications from the remote CSEs that it is able to obtain a lock on the targeted resources. Once the notifications are received, the <sequence> hosting CSE may then instruct the remote CSEs to execute the DSLT by updating the command attribute in the corresponding <request> or <transaction> resources. The remote CSE may then wait for notification from the remote CSEs that the transaction was successfully executed. Once the notification is received, the <sequence> hosting CSE may instruct the remote CSEs to commit the results of the transaction such that the results are persistent, by again updating the command attribute in the corresponding <request> or <transaction> resources. The <sequence> hosting CSE may then wait for notifications from the remote CSEs that it was successfully committed. Once notification is received that the commit were successful, the <sequence> hosting may complete processing of the sequence request and return a response to its Originator. This response may be returned in a blocking or non-blocking fashion. If at any step during this processing, a remote CSE is not able to successfully lock, execute or commit any DSLTs in the sequence, the <sequence> hosting CSE may abort the sequence and ensure the targeted resources are rolled back by their hosting CSEs by again updating the command attribute in the corresponding <request> or <transaction> resource. Following this roll back, the resources may reflect the same state they were in before DSLT sequence processing began.

TABLE 9 oneM2M DSLT Sequence Resource Attributes

| New Attributes | Multiplicity | RW/RO/WO | Description |
|---|---|---|---|
| sequenceID | 1 | RO | Identifier of this service layer transaction sequence. |
| transactions | 0 . . . 1(L) | RW | A list of service layer transactions that are to be performed as part of an atomic sequence. Alternatively this may be a list of identifiers (e.g. URIs) of individual transaction resources. This list may be ordered to specify the sequence in which the DSLTs must be atomically executed with respect to one another. Alternatively, service layer transactions may be kept separate and sequenced together using the same sequenceID value. |
| priority | 0 . . . 1 | RW | A specified priority (e.g. High, Med, Low) that may be used by a CSE to prioritize the scheduling and execution of service layer transactions in this sequence with respect to other service layer transactions not in this sequence. |
| executionCriteria | 0 . . . 1 | RW | The service layer transaction sequence execution criteria. Criteria may be specified by the Originator of the sequence request or the CSE that processes the sequence. Criteria may include, but are not limited to, one or more of the following: <br>     a specific time value of when the sequence is to be executed <br>     a repeating/periodic SL schedule for when the sequence is to be repeatedly executed <br>     A threshold/value for one or more specified SL attributes or metadata. When the value(s) are met, the sequence is to be executed <br>     One or more SL events. When the event(s) trigger, the sequence is to be executed <br>     An external trigger condition that the CSE receives or detects from an application or 3rd party service or underlying network <br>     The identifier of one or more other requests or transactions that must be successfully completed before this sequence is executed. |
| maxNumRetries | 0 . . . 1 | RW | The maximum number of times to attempt retrying a service layer transaction sequence in the event that one or more service layer transactions in the sequence are not successful. |
| state | 0 . . . 1 | RO | The current processing state of the sequence of transaction: <br>     Initial - Sequence created but not yet processed (e.g. waiting for scheduled time to execute). <br>     Executing - if the Hosting CSE is in the process of executing the sequence of transactions <br>     Complete - if the Hosting CSE has completed execution of the sequence of transactions <br>     Aborted - if the Hosting CSE has aborted execution of the sequence of transactions <br> Upon receiving a new sequence request, the Hosting CSE may configure this attribute with a value of "Initial". Thereafter, the Hosting CSE may update this attribute if/when the state of the transaction sequence changes. |

TABLE 9-continued oneM2M DSLT Sequence Resource Attributes

| New Attributes | Multiplicity | RW/ RO/ WO | Description |
|---|---|---|---|
| timeout | 0 . . . 1 | RW | This timeout may be configured explicitly in the resource, via a configurable policy or via a system default setting.<br>In the event that the Hosting CSE has not completed processing of the sequence before the timeout occurs, the Hosting CSE may choose to abort the sequence. |
| completionCriteria | 0 . . . 1 | RW | The criteria used by the Hosting CSE to determine whether or not the execution of this service layer transaction sequence is successful or not. Completion criteria may include:<br>   A specified window of time in which the processing of DSLT must complete within<br>   Whether or not all disseminated requests to DSLT specified targeted resources must complete successfully or not for the successful completion of the DSLT. If not, then a list of mandatory targets and/or optional targets may be specified.<br>If any specified completion criteria cannot be met, a Hosting CSE may choose to roll back the execution of this service layer transaction sequence. | oneM2M DSLT Policy Resource(s)

To support DSLT policy configuration in the oneM2M architecture, several DSLT policy attributes are defined in Table 10. These attribute may be added to an existing oneM2M resource such as existing oneM2M <mgmtObj> specialization(s) such as the ones defined for oneM2M CMDH functionality. Alternatively, a new resource type may be defined to support these attributes such as new oneM2M <mgmtObj> specializations specific to DSLT functionality. For example, new specializations may be defined for DSLT scheduling policies, DSLT retry policies, DSLT prioritization policies, DSLT completion criteria policies and DSLT sequencing policies.

These new attributes allow an Originator (e.g. AE or CSE) to configure DSLT related policies in a CSE to control how it processes DSLT requests.

TABLE 10 oneM2M DSLT Policy Resource Attributes

| New Attributes | Multiplicity | RW/ RO/ WO | Description |
|---|---|---|---|
| applicableTransactionOriginators | 0 . . . 1(L) | RW | List of identifiers of the service layer transaction originators for which this policy is applicable to. |
| applicableTransactionTargets | 0 . . . 1(L) | RW | List of identifiers of the service layer transaction targets for which this policy is applicable to. |
| defaultTransactionSchedule | 0 . . . 1 | RW | Default service layer transaction execution schedule applied to a service layer transaction if one is not explicitly defined in the service layer transaction request. |
| defaultTransactionPriority | 0 . . . 1 | RW | Default service layer transaction execution priority applied to a service layer transaction if one is not explicitly defined in the service layer transaction request. |
| defaultTransactionTimeout | 0 . . . 1 | RW | Default service layer transaction execution timeout applied to a service layer transaction if one is not explicitly defined in the service layer transaction request. |
| defaultTransactionExecutionCriteria | 0 . . . 1 | RW | Default service layer transaction execution criteria applied one is not explicitly defined in the service layer transaction request. |
| defaultTransactionCompletionCriteria | 0 . . . 1 | RW | Default service layer transaction completion criteria applied to a service layer transaction if one is not explicitly defined in the service layer transaction request. |
| defaultTransacitonNumRetries | 0 . . . 1 | RW | Default service layer transaction number of retries applied to a service layer transaction if one is not explicitly defined in the service layer transaction request. |
| applicableSequenceOriginators | 0 . . . 1 | RW | List of identifiers of the sequence originators for which this policy is applicable to. |

TABLE 10-continued oneM2M DSLT Policy Resource Attributes

| New Attributes | Multiplicity | RW/ RO/ WO | Description |
|---|---|---|---|
| applicableSequenceTargets | 0 . . . 1 | RW | List of identifiers of the sequence targets for which this policy is applicable to. |
| defaultSequenceSchedule | 0 . . . 1 | RW | Default sequence execution schedule applied to a sequence if one is not explicitly defined in the sequence request. |
| defaultSequencePriority | 0 . . . 1 | RW | Default sequence execution priority applied to a sequence if one is not explicitly defined in the sequence request. |
| defaultSequenceTimeout | 0 . . . 1 | RW | Default sequence execution timeout applied to a sequence if one is not explicitly defined in the sequence request. |
| defaultSequenceExecutionCriteria | 0 . . . 1 | RW | Default sequence execution criteria applied to a sequence if one is not explicitly defined in the sequence request. |
| defaultSeqeunceCompletionCriteria | 0 . . . 1 | RW | Default sequence completion criteria applied to a sequence if one is not explicitly defined in the sequence request. |
| defaultSequenceNumRetries | 0 . . . 1 | RW | Default sequence number of retries applied to a sequence if one is not explicitly defined in the sequence request. |

DSLT Enhancements to oneM2M <Group> Resource

Figure 26:
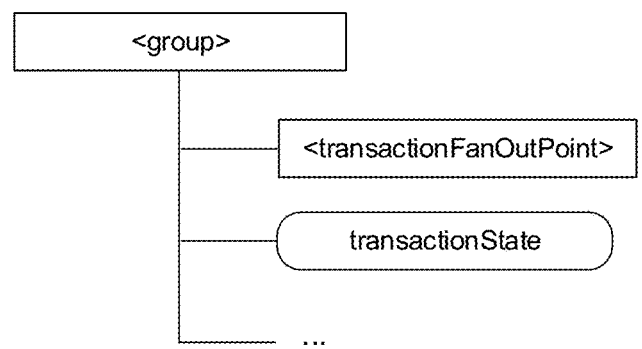
FIG. 26 is a diagram that illustrates DSLT Enhancements for oneM2M <group> resource.

To support the atomic dissemination and processing of a DSLT to multiple targeted resources hosted on one or more CSEs, a new <transactionFanOutPoint> virtual resource and a new transactionState attribute to the oneM2M <group> resource may be used as shown in FIG. 26. This new resource and attribute may optionally be used by the Originator of a DSLT request. When this resource is used, the group hosting CSE may handle the processing of the DSLT request on behalf of the Originator. This processing may include the fan out of the DSLT to each of the member resources specified by the group. If the member resources are hosted on remote CSEs, the group hosting CSE may fan out the DSLT to the remote CSE by creating a <request> or <transaction> resource targeting the member resource. The processing may also include the group hosting CSE managing the state of each DSLT for each corresponding member resource. This may be done on behalf of the Originator to ensure the DSLTs are executed in an atomic fashion with respect to one another (i.e. either all are executed successfully or none of them are). This may offload overhead and burden of processing the DSLT from the Originator. This functionality may be especially useful for cases where the Originator is making repeated requests to send DSLTs to a large number of targets. Rather than having to process these repeated DSLTs itself for a large number of targeted resources, the Originator may offload this work to a group hosting CSE to perform on its behalf. Alternatively, if the Originator of the DSLT would rather manage the DSLT itself it may do so and not use this new resource.

This virtual resource does not have a representation, rather it is the child resource of a <group> resource. Whenever a oneM2M request primitive is sent to the <transactionFanOutPoint> resource, the group hosting CSE may process the request by fanning out a corresponding DSLT CREATE request to each of the members specified by the memberIDs attribute of the parent <group> resource. For each DSLT CREATE request it fans out to a member, the group hosting CSE may configure an attribute with the original request primitive it received from the Originator, a state attribute with a value of "Initial" and an executionTime attribute with a value less than a result expiration time parameter, if specified by Originator, or a local policy configured at the group hosting CSE. Thereafter, the group hosting CSE may coordinate the handling of the fanned out DSLT requests such that they are all processed in an atomic manner with respect to one another (i.e. all the fanned out transactions either complete successfully or all are aborted). For DSLT CREATE requests that are fanned out to member hosting CSEs, these CSEs may check whether they may perform the specified primitive on the member resource at the specified execution time. If the check is successful, a member hosting CSE may respond back to the group hosting CSE that they successfully created the DSLT. If not successful, a member hosting CSE may respond back with a failure. A timer may be maintained by the group hosting CSE for the processing of the transaction. The transaction is allowed to proceed and execute if successful DSLT create responses are received from each member hosting CSE before the timer expires. The group hosting CSE may optionally send commands to each member hosting CSE to instruct them to execute and commit the transaction. If the transaction is not allowed to proceed, the group Hosting CSE may abort the transaction by sending DSLT DELETE requests to any member Hosting CSE indicating they successfully created a DSLT. If the transaction is allowed to execute, the individual responses from each request primitive executed on a member may be returned to the group Hosting CSE. The group Hosting CSE may then aggregate the responses and return the results to the Originator. A timer may also be maintained by the Group Hosting CSE for the aggregation of the responses. The responses are aggregated if all the responses have been received or when the timer expires. The responses received after the time expires may be discarded. If at any step during this processing, the group hosting CSE does not get successful confirmation back from each of the group members that they are able to lock, execute or commit the DSLT, the group hosting CSE may abort the DSLT and ensure the targeted member resources are rolled back by their respective member hosting CSEs. Following this roll back, the resources may reflect the same state they were in before DSLT processing began. The group hosting CSE may also keep the transactionState attribute updated with the processing state of the transaction (e.g. initial, locked, executed, committed or aborted).

In another embodiment, a new attribute (e.g. transactionFanOutEnable) may instead be added to the <group> resource. This attribute may be used to qualify whether a request targeting the existing <fanOutPoint> virtual resource of a <group> is to be processed as a DSLT or non-DSLT request. This alternative is not shown in FIG. 26.

In yet another embodiment, a group Hosting CSE may instead rely on the presence of one or more DSLT related parameters in a request to detect whether or not a request targeting the existing <fanoutPoint> of the oneM2M <group> resource is to be processed as a DSLT or not.

oneM2M Lock Attribute

The addition of a oneM2M "lock" common attribute to all oneM2M resources may be used. This new attribute may be used by a Hosting CSE to keep track as well advertise whether a resource is in the locked stated or not. For example, when a DSLT is being processed, its targeted resources may be locked. When locked, the lock attribute may be updated to reflect that a resource is locked. This attribute may be configured with value such as true or false. Alternatively, this attribute may support values that reflect to different types of locks (e.g. locked for updates only).

oneM2M DSLT Identifiers

To support DSLT functionality oneM2M DSLT identifiers may be used. Since the processing of an individual DSLT request may require multiple oneM2M requests each having their own distinct oneM2M request identifiers, the DSLT identifier provides a mechanism to associate these separate oneM2M requests into a single DSLT. This level of association enables distributed and atomic processing of the individual oneM2M requests which make up a DSLT. Table 11 provides a description of the oneM2M DSLT identifier formats. Table 12 provides a description of the structure of a oneM2M DSLT-based request identifiers.

TABLE 11 oneM2M DSLT Identifier Formats

| DSLT ID Format | Description |
| --- | --- |
| CSE Relative transactionID | transactionID E.g. trans001 |
| Service Provider Relative transactionID | CSE-ID/transactionID E.g. cse001/trans001 |
| Absolute transactionID | SP-ID/CSE-ID/transactionID E.g. sp001/cse001/trans001 |

TABLE 12 oneM2M DSLT-based Request Identifier Format

| DSLT-based Request ID Format | Description |
| --- | --- |
| CSE Relative | transactionID/requestID E.g. trans001/req001 |
| Service Provider Relative | CSE-ID/transactionID/requestID E.g. cse001/trans001/req001 |
| Absolute | SP-ID/CSE-ID/transactionID/requestID E.g. sp001/cse001/trans001/req001 |

To support DSLT sequence functionality a oneM2M identifier for a DSLT sequence is described. Since the processing of a DSLT sequence may require the processing of multiple DSLTs and the processing of each DSLT may require the processing of multiple oneM2M requests each having their own distinct oneM2M request identifiers, the DSLT sequence identifier provides a mechanism to associate these multiple DSLTs and oneM2M requests into a single DSLT sequence. This level of association enables distributed and atomic processing of the individual DSLTs and oneM2M requests which make up a DSLT sequence. Table 13 provides a description of the oneM2M DSLT sequence identifier formats. Table 14 provides a description of the structure of a oneM2M DSLT sequence-based DSLT identifier. Table 15 provides a description of the structure of a oneM2M DSLT sequence-based request identifier

TABLE 13

DSLT Sequence Identifier Formats

| DSLT Sequence ID Format | Description |
| --- | --- |
| CSE Relative | sequenceID E.g. seq001 |
| Service Provider Relative | CSE-ID/sequenceID E.g. cse001/seq001 |
| Absolute | SP-ID/CSE-ID/sequenceID E.g. sp001/cse001/seq001 |

TABLE 14 oneM2M DSLT Sequence-based DSLT Identifier Format

| DSLT Sequence-based DSLT ID Format | Description |
| --- | --- |
| CSE Relative | sequenceID/transactionID e.g. seq001/trans001 |
| Service Provider Relative | CSE-ID/sequenceID/transactionID e.g. cse001/seq001/trans001 |
| Absolute | SP-ID/CSE-ID/sequenceID/transactionID e.g. sp001/cse001/seq001/trans001 |

TABLE 15 oneM2M DSLT Sequence-based Request Identifier Format

| DSLT Sequence-based Request ID Format | Description |
| --- | --- |
| CSE Relative | sequenceID/transactionID/requestID e.g. seq001/trans001/req001 |
| Service Provider Relative | CSE-ID/sequenceID/transactionID/requestID e.g. cse001/seq001/trans001/req001 |
| Absolute | SP-ID/CSE-ID/sequenceID/transactionID/requestID e.g. sp001/cse001/seq001/trans001/req001 | oneM2M DSLT Group Fanout Procedure

Figure 27:
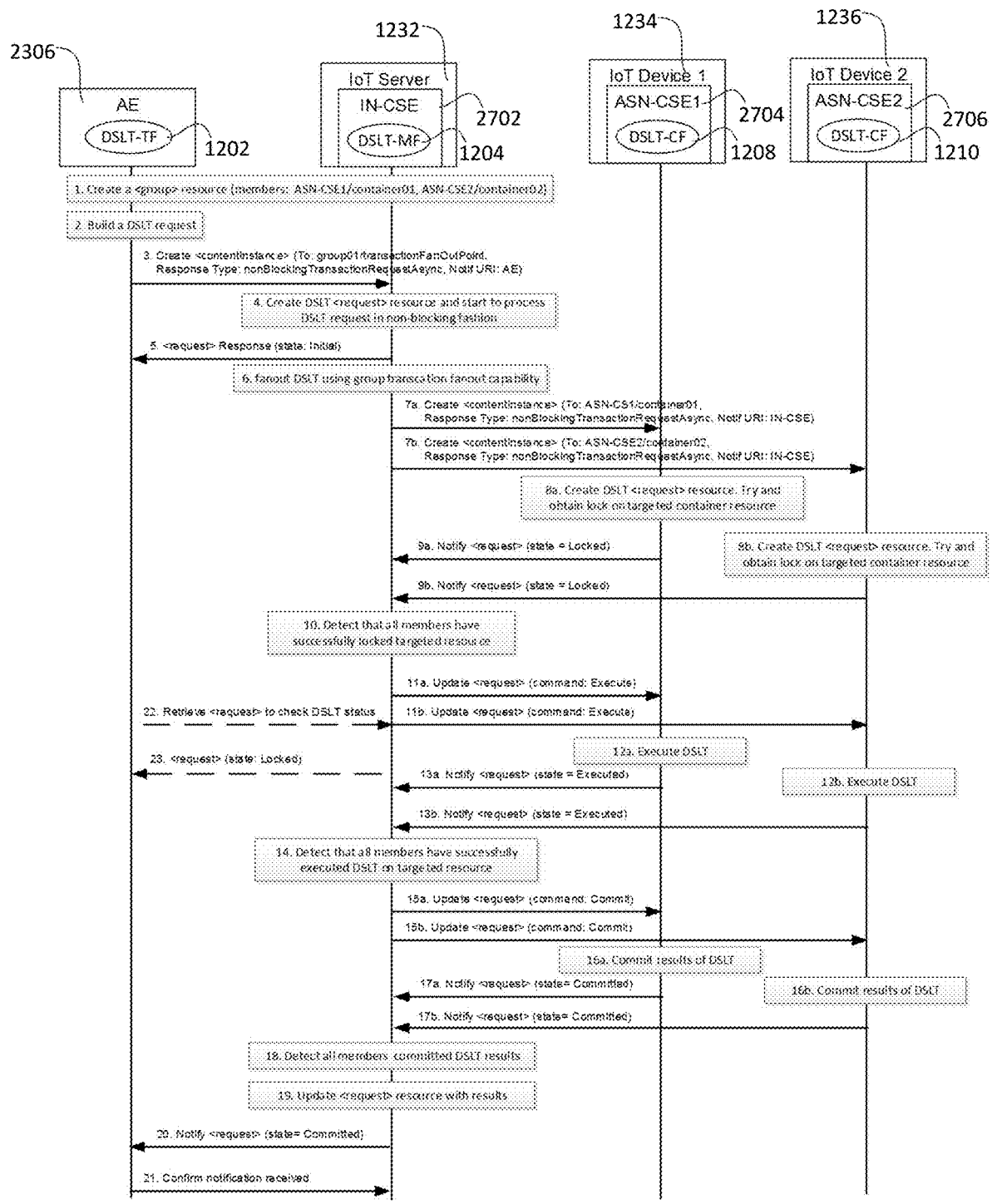
FIG. 27 is a diagram that illustrates a oneM2M DSLT group fanout procedure.

FIG. 27 shows a oneM2M DSLT Group Fanout Procedure.

In step 1 of FIG. 27, a oneM2M <group> resource is created. The members of the group are configured to be container resources hosted on ASN-CSE1 and ASN-CSE2. This group may be created by the AE hosting the DSLT-TF 1202 or another AE in the system.

In step 2 of FIG. 27, the AE hosting the DSLT-TF 1202 function builds a oneM2M DSLT request in order to atomically create a oneM2M <contentInstance> under the container resources hosted by ASN-CSE1 and ASN-CSE2. This DSLT request may be structured as a oneM2M <contentInstance> CREATE primitive as shown in FIG. 27. Alternatively, this DSLT request may be structured as a oneM2M <transaction> CREATE request primitive that encapsulates the <contentInstance> CREATE primitive within its primitive attribute. Although not shown in FIG. 27, the request may include additional parameters as well such as a schedule of when to perform the operation, a set of execution criteria, a priority, a number of retries in case attempts to process the transaction fail and a set of completion criteria.

In step 3 of FIG. 27, the AE hosting the DSLT-TF 1202 function sends the DSLT request to the IN-CSE 2702 that supports a DSLT-MF 1204 capability. The request is sent to the <transactionFanOutPoint> child resource of the group resource created in Step 1 such that the IN-CSE 2702 may process the request by disseminating it to the members in an atomic manner. This request may be sent using a non-blocking transaction request which is a new type of oneM2M non-blocking request. In this request, the AE may specify a notification callback URI which it would like the IN-CSE 2702 to use when notifying it when the processing of the non-blocking request has completed. Alternatively, the AE could use a blocking request instead.

In step 4 of FIG. 27, the IN-CSE 2702 receives the DSLT request. If the request is sent as a non-blocking transaction, the IN-CSE 2702 creates a oneM2M <request> resource that supports the transaction oriented attributes and configures the state attribute to "Initial". This <request> resource may be used by the IN-CSE 2702 to keep track of the DSLT request resource while it processes the DSLT.

In step 5 of FIG. 27, the IN-CSE 2702 returns a response to the AE indicating that it has received the request and it has started to process it. Alternatively, the request may be processed in a blocking manner.

In step 6 of FIG. 27, the IN-CSE 2702 then processes the DSLT using the group transaction fanout capability.

Step 7 of FIG. 27, the IN-CSE 2702 detects that the group member resources are not locally hosted on the IN-CSE 2702. Hence the IN-CSE 2702 prepares corresponding DSLT requests (i.e. <contentInstance> CREATE primitive) to disseminate (i.e. fanout) to these targeted devices. This DSLT may be structured as a non-blocking oneM2M <contentInstance> CREATE primitive as shown in FIG. 27. Alternatively, this DSLT request may be structured as a oneM2M <transaction> CREATE request primitive that encapsulates the <contentInstance> CREATE primitive within its primitive attribute.

In step 8 of FIG. 27, the DSLT-CFs 1208 and 1210 on ASN-CSE 2704 and 2706 each receive the DSLT to CREATE the <contentInstance> and process the request by creating a <request> (or alternatively a <transaction>) resource to keep track of the transaction state while they process the DSLT. The ASN-CSEs 2704 and 2706 configure the state of this resource with the transaction information contained in the DSLT. The ASN-CSEs 2704 and 2706 start processing the transaction by first checking the availability of the targeted resource(s). The ASN-CSEs 2704 and 2706 check the availability to perform the specified operation of the resource and that there are no other transactions that have currently reserved and locked the resource. If the resource is available, the ASN-CSEs 2704 and 2706 locks the resource such that it may perform the transaction on it without interference from other transactions that may arrive during the processing of the current transaction.

In step 9 of FIG. 27, the ASN-CSEs 2704 and 2706 return status to the IN-CSE 2702 indicating that the DSLT has been received, processing has started on the transaction, the targeted resource is available and the resource has been locked to allow the current transaction to proceed without interference from other transactions.

In step 10 of FIG. 27, the IN-CSE 2702 detects that all the members have responded that they have successfully locked the targeted resources. As a result the IN-CSE 2702 determines that it may proceed to instruct the targeted members to execute the transaction.

In step 11 of FIG. 27, the IN-CSE 2702 sends a request to each ASN-CSE 2704 and 2706 to update the command attribute in its corresponding <request> resource associated with the transaction. The command attribute is updated with a value of "Execute". Alternatively this command attribute may be an attribute of a <transaction> resource.

In step 12 of FIG. 27, upon receiving the command to execute the transaction, the each ASN-CSE 2704 and 2706 performs the operation specified in the transaction on the targeted resource.

In step 13 of FIG. 27, once execution is complete, each ASN-CSE 2704 and 2706 responds back to the IN-CSE 2702 with the results of the execution and whether or not it was successful.

In step 14 of FIG. 27, the IN-CSE 2702 detects that all the group members have responded that they have successfully executed the transaction on the targeted resources. As a result the IN-CSE 2702 determines that it may proceed to instruct the members to commit the results (e.g. the updated resource representation) by making it persistent and also releasing the lock on the resource to allow other transactions to access the resource and its updated state.

In step 15 of FIG. 27, the IN-CSE 2702 sends a request to each group member to command it to commit the transaction. This command may be issued by the IN-CSE 2702 updating a command attribute within the <request> (or alternatively <transaction>) resource hosted on each ASN-CSE 2704 and 2706 instructing it to commit the transaction.

In step 16 of FIG. 27, upon receiving the command to commit the transaction, each ASN-CSE 2704 and 2706 saves any updates to the resource that may have been made when executing the transaction such that its state is persistent. The ASN-CSEs 2704 and 2706 then releases any locks on the targeted resource.

In step 17 of FIG. 27, once the commit is complete, each ASN-CSE 2704 and 2706 responds back to the IN-CSE 2702 with the results of the commit and whether or not it was successful.

In step 18 of FIG. 27, the IN-CSE 2702 detects that all the group members (i.e. both ASN-CSE 2704 and 2706) have responded that they have successfully committed the transaction on the targeted resources.

In step 19 of FIG. 27, the IN-CSE 2702 updates its locally hosted <request> resource corresponding to the DSLT it received from the AE. Included in this update is the status of each of the DSLTs that it disseminated to the group members indicating whether the transactions were successful and if not the cause or reason for the failure.

In step 20 of FIG. 27, once the DSLT processing has completed, the IN-CSE 2702 may notify the AE and include the results of the DSLT. The IN-CSE 2702 may include the overall status of the DSLT as well as the individual status of each disseminated transaction that were performed on the individual targets. This may include an error or debug information explaining the cause of the failures. This may allow technicians and operators to detect problems and swap out or repair faulty devices before re-attempting to issue another DSLT.

In step 21 of FIG. 27, after receiving a notification of the completed DSLT, the AE may respond back to the IN-CSE 2702 with a confirmation that it received the notification.

In step 22 of FIG. 27, if at any point, the AE wishes to check the status of the DSLT processing, it may query the <request> resource hosted by the IN-CSE 2702 to check the status. When receiving a query request, the IN-CSE 2702 may check the state of the DSLT that it maintains in this resource.

In step 23 of FIG. 27, the IN-CSE 2702 returns the state of the DSLT processing to the AE.

oneM2M DSLT Sequence Procedure

Figure 28:
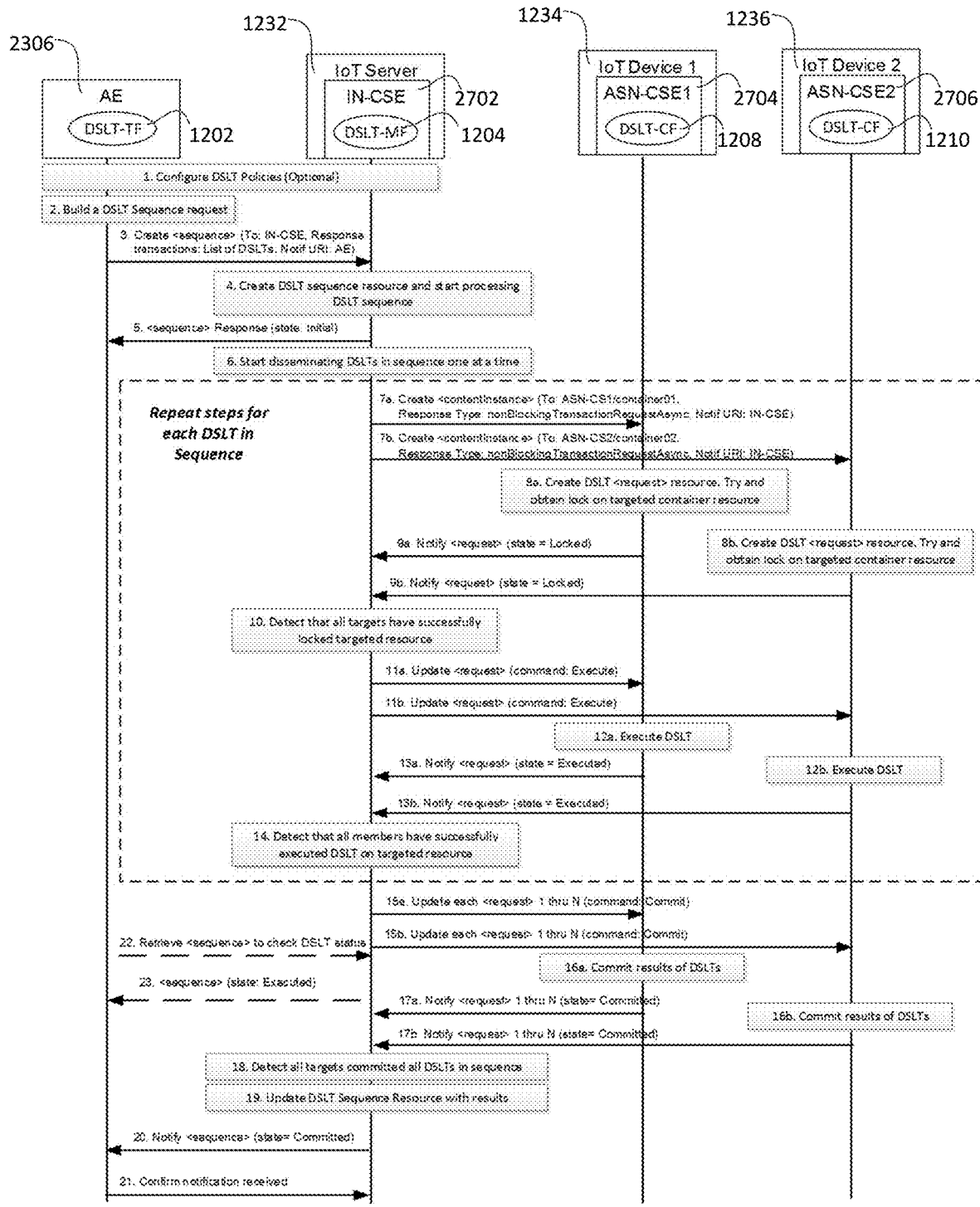
FIG. 28 is a diagram that illustrates a oneM2M DSLT sequencing procedure.

FIG. 28 shows a oneM2M DSLT Sequencing Procedure.

Step 1 of FIG. 28 is optional. In step 1 of FIG. 28, one or more oneM2M DSLT or DSLT Sequence policy resources are created. These resources may be created by the AE hosting the DSLT-TF 1202 or another AE in the system. Each policy resource may contain one or more rules to control how the DSLT-MF 1204 hosted by the IN-CSE 2702 processes DSLT sequence requests. These rules may relate to DSLT sequence scheduling, retrying of DSLT sequences, prioritization of DSLT sequences and execution and completion criteria for DSLT sequences. Alternatively, the IN-CSE 2702 may be pre-provisioned with DSLT sequence policies.

In step 2 of FIG. 28, the AE hosting the DSLT-TF 1202 function builds a oneM2M DSLT sequence request in order to atomically create a series of oneM2M <contentInstance> under the container resources hosted by ASN-CSE 2704 and 2706. This DSLT sequence request may be structured as a oneM2M <sequence> CREATE primitive. A <sequence> resource may encapsulates a series of <contentInstance> CREATE primitives within its transactions attribute. Each <contentInstance> CREATE primitive may target a group resource hosted on the IN-CSE 2702 having its members attribute configured to be the container resources hosted by ASN-CSE 2704 and 2706. Therefore each <contentInstance> CREATE primitive is a separate transaction within the sequence. Although not shown in FIG. 27, the individual, <contentInstance> CREATE primitives may instead be created as separate <transaction> resources on the IN-CSE 2702. The transactions attribute of the <sequence> resource may be configured with a list of identifiers referencing these individual <transaction> resources. The <sequence> CREATE primitive may also include additional parameters as well such as a schedule of when to perform the sequence, a set of execution criteria, a priority, a number of retries in case attempts to process the sequence fail and a set of completion criteria.

In step 3 of FIG. 28, the AE hosting the DSLT-TF 1202 function sends the DSLT sequence request to the IN-CSE 2702 that supports a DSLT-MF 1204 capability. This request may be sent using a blocking or non-blocking request to the IN-CSE 2702. If non-blocking is used, the AE may specify a notification callback URI which it would like the IN-CSE 2702 to use when notifying it when the processing of the non-blocking request has completed. Alternatively, the AE could use a blocking request or one of the existing oneM2M non-blocking requests instead.

In step 4 of FIG. 28, the IN-CSE 2702 receives the DSLT sequence request.

In step 5 of FIG. 28, the IN-CSE 2702 returns a response to the AE indicating that it has received the request and it has started to process it. Alternatively, the request may be processed in a blocking manner. Not shown in the figure, but the AE may create a subscription to the <sequence> resource in order to receive notifications from the IN-CSE 2702 when changes to the <sequence> (e.g. updates to the state of the sequence) occur.

In step 6 of FIG. 28, the IN-CSE 2702 then starts processing the DSLT sequence.

In step 7 of FIG. 28, the IN-CSE 2702 parses the request to get the first DSLT in the sequence. The IN-CSE 2702 detects this DSLT targets a group resource consisting of member resources that are containers hosted on ASN-CSE 2704 and 2706. Hence the IN-CSE 2702 prepares corresponding DSLT requests (i.e. <contentInstance> CREATE primitive) to disseminate (i.e. fanout) to these targeted devices. This DSLT may be structured as a non-blocking oneM2M <contentInstance> CREATE primitive as shown in FIG. 27. Alternatively, this DSLT request may be structured as a oneM2M <transaction> CREATE request primitive that encapsulates the <contentInstance> CREATE primitive within its primitive attribute.

In step 8 of FIG. 28, the DSLT-CFs 1208 and 1210 on IoT Device 1234 and 1236 each receive their DSLT-REQs. Both process the request and create a local DSLT resource to keep track of the transaction state while they process the DSLT. The DSLT-CFs configure their resource's attributes with the information contained in the DSLT-REQ parameters. The DSLT-CFs start processing the transaction by first checking the availability of the targeted resource(s). If the resource(s) is local to the IoT Device, the DSLT-CF 1210 checks the availability to perform the specified operation of the resource and that there are no other transactions that have currently reserved and locked the resource. If the resource is available, the DSLT-CF may lock the resource such that it may perform the transaction on it without interference from other transactions that may arrive during the processing of the current transaction. In the event that a DSLT-CF 12210 receives a DSLT-REQ and finds that the request is targeting a resource that is not hosted on the local device, the DSLT-CF may re-target the DSLT-REQ (possibly with the assistance of a DSLT-MF 1204 locally hosted on the device) to another device in the system such that the DSLT-CF 1208 on the other device may process it.

The DSLT-CFs on ASN-CSE 2704 and 2706 each receive the DSLT to CREATE the <contentInstance> and process the request by creating a <request> (or alternatively a <transaction>) resource to keep track of the transaction state while they process the DSLT. The ASN-CSEs 2704 and 2706 configure the state of this resource with the transaction information contained in the DSLT. The ASN-CSEs 2704 and 2706 start processing the transaction by first checking the availability of the targeted resource(s). The ASN-CSEs 2704 and 2706 check the availability to perform the specified operation of the resource and that there are no other transactions that have currently reserved and locked the resource. If the resource is available, the ASN-CSEs 2704 and 2706 locks the resource such that it may perform the transaction on it without interference from other transactions that may arrive during the processing of the current transaction.

In step 9 of FIG. 28, the ASN-CSEs 2704 and 2706 return status to the IN-CSE 2702 indicating that the DSLT has been received, processing has started on the transaction, the targeted resource is available and the resource has been locked to allow the current transaction to proceed without interference from other transactions.

In step 10 of FIG. 28, the IN-CSE 2702 detects that all the members have responded that they have successfully locked the targeted resources. As a result the IN-CSE 2702 determines that it may proceed to instruct the targeted members to execute the transaction.

In step 11 of FIG. 28, the IN-CSE 2702 sends a request to each ASN-CSE to update the command attribute in its corresponding <request> resource associated with the transaction. The command attribute is updated with a value of "Execute". Alternatively this command attribute may be an attribute of a <transaction> resource.

In step 12 of FIG. 28, upon receiving the command to execute the transaction, the each ASN-CSE 2704 and 2706 performs the operation specified in the transaction on the targeted resource.

In step 13 of FIG. 28, once execution is complete, each ASN-CSE 2704 and 2706 responds back to the IN-CSE 2702 with the results of the execution and whether or not it was successful.

In step 14 of FIG. 28, the IN-CSE 2702 detects that all the targeted members (i.e. ASN-CSE 2704 and 2706) have responded that they have successfully executed the transaction on the targeted resources. The IN-CSE 2702 then checks whether there are any remaining DSLTs in the sequence. If there are, the IN-CSE 2702 prepares the next DSLT and repeats steps 7-14. If there are no remaining DSLTs in the sequence, then the IN-CSE 2702 determines that it may proceed to instruct the members to commit the results of all the DSLTs that were processed as part of the sequence by making it persistent and also releasing the lock on the resource to allow other transactions to access the resource and its updated state.

In step 15 of FIG. 28, the IN-CSE 2702 sends a series of commit requests to ASN-CSE 2704 and 2706 for each DSLT that was executed. Each command may be issued by the IN-CSE 2702 updating a command attribute within the <request> (or alternatively <transaction> resource hosted on each ASN-CSE 2704 and 2706 instructing it to commit the corresponding transaction.

In step 16 of FIG. 28, upon receiving each command to commit a given DSLT, each ASN-CSE 2704 and 2706 saves any updates to the resource that may have been made when executing the transaction such that its state is persistent. Based on any updates to the state of the committed resource, it may also send notifications regarding the updated state to any other entities in the system that may have subscribed to the targeted resource. Each ASN-CSE 2704 and 2706 then releases any locks on the targeted resource and may delete any saved pre-operation state.

In step 17 of FIG. 28, once each commit is complete, each ASN-CSE 2704 and 2706 responds back to the IN-CSE 2702 with the results of the commit and whether or not it was successful.

In step 18 of FIG. 28, the IN-CSE 2702 detects that each of the targeted ASN-CSEs 2704 and 2706 have responded that they have successfully committed all the transactions in the sequence on the respective targeted resources.

In step 19 of FIG. 28, the IN-CSE 2702 updates its locally hosted DSLT sequence resource. Included in this update is the status of each of the DSLTs in the sequence and that it disseminated. This status indicates whether the transaction sequence was successful and if not the reason for the failure. The IN-CSE 2702 may also include the individual status and failure information for any failed DSLTs in the sequence.

In step 20 of FIG. 28, once the DSLT sequence processing has completed, the IN-CSE 2702 may notify the AE and include the results of the DSLT sequence. The IN-CSE 2702 may include the overall status of the DSLT sequence as well as the individual status of each disseminated transaction in the sequence that were performed on the individual targets. This may include an error or debug information explaining the cause of the failures. This may allow technicians and operators to detect problems and swap out or repair faulty devices before re-attempting to issue another DSLT.

In step 21 of FIG. 28, after receiving a notification of the completed DSLT sequence, the AE may respond back to the IN-CSE 2702 with a confirmation that it received the notification.

In step 22 of FIG. 28, if at any point, the AE wishes to check the status of the DSLT sequence processing, it may query the IN-CSE 2702 to check the status. When receiving a query request, the IN-CSE 2702 may check the state of the DSLT sequence resource that it maintains in the corresponding DSLT sequence resource.

In step 23 of FIG. 28, the DSLT-MF 1204 returns the state of the DSLT sequence processing to the DSLT-TF 1202 that initiated the DLTS status query.

Distributed Service Layer Transaction User Interface

Figure 29:
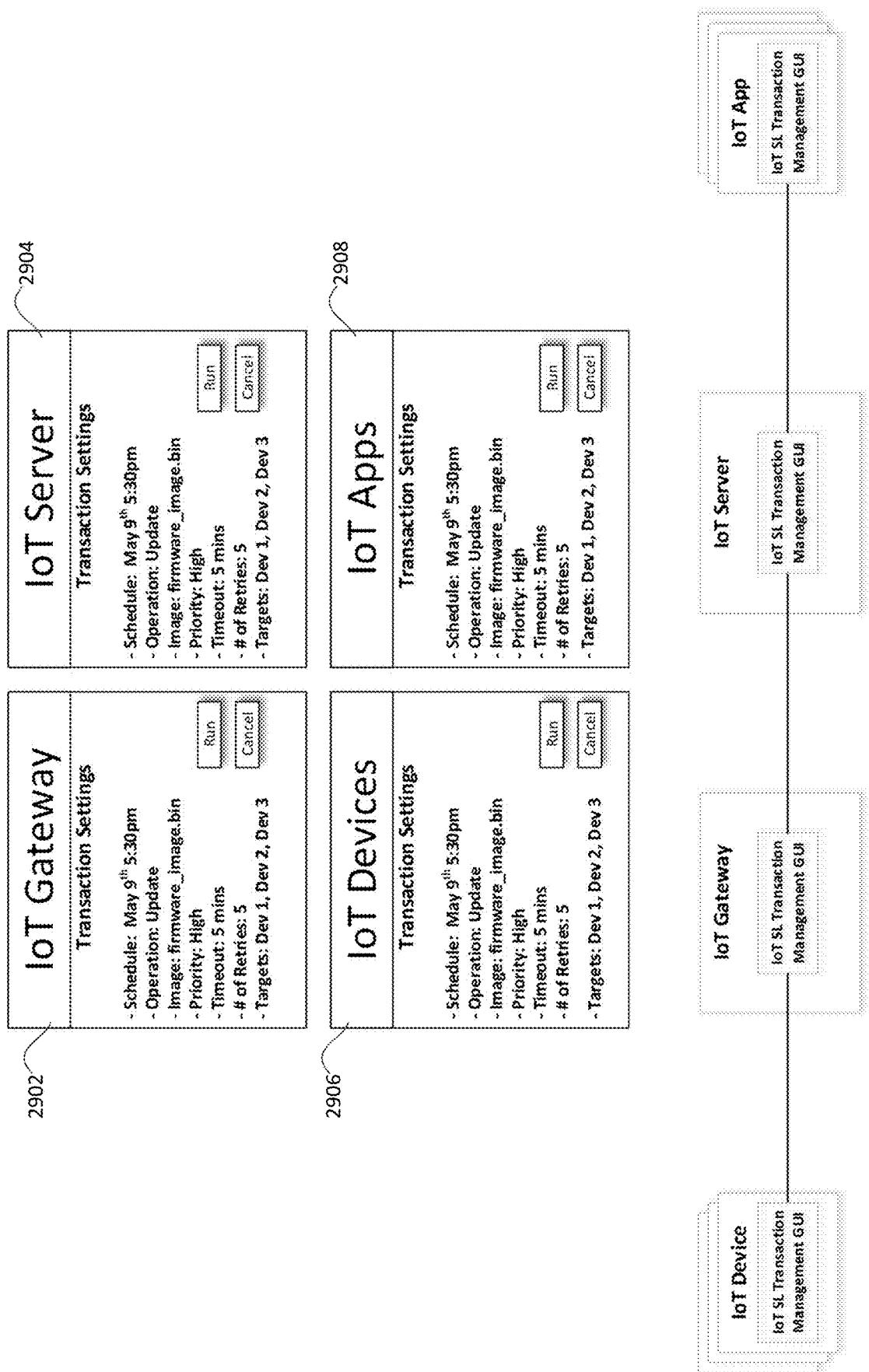
FIG. 29 is a diagram that illustrates service layer transaction user interfaces.

Interfaces, such as Graphical User Interfaces (GUIs), may be used to assist user to control and/or configure functionalities related to distributed transaction management. A user interface such as interfaces 2902, 2904, 2906 and 2908 as shown in FIG. 29 may be implemented to allow a user to initiate a DSLT based request to multiple IoT devices such that the request may be performed in an atomic manner. For example, to perform an atomic update of the control settings on a set of devices that operate in a coordinated manner such as an assembly line deployment. A user interface may also be implemented for configuring DSLT related policies within devices, gateways, servers and applications to control how they process DSLTs that they receive. It is to be understood that interface 2902, 2904, 2906 and 2908 may be produced using displays such as those shown in FIGS. 30C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Figure 30A:
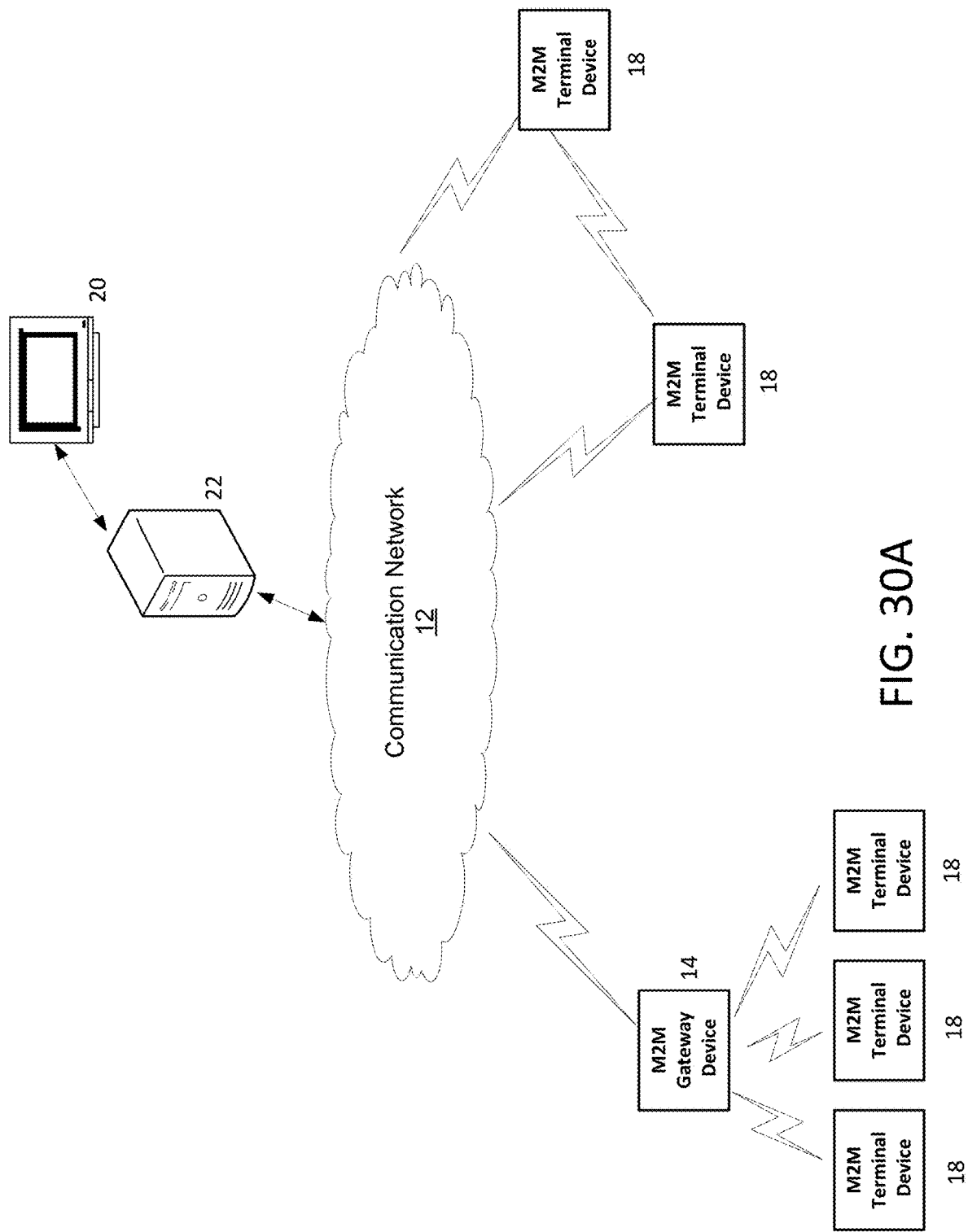
FIG. 30A is a diagram of a M2M/IoT/WoT communication system that includes a communication network.

FIG. 30A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 may be used to implement functionality of the disclosed embodiments and may include functionality and logical entities such as DSLT-TF 1202, DSLT-MF 1204 and 1206; DSLT-CF 1208, 1210, 1212, and 1214; DSLT-MF API 1302; DSLT-MF Processing 1304; DSLT-MF Sequence Processing 1306; DSLT-MF Policy Engine 1308; DSLT-MF Scheduler 1310; DSLT-CF API 1402; DSLT-CF Processing 1404; DSLT-CF Sequence Processing 1406; DSLT-MF CSF 2304; Service Layer 102; Application Protocols 104; Applications 106; CSE 302, 306, 306 and 2302; AE 304, 704, 706, 708 and 2306, NSE 308, IoT application 1002 and 1230, IoT Device 1004, 1006, 1008 1234, 1236, 1238 and 1240; IoT server 1102 and 1232, IoT Gateway 1242; IN-CSE 2702; ASN-CSE 2704 and 2706 and logical entities to produce interfaces such as interfaces 2902, 2904, 2906 and 2908.

As shown in FIG. 30A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 30A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 30B:
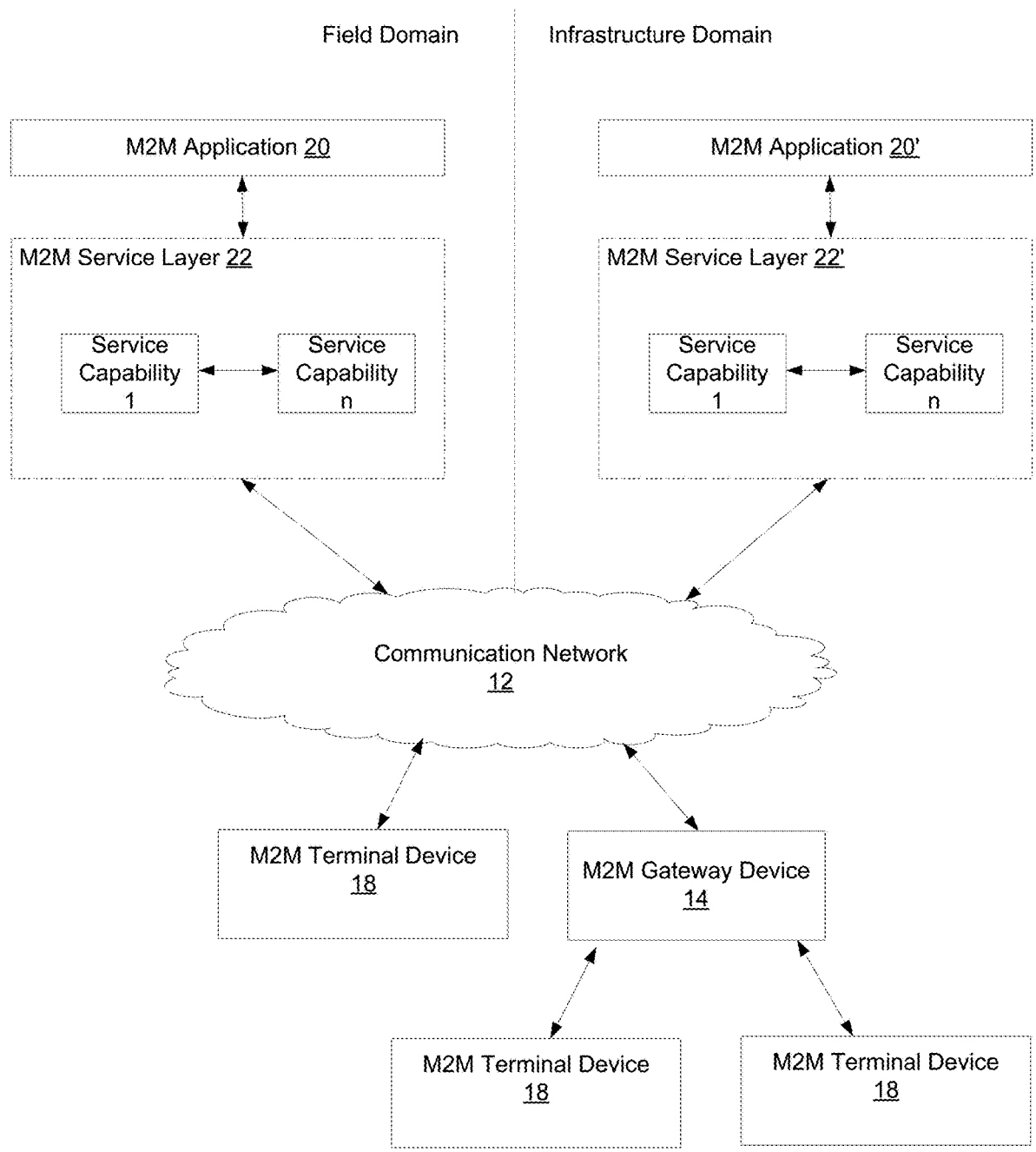
FIG. 30B is a diagram of an illustrated M2M service layer in the field domain that provides services for the M2M application, M2M gateway devices, and M2M terminal devices and the communication network.

Referring to FIG. 30B, the illustrated M2M service layer 22 in the field domain provides services for the M2M application 20, M2M gateway devices 14, and M2M terminal devices 18 and the communication network 12. The M2M service layer 22 may be implemented by one or more servers, computers, devices, virtual machines (e.g. cloud/storage farms, etc.) or the like, including for example the devices illustrated in FIGS. 30C and 30D described below. The M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. The M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 30B, the M2M service layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which may be hosted on different types of network nodes (e.g. infrastructure node, middle node, application-specific node). Further, connection methods of the present application may implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as DSLT-TF 1202, DSLT-MF 1204 and 1206; DSLT-CF 1208, 1210, 1212, and 1214; DSLT-MF API 1302; DSLT-MF Processing 1304; DSLT-MF Sequence Processing 1306; DSLT-MF Policy Engine 1308; DSLT-MF Scheduler 1310; DSLT-CF API 1402; DSLT-CF Processing 1404; DSLT-CF Sequence Processing 1406; DSLT-MF CSF 2304; Service Layer 102; CSE 302, 306, 306 and 2302; NSE 308; IoT server 1102 and 1232, IoT Gateway 1242; IN-CSE 2702; ASN-CSE 2704 and 2706 may be hosted within a M2M service layer instance hosted by an M2M node, such as an M2M server, M2M gateway, or M2M device, as shown in FIG. 30B. For example, these logical entities may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which may be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 30C or FIG. 30D described below.

Further, the logical entities described herein and illustrated in the figures may be implemented as part of an M2M network that uses a Service Oriented Architecture (SOA) and/or a Resource-Oriented Architecture (ROA) to access services of the present application.

Figure 30C:
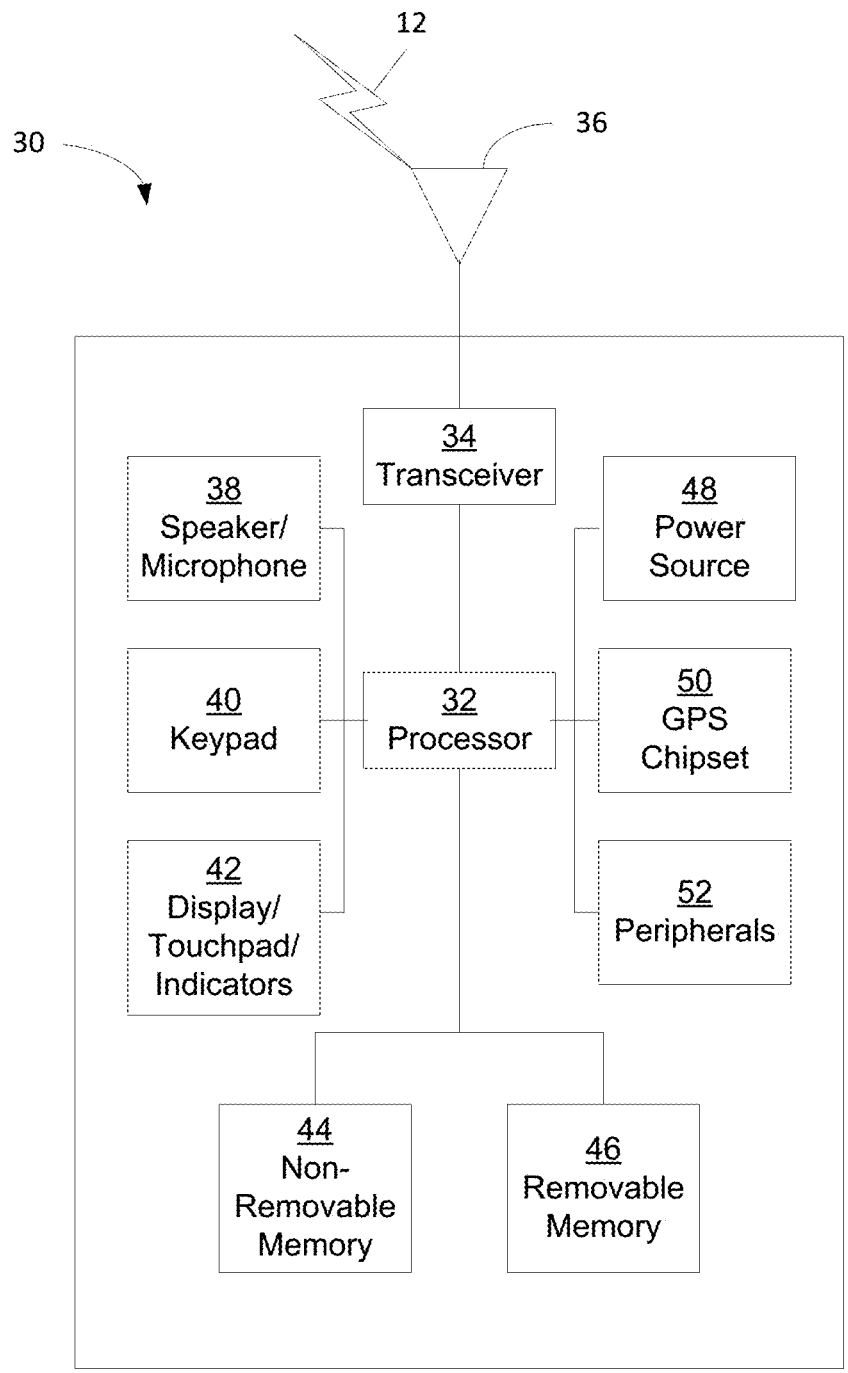
FIG. 30C is a diagram of an exemplary apparatus that may be used to implement any of the logical entities described herein.

FIG. 30C is a block diagram of an example hardware/software architecture of a network apparatus 30, such as an M2M device 18, an M2M gateway 14, an M2M server 22, or the like. The architecture of apparatus 30 may be used to implement any of the aforementioned logical entities described herein and illustrated in the figures. The apparatus 30 may be part of an M2M network as shown in FIG. 30A-B or part of a non-M2M network. As shown in FIG. 30C, the apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The apparatus 30 may also include communication circuitry, such as a transceiver 34 and a transmit/receive element 36. It will be appreciated that the apparatus 30 may include any sub-combination of the foregoing elements while remaining consistent with an embodiment. This apparatus may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the apparatus in order to perform the various required functions of the apparatus. For example, the processor 32 may perform signal coding, data processing, power control, input/output processing, and/or any other functionality that enables the apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 30C, the processor 32 is coupled to its communication circuitry (e.g., transceiver 34 and transmit/receive element 36). The processor 32, through the execution of computer executable instructions, may control the communication circuitry in order to cause the apparatus 30 to communicate with other network apparatuses via the network to which it is connected. In particular, the processor 32 may control the communication circuitry in order to perform the transmitting and receiving steps described herein and in the claims. While FIG. 30C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 30C as a single element, the apparatus 30 may include any number of transmit/receive elements 36. More specifically, the apparatus 30 may employ MIMO technology. Thus, in an embodiment, the apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the apparatus 30 may have multi-mode capabilities. Thus, the transceiver 34 may include multiple transceivers for enabling the apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the apparatus 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the apparatus 30. The power source 48 may be any suitable device for powering the apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the apparatus 30. It will be appreciated that the apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The apparatus 30 may connect to other components, modules, or systems of such apparatuses or devices via one or more interconnect interfaces, such as an interconnect interface that may comprise one of the peripherals 52. Alternately, the apparatus 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

Figure 30D:
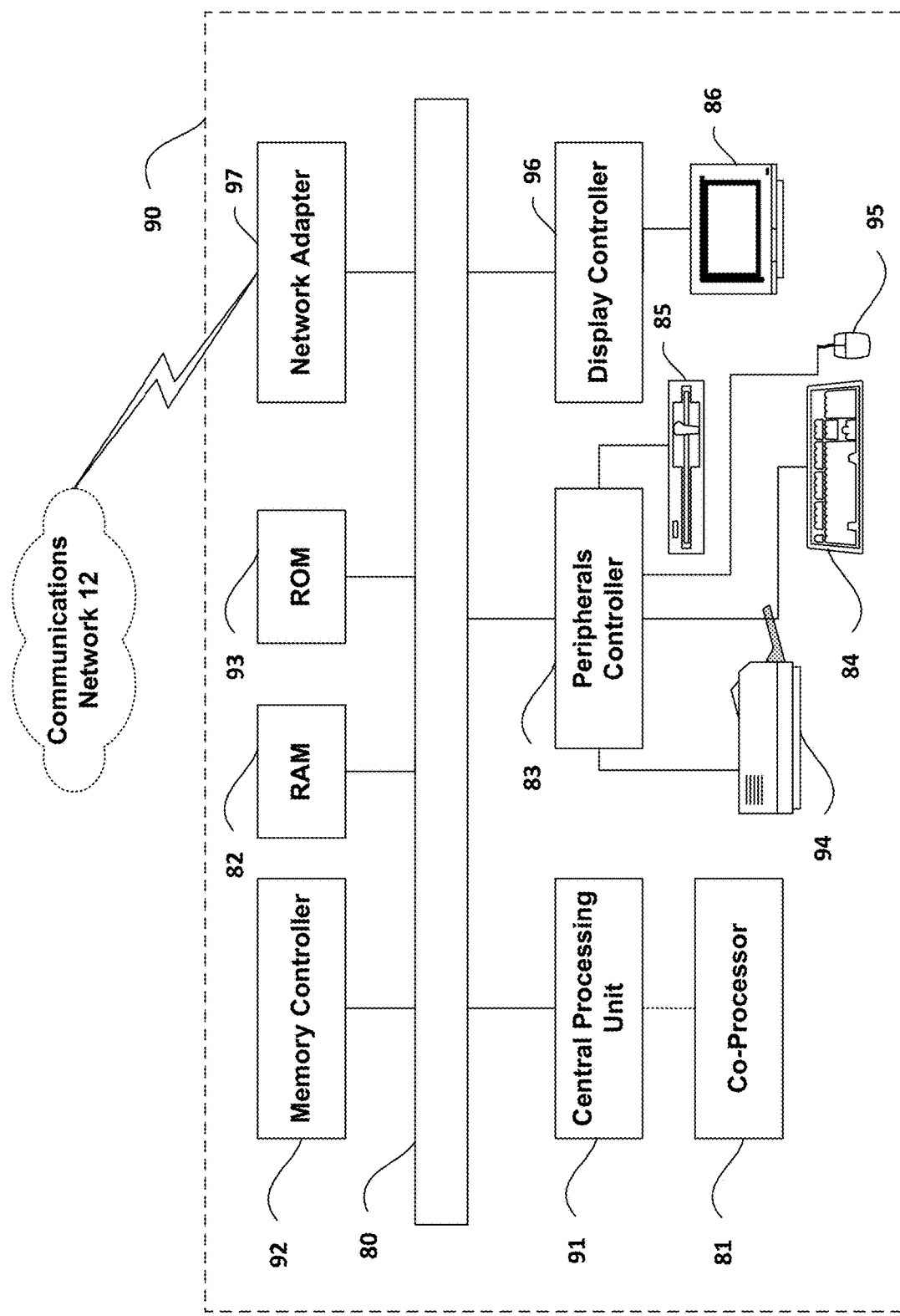
FIG. 30D is a block diagram of a computer system or server that may be used to implement any of the logical entities described herein.

FIG. 30D is a block diagram of an exemplary computing system 90 which may also be used to implement one or more logical entities or nodes of an M2M network, such as an M2M server, gateway, device, or other node or apparatus. Computing system 90 may comprise a computer or server and may be controlled primarily by computer readable instructions, which may be in the form of software, wherever, or by whatever means such software is stored or accessed. Computing system 90 may execute or include logical entities such as DSLT-TF 1202, DSLT-MF 1204 and 1206; DSLT-CF 1208, 1210, 1212, and 1214; DSLT-MF API 1302; DSLT-MF Processing 1304; DSLT-MF Sequence Processing 1306; DSLT-MF Policy Engine 1308; DSLT-MF Scheduler 1310; DSLT-CF API 1402; DSLT-CF Processing 1404; DSLT-CF Sequence Processing 1406; DSLT-MF CSF 2304; Service Layer 102; Application Protocols 104; Applications 106; CSE 302, 306, 306 and 2302; AE 304, 704, 706, 708 and 2306, NSE 308, IoT application 1002 and 1230, IoT Device 1004, 1006, 1008 1234, 1236, 1238 and 1240; IoT server 1102 and 1232, IoT Gateway 1242; IN-CSE 2702; ASN-CSE 2704 and 2706 and logical entities to produce interfaces such as interfaces 2902, 2904, 2906 and 2908. Computing system 90 may be an M2M device, user equipment, gateway, UE/GW or any other nodes including nodes of the mobile core network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 30A and FIG. 30B, to enable the computing system 90 to communicate with other nodes of the network.

User equipment (UE) may be any device used by an end-user to communicate. It may be a hand-held telephone, a laptop computer equipped with a mobile broadband adapter, or any other device. For example, the UE may be implemented as the M2M terminal device 18 of FIGS. 30 A-B or the device 30 of FIG. 30 C.

It is understood that any or all of the systems, methods, and processes described herein may be embodied in the form of computer executable instructions (i.e., program code) stored on a computer-readable storage medium which instructions, when executed by a machine, such as a node or apparatus of an M2M network, including for example an M2M server, gateway, device or the like, perform and/or implement the systems, methods and processes described herein. Specifically, any of the steps, operations or functions described above, including the operations of the DSLT-TF 1202, DSLT-MF 1204 and 1206; DSLT-CF 1208, 1210, 1212, and 1214; DSLT-MF API 1302; DSLT-MF Processing 1304; DSLT-MF Sequence Processing 1306; DSLT-MF Policy Engine 1308; DSLT-MF Scheduler 1310; DSLT-CF API 1402; DSLT-CF Processing 1404; DSLT-CF Sequence Processing 1406; DSLT-MF CSF 2304; Service Layer 102; Application Protocols 104; Applications 106; CSE 302, 306, 306 and 2302; AE 304, 704, 706, 708 and 2306, NSE 308, IoT application 1002 and 1230, IoT Device 1004, 1006, 1008 1234, 1236, 1238 and 1240; IoT server 1102 and 1232, IoT Gateway 1242; IN-CSE 2702; ASN-CSE 2704 and 2706 and devices or entities that produce interfaces such as interfaces 2902, 2904, 2906 and 2908, may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

Moreover, it is understood that the entities performing the steps illustrated in FIGS. 11, 12, 15-22, 27, and 28 may be logical entities that may be implemented in the form of software (i.e., computer-executable instructions) stored in a memory of, and executing on a processor of, an apparatus configured for wireless and/or network communications or a computer system such as those illustrated in FIG. 30C or FIG. 30D. That is, the method(s) illustrated in FIGS. 11, 12, 15-22, 27, and 28 may be implemented in the form of software (i.e., computer-executable instructions) stored in a memory of an apparatus, such as the apparatus or computer system illustrated in FIG. 30C or FIG. 30D, which computer executable instructions, when executed by a processor of the apparatus, perform the steps illustrated in FIGS. 11, 12, 15-22, 27, and 28. It is also understood that one or more of the entities and associated functionality illustrated in FIGS. 11, 12, 15-22, 27, and 28 may implemented in the form of one or more virtualized network functions. The network functions may not necessarily communicate directly, rather, they may communicate via a forwarding or routing function. It is also understood that any transmitting and receiving steps illustrated in FIGS. 11, 12, 15-22, 27, and 28 may be performed by communication circuitry of the apparatus or entity under control of the processor of the apparatus and the computer-executable instructions (e.g., software) that it executes.

It is also understood that phrases such as "sending a request," "sending a response," "receiving a request," "receiving a response," or the like may comprise sending or receiving, via the communications network, a message—for example, in the form of a packet or other defined sequence of bits—to/from an entity on the communications network, wherein the content or data of the message informs the recipient of what is being requested or responded to. Thus, for example, the phrase "sending a request" may be equivalent to the phrases "sending a message requesting," "sending a message comprising a request," and the like.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further comprising computer-executable instructions stored in the memory of the apparatus which, when executed by the processor of the apparatus, cause the apparatus to implement a first service layer entity of a communications network and to cause the first service layer entity to:
   receive from an application executing on the communications network, a request for a distributed service layer transaction, the request specifying a command to be atomically executed on a set of targeted resources, wherein the targeted resources are hosted by multiple other service layer entities of the communications network;
   send to each of the multiple other service layer entities, a request to lock any targeted resources hosted by that other service layer entity;
   receive, from each of the multiple other service layer entities, a response indicating whether that service layer entity was able to lock the targeted resources hosted by that service layer entity;
   send, to the multiple other service layer entities, based on receiving responses indicating that the multiple other service layer entities were able to lock the set of targeted resources, requests to perform atomic execution of the command on the set of targeted resources;
   receive, from the multiple other service layer entities, responses indicating that the command was successfully executed on the set of targeted resources;
   send, to the multiple other service layer entities, based on receiving responses indicating that the command was successfully executed on the set of targeted resources, requests to commit the distributed transaction; and
   send, to the application, a response indicating the distributed transaction was successfully performed.

2. The apparatus of claim 1, wherein the computer-executable instructions further cause the first service layer entity to create, upon receipt of the request for the distributed transaction from the application, in the memory of the first service layer entity, a resource representing the distributed transaction and comprising information concerning a state of the distributed transaction, wherein the resource is made accessible to the application via the communications network.

3. The apparatus of claim 2, wherein the resource comprises a transaction identifier attribute that uniquely identifies the transaction and a transaction state attribute in which the information concerning the state of the distributed transaction is stored.

4. The apparatus of claim 2, wherein the resource comprises an execution time attribute that controls when the first service layer entity initiates processing of the request for the distributed transaction.

5. The apparatus of claim 1, wherein the apparatus comprises one of a server or a gateway of the communications network.

6. The apparatus of claim 1, wherein the computer-executable instructions further cause the first service layer entity to process the request for the distributed transaction in accordance with a policy defining rules for processing the request.

7. The apparatus of claim 1, wherein the computer-executable instructions further cause the first service layer entity to schedule the processing of the request for the distributed transaction.

8. The apparatus of claim 1, wherein the request for the distributed transaction is part of a sequence of requests.

9. The apparatus of claim 1, wherein the computer-executable instructions further cause the first service layer entity to send, to the multiple other service layer entities, criteria indicating restrictions on the execution of the command.

10. The apparatus of claim 1, wherein the computer-executable instructions further cause the first service layer entity to assign a priority to the requested distributed transaction.

11. A method, comprising:
   receiving, at a first service layer entity of a communications network, from an application executing on the communications network, a request for a distributed service layer transaction, the request specifying a command to be atomically executed on a set of targeted resources, wherein the targeted resources are hosted by multiple other service layer entities of the communications network;
   sending, by the first service layer entity, to each of the multiple other service layer entities, a request to lock any targeted resources hosted by that other service layer entity;
   receiving, by the first service layer entity, from each of the multiple service layer entities, a response indicating whether that service layer entity was able to lock the targeted resources hosted by that service layer entity;
   sending, by the first service layer entity, to the multiple other service layer entities, based on receiving responses indicating that the multiple other service layer entities were able to lock the set of targeted resources, requests to perform atomic execution of the command on the set of targeted resources;

receiving, by the first service layer entity, from the multiple other service layer entities, responses indicating that the command was successfully executed on the set of targeted resources;

sending, by the first service layer entity, to the multiple other service layer entities, based on receiving responses indicating that the command was successfully executed on the set of targeted resources, requests to commit the distributed transaction; and sending, to the application, a response indicating that the distributed transaction was successfully performed.

12. The method of claim 11, further comprising, creating, by the first service layer entity, upon receipt of the request for the distributed transaction from the application, a resource representing the distributed transaction and comprising information concerning a state of the distributed transaction, wherein the resource is made accessible to the application via the communications network.

13. The method of claim 12, wherein the resource comprises a transaction identifier attribute that uniquely identifies the transaction and a transaction state attribute in which the information concerning the state of the distributed transaction is stored.

14. The method of claim 12, wherein the resource comprises an execution time attribute that controls when the first service layer entity initiates processing of the request for the distributed transaction.

15. The method of claim 11, wherein the first service layer entity is implemented on one of a server or a gateway of the communications network.

16. The method of claim 11, further comprising, processing the request for the distributed transaction in accordance with a policy defining rules for processing the request.

17. The method of claim 11, further comprising, scheduling of the processing of the request for the distributed transaction.

18. The method of claim 11, wherein the request for the distributed transaction is part of a sequence of requests.

19. The method of claim 11, further comprising, sending, to the multiple other service layer entities, criteria indicating restrictions on the execution of the command.

20. The method of claim 11, further comprising, assigning a priority to the requested distributed transaction.

* * * * *